US009546099B2

(12) United States Patent
Rock

(10) Patent No.: US 9,546,099 B2
(45) Date of Patent: Jan. 17, 2017

(54) SYSTEMS AND METHODS FOR WATER PURIFICATION

(71) Applicant: Micronic Technologies, Inc., Sterling, VA (US)

(72) Inventor: Kelly P. Rock, Vienna, VA (US)

(73) Assignee: MICRONIC TECHNOLOGIES, INC., Sterling, VA (US)

(*) Notice: Subject to any disclaimer, the term of this patent is extended or adjusted under 35 U.S.C. 154(b) by 404 days.

(21) Appl. No.: 13/755,319

(22) Filed: Jan. 31, 2013

(65) Prior Publication Data

US 2014/0034478 A1 Feb. 6, 2014

Related U.S. Application Data

(60) Provisional application No. 61/593,421, filed on Feb. 1, 2012.

(51) Int. Cl.
| C02F 1/04 | (2006.01) |
| B01D 1/00 | (2006.01) |
| B01D 1/14 | (2006.01) |
| B01D 1/22 | (2006.01) |
| B01D 5/00 | (2006.01) |
| C02F 1/38 | (2006.01) |
| C02F 103/08 | (2006.01) |

(Continued)

(52) U.S. Cl.
CPC ............. *C02F 1/048* (2013.01); *B01D 1/0082* (2013.01); *B01D 1/14* (2013.01); *B01D 1/22* (2013.01); *B01D 5/006* (2013.01); *C02F 1/04* (2013.01); *C02F 1/38* (2013.01); *C02F 2103/08* (2013.01); *C02F 2103/10* (2013.01); *C02F 2103/34* (2013.01)

(58) Field of Classification Search
CPC ..... B01D 51/0082; B01D 51/14; B01D 51/22; B01D 5/006; C02F 1/04; C02F 1/048; C02F 1/14; C02F 1/22
See application file for complete search history.

(56) References Cited

U.S. PATENT DOCUMENTS 3,509,932 A * 5/1970 Chambers ...................... 159/2.1
3,649,468 A    3/1972 Bechard et al.
3,725,271 A * 4/1973 Giannotti ...................... 210/767
(Continued)

FOREIGN PATENT DOCUMENTS

WO    WO 2007/133771 A2    11/2007

*Primary Examiner* — Bobby Ramdhanie
*Assistant Examiner* — Jonathan Miller
(74) *Attorney, Agent, or Firm* — Pillsbury Winthrop Shaw Pittman, LLP

(57) ABSTRACT

An evaporator assembly includes an inlet member and a diffuser, and receives a mixture of a gas and a solution to vaporize a portion of a solvent from the solution. First portions of the diffuser and of the inlet member collectively define a first flow path. A second portion of the diffuser defines a second flow path that diverges. A third portion of the diffuser and a second portion of the inlet member collectively define an evaporation volume between the first flow path and the second flow path. At least one of the diffuser or the inlet flow member includes multiple vanes that produce a rotation within a flow of the mixture when the flow exits the first flow path into the evaporation volume. A separator receives the mixture to produce a first flow of a portion of the solvent and a second flow of a portion of the solute.

17 Claims, 45 Drawing Sheets

(51) Int. Cl.
*C02F 103/10* (2006.01)
*C02F 103/34* (2006.01)

(56) References Cited

U.S. PATENT DOCUMENTS

| | | | |
|---|---|---|---|
| 3,837,491 A | 9/1974 | Humiston et al. | |
| 4,176,779 A | 12/1979 | Kirk et al. | |
| 4,292,050 A * | 9/1981 | Linhardt et al. | 95/269 |
| 4,504,285 A * | 3/1985 | Modisette | 62/86 |
| 4,515,734 A | 5/1985 | Rock et al. | |
| 4,568,500 A | 2/1986 | Rock et al. | |
| 4,595,459 A | 6/1986 | Kusakawa et al. | |
| 5,078,880 A | 1/1992 | Barry | |
| 5,123,811 A * | 6/1992 | Kuroiwa | 415/207 |
| 5,176,799 A | 1/1993 | Roe et al. | |
| 5,472,645 A | 12/1995 | Rock et al. | |
| 5,534,118 A | 7/1996 | McCutchen | |
| 5,620,561 A | 4/1997 | Kuhn et al. | |
| 5,672,187 A | 9/1997 | Rock et al. | |
| 5,744,008 A | 4/1998 | Craven | |
| 6,110,368 A | 8/2000 | Hopkins et al. | |
| 6,113,078 A | 9/2000 | Rock | |
| 6,132,629 A * | 10/2000 | Boley | B01F 3/04985 210/167.11 |
| 6,234,459 B1 | 5/2001 | Rock | |
| 6,244,573 B1 | 6/2001 | Rock | |
| 6,293,121 B1 | 9/2001 | Labrador | |
| 6,347,789 B1 | 2/2002 | Rock | |
| 6,500,216 B1 | 12/2002 | Takayasu | |
| 6,648,306 B2 | 11/2003 | Rock | |
| 6,669,176 B2 | 12/2003 | Rock | |
| 6,811,690 B2 | 11/2004 | Arnaud | |
| 6,973,792 B2 | 12/2005 | Hicks | |
| 7,681,569 B2 | 3/2010 | Rock | |
| 7,837,766 B2 * | 11/2010 | Gillette | A23L 3/358 210/188 |
| 7,897,019 B2 | 3/2011 | Akers | |
| 8,016,901 B2 * | 9/2011 | Bloom | 55/315 |
| 8,192,688 B2 * | 6/2012 | Hagen et al. | 422/129 |
| 8,834,683 B2 * | 9/2014 | Ba-abbad | B01D 5/0006 159/26.2 |
| 2007/0204839 A1 | 9/2007 | Rock et al. | |
| 2008/0083605 A1 | 4/2008 | Holtzapple et al. | |
| 2008/0251419 A1 * | 10/2008 | Stein et al. | 208/106 |
| 2009/0013192 A1 | 1/2009 | Chen et al. | |
| 2009/0223650 A1 * | 9/2009 | Williams | F25B 9/00 165/104.17 |
| 2010/0038229 A1 | 2/2010 | Nadeau, Jr. et al. | |
| 2010/0065510 A1 | 3/2010 | Krichtafovitch et al. | |
| 2011/0139697 A1 | 6/2011 | Rock | |

* cited by examiner

US 9,546,099 B2

SYSTEMS AND METHODS FOR WATER PURIFICATION

CROSS-REFERENCE TO RELATED APPLICATIONS

This application claims priority to and the benefit of U.S. Provisional Application Ser. No. 61/593,421, entitled "Systems and Methods for Water Purification," filed Feb. 1, 2012, which is incorporated herein by reference in its entirety.

BACKGROUND

The embodiments described herein relate to systems and methods for removing impurities from water. More particularly, the embodiments described herein relate to systems and methods for the removal of organisms, minerals, other dissolved solids and/or contaminants from water.

Known water desalinization systems are used to produce potable water from seawater and/or other sources of salt or brackish water. Some known water desalinization systems include filtration systems to remove the solute within the source water, such as, for example, reverse osmosis filtering. Known reverse osmosis desalinization systems produce filtered water by pressurizing the source water to produce the "reverse osmosis" flow (i.e., the flow across a specialized membrane from the area of high solute concentration to the area of low solute concentration). In some known systems, the pressure of the source water can be between 800 and 1000 psi, thus resulting in high-energy consumption during operation. The specialized membranes and/or filters, which may be subject to degradation due to exposure to certain bacteria, also require periodic replacement and/or maintenance. This adds to the cost and complexity of operation. Moreover, some known reverse osmosis desalinization systems have recovery ratios (i.e., the ratio between the flow rate of filtered water to the flow rate of source water) as low as ten percent.

Other known water desalinization systems produce potable water by distilling the source water. For example, multi-stage flash desalinization systems boil the source water to produce a vapor in multiple stages of operation. The vapor is then condensed to produce the desalinized water. Although the multiple stages are arranged such that the cool inlet water is heated by the vapor as the vapor is condensed, known multi-stage flash desalinization systems consume large amounts of energy to achieve the desired heating of the inlet water to produce the vapor. The boilers of known multi-stage flash desalinization systems also require periodic cleaning and/or maintenance, thereby adding to the cost and complexity of operation.

Yet other known water desalinization systems vaporize inlet seawater for subsequent condensation and recovery by atomizing the inlet seawater into ambient air. Such known systems often pressurize the inlet seawater (for example, to pressures of 100 psi or higher) and/or heat the ambient air, thus resulting in high-energy consumption during operation. Moreover, such known systems often include a long flow path (e.g., similar to a cooling tower flow path) within which the atomized inlet water is evaporated, which increases the size and complexity of the system.

Thus, a need exists for improved systems and methods for water purification.

SUMMARY

Systems and methods for water desalination are described herein. In some embodiments, an evaporator assembly is configured to receive a mixture of a gas and a solution and vaporize a portion of a solvent from the solution. The evaporator assembly includes an inlet flow member having a first surface and a second surface, a diffuser having a first surface and a second surface, and a separator. A first portion of the first surface of the diffuser and the first surface of the inlet flow member collectively define a first flow path. The second surface of the diffuser defines a second flow path that diverges along a longitudinal axis of the evaporator assembly. A second portion of the first surface of the diffuser and the second surface of the inlet flow member collectively define an evaporation volume between the first flow path and the second flow path. At least one of the first portion of the first surface of the diffuser or the first surface of the inlet flow member includes multiple vanes configured to produce a rotational velocity component within a flow of the mixture of the solution and the gas when the flow exits the first flow path into the evaporation volume. The separator is fluidically coupled to the second flow path and is configured to receive the mixture of the gas and the solution. The separator is configured to produce a first outlet flow including a portion of the gas and the vaporized portion of the solvent, and a second outlet flow including a liquid portion of the solvent from the solution and a solute from the solution.

DETAILED DESCRIPTION

Figure 1:
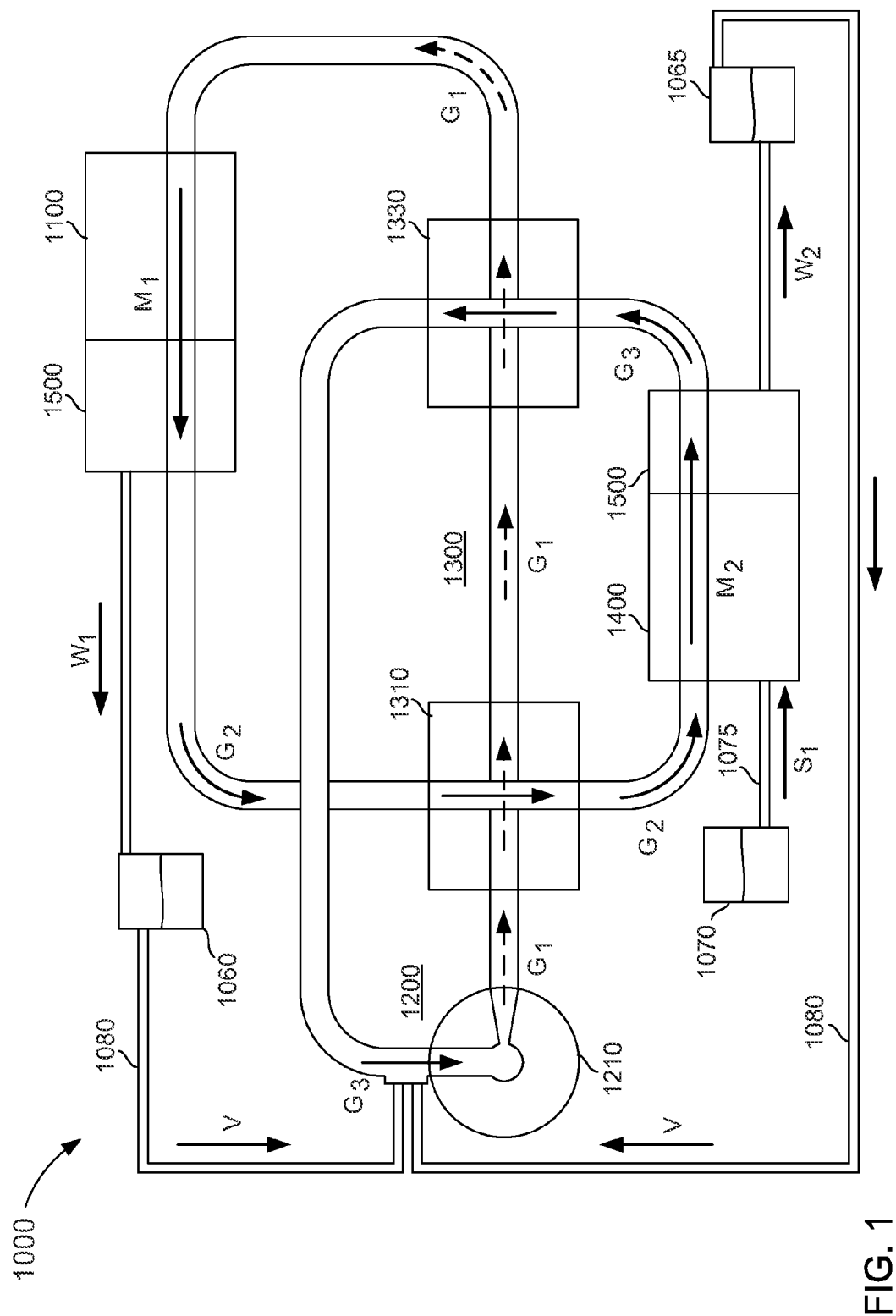
FIG. 1 is a schematic illustration of a water purification system according to an embodiment.

In some embodiments, an evaporator assembly is configured to receive a mixture of a gas and a solution and vaporize a portion of a solvent from the solution. The evaporator assembly includes an inlet flow member having a first surface and a second surface, a diffuser having a first surface and a second surface, and a separator. A first portion of the first surface of the diffuser and the first surface of the inlet flow member collectively define a first flow path. The second surface of the diffuser defines a second flow path that diverges along a longitudinal axis of the evaporator assembly. A second portion of the first surface of the diffuser and the second surface of the inlet flow member collectively define an evaporation volume between the first flow path and the second flow path. At least one of the first portion of the first surface of the diffuser or the first surface of the inlet flow member includes multiple vanes configured to produce a rotational velocity component within a flow of the mixture of the solution and the gas when the flow exits the first flow path into the evaporation volume. The separator is fluidically coupled to the second flow path and is configured to receive the mixture of the gas and the solution. The separator is configured to produce a first outlet flow including a portion of the gas and the vaporized portion of the solvent, and a second outlet flow including a liquid portion of the solvent from the solution and a solute from the solution.

In some embodiments, an evaporator assembly is configured to receive a mixture of a gas and a solution and vaporize a portion of a solvent from the solution. The evaporator assembly includes an inlet flow member having a first surface and a second surface, a diffuser having a first surface and a second surface, and a separator. A first portion of the first surface of the diffuser and the first surface of the inlet flow member collectively define a first flow path. The second surface of the diffuser defines a second flow path that diverges along a longitudinal axis of the evaporator assembly. The second surface of the diffuser includes at least on discontinuity within the second flow path. A second portion of the first surface of the diffuser and the second surface of the inlet flow member collectively define an evaporation volume between the first flow path and the second flow path. The separator is fluidically coupled to the second flow path and is configured to receive the mixture of the gas and the solution. The separator is configured to produce a first outlet flow including a portion of the gas and the vaporized portion of the solvent, and a second outlet flow including a liquid portion of the solvent from the solution and a solute from the solution.

In some embodiments, an atomizer assembly is configured to mix a solution and a gas to produce at least a partially atomized mixture of the solution and the gas. The atomizer assembly includes an injector nozzle and a diffuser. The injector nozzle defines multiple elongated exit openings through which the solution can be conveyed from a source into a mixing chamber. The diffuser includes a first surface and a second surface. The first surface of the diffuser defines at least a portion of a gas flow path through which the gas can be conveyed into the mixing chamber. The second surface of the diffuser defining an outlet flow path that diverges along a longitudinal axis of the atomizer assembly. The first surface of the diffuser includes multiple vanes configured to produce a rotational velocity component within the flow of the gas when the flow exits the gas flow path into the mixing volume. A separator is fluidically coupled to the second flow path and is configured to receive the mixture of the gas and the solution. The separator is configured to produce a first outlet flow including a portion of the gas and the vaporized portion of the solvent, and a second outlet flow including a liquid portion of the solvent from the solution and a solute from the solution.

In some embodiments, a method includes conveying an inlet solution from a source into a mixing volume via an outlet opening defined by an injector nozzle of an atomizer. An inlet gas is conveyed into the mixing volume via a gas flow path defined, at least in part, by a diffuser to produce a partially atomized mixture of the inlet solution and the inlet gas. The diffuser includes multiple vanes configured to produce a rotational velocity component within a flow of the gas when the flow exits the gas flow path into the mixing volume. The method includes vaporizing a portion of a solvent from the solution and separating the mixture of the inlet gas and the inlet solution to produce a first outlet flow and a second outlet flow. The first outlet flow includes a portion of the inlet gas and the vaporized portion of the solvent from the solution. The second outlet flow includes a liquid portion of the solvent from the solution and a solute from the solution.

As used in this specification, the terms "atomize" and "vaporize" describe the process of reducing a liquid or solution into a series of tiny particles, droplets and/or a fine spray. For example, as used herein, a device or component configured to atomize a liquid and/or produce and atomized flow of a liquid can be any suitable device or component that reduces and/or "breaks" the liquid into a series of tiny particles and/or a fine spray.

As used herein, the terms "about" and "approximately" generally mean plus or minus 10% of the value stated. For example, about 0.5 would include 0.45 and 0.55, about 10 would include 9 to 11, about 10000 would include 900 to 11000.

As used herein, the term "set" can refer to multiple features or a singular feature with multiple parts. For example, when referring to set of walls, the set of walls can be considered as one wall with multiple portions, or the set of walls can be considered as multiple, distinct walls. Thus, a monolithically constructed item can include a set of walls. Such a set of walls may include multiple portions that are either continuous or discontinuous from each other. For example, a monolithically constructed wall can include a set of shoulders that can be said to form a set of walls. A set of walls can also be fabricated from multiple items that are produced separately and are later joined together (e.g., via a weld, an adhesive, or any suitable method).

As used herein, the term "parallel" generally describes a relationship between two geometric constructions (e.g., two lines, two planes, a line and a plane or the like) in which the two geometric constructions are substantially non-intersecting as they extend substantially to infinity. For example, as used herein, a line is said to be parallel to another line when the lines do not intersect as they extend to infinity. Similarly, when a planar surface (i.e., a two-dimensional surface) is said to be parallel to a line, every point along the line is spaced apart from the nearest portion of the surface by a substantially equal distance. Two geometric constructions are described herein as being "parallel" or "substantially parallel" to each other when they are nominally parallel to each other, such as for example, when they are parallel to each other within a tolerance. Such tolerances can include, for example, manufacturing tolerances, measurement tolerances or the like.

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

FIG. 1 is a schematic illustration of a water purification system 1000 according to an embodiment. The water purification system 1000 (also referred to herein as "system") includes a condenser assembly 1100, an air flow assembly 1200, a heat exchanger assembly 1300, a processor assembly 1400, and a pair of separators 1500. As described in more detail herein, the system 1000 is configured to receive an inlet flow of water containing a solute (e.g., industrial wastewater, contaminated water from hydraulic fracturing operations, seawater or the like) and produce a flow of water substantially free of the solute (e.g., desalinated water, or water that is free other dissolved solids). A high-level description of the system 1000 is followed by a more detailed discussion of the components and/or subsystems shown in FIG. 1. In particular, the airflow $G_1$ (the airflow produced and/or provided by the air flow assembly 1200) is an airflow that includes substantially purified water vapor (from the processor assembly 1400). Thus, although referred to herein as an "airflow" or in terms of a gas, it should be understood that the flow $G_1$ includes substantially purified water vapor. The airflow $G_1$ is passed through the heat exchanger assembly 1300, which, as described below, is a two-stage heat exchanger that includes a first heat exchanger 1310 and a second heat exchanger 1330, to remove a portion of heat from the airflow $G_1$. Upon exiting the heat exchanger assembly 1300, the substantially cooled airflow $G_1$ is passed to the condenser assembly 1100. The condenser assembly 1100 further cools the airflow $G_1$, thereby condensing at least a portion of the water vapor within the airflow $G_1$ to produce a flow of air, water vapor and liquid (or condensed) product water (identified as $M_1$ in FIG. 1). The mixture $M_1$ is then separated by the separator 1500 to produce a gaseous flow of substantially cooled air $G_2$ (that is substantially free of moisture) and a flow of substantially purified water $W_1$ (e.g., desalinized water). The purified water $W_1$ can be collected in collection reservoir 1060. The cool, dry airflow $G_2$ is passed through the first heat exchanger 1310 of the heat exchanger assembly 1300, thereby increasing the temperature of the airflow $G_2$. The heated airflow $G_2$ is conveyed to the processor assembly 1400 and mixed with an inlet solution $S_1$ of the feedwater, which is provided by a fluid source 1070. Using any of the components, mechanisms and/or methods described herein, the solution $S_1$ is mixed with and/or atomized into the airflow $G_2$ to form a mixture of air, water vapor and total dissolved solids (e.g., concentrated brine solution, identified as $M_2$ in FIG. 1). The mixture $M_2$ is then evaporated and subsequently separated by the separator 1500 to produce a gaseous flow of substantially pure water vapor $G_3$ (i.e., substantially saturated air) and a flow of waste products $W_2$, including the solute, dissolved solids, and/or brine. The waste products $W_2$ can be collected in collection reservoir 1065. The water vapor $G_3$ is then passed through the second heat exchanger 1330 of the heat exchanger assembly 1300, and then to the air flow assembly 1200. As discussed below, the system 1000 is a substantially closed loop system (e.g., the water vapor $G_3$ is provided to the air flow assembly 1200, where, after processing, the water vapor $G_3$ becomes the inlet air $G_1$) configured to recycle the thermal energy resulting from the condensation and/or evaporation of the inlet air $G_1$ and/or the solution $S_1$ to improve the efficiency of the system.

The fluid source 1070 can be any suitable fluid source and/or reservoir. For example, in some embodiments, the fluid source 1070 can be a body of water such as a lake, a river, a sea, or an ocean, etc. In this manner, the inlet solution $S_1$ (e.g., unpurified water, salt water, brackish water, etc.) can be fed from the fluid source 1070 through a supply line 1075 an into the processor assembly 1400, as described in further detail herein. In other embodiments, the fluid source 1070 can be a collection tank for industrial wastewater or contaminated water from a mining process. Although not shown in FIG. 1, the system 1000 can include a water inlet assembly that can include one or more pumps, manifolds, and/or plumbing, filters, or the like. For example, in some embodiments, a water inlet assembly can include an inlet pipe that is downstream of the fluid source 1070. The inlet pipe can include a strainer that removes particles or large debris from the inlet solution $S_1$ (also referred to herein as inlet feed water). Furthermore, the fluid can be conveyed from the fluid source 1070 to the inlet pipe via a pump. The pump can be any suitable fluid machine for producing a flow of the inlet feed water $S_1$ within the inlet piping and into the supply line 1075 for delivery to the processor 1400. Similarly stated, the pump produces a flow of inlet feed water $S_1$ to the processor assembly 1400 via the inlet piping (not shown in FIG. 1) and the supply line 1075. In some embodiments, the source of inlet feed water $S_1$ can include a reservoir (not shown in FIG. 1) within which the pump, the inlet piping and/or the strainer are, at least partially, disposed. Similarly stated, in some embodiments, the pump can be disposed beneath the surface of the fluid source 1070.

In some embodiments, the pump can be a centrifugal pump that produces a flow of the inlet feed water $S_1$ having a flow rate of between 0.05 gallons per minute and 2 gallons per minute and a pressure of between 2 p.s.i. and 10 p.s.i. Although the water inlet assembly is described above as including only one pump, in other embodiments, a water inlet assembly can include any number of pumps. For example, in some embodiments, a water inlet assembly can include a first pump located within the fluid source 1070 (e.g., a lift pump) and a second pump located adjacent the processor assembly 1400, which produces a high pressure flow of the inlet solution $S_1$ to the processor 1400. In other embodiments, a water inlet assembly can include a series of pumps that provide a flow of inlet water to different portions of the processor assembly 1400 in parallel. For example, in some embodiments, the pump can be a multichannel peristaltic metering pump configured to supply a flow of inlet water to a more than one injection port within the processor assembly 1400.

In some embodiments, the water inlet assembly can include a controller (not shown in FIG. 1) that can adjust the flow rate produced by the pump. In such embodiments, the controller can be adjusted manually (i.e., directly via human intervention). In other embodiments, the controller can be an automatic controller that is adjusted, for example, based upon feedback and/or measurements taken from other portions of the system 1000. In some embodiments, for example, a controller can be configured to adjust the flow rate produced by the pump to ensure that the flow of waste products $W_2$ has sufficient liquidity to be conveyed from the system 1000.

Although not shown in FIG. 1, in some embodiments, the inlet feed water $S_1$ conveyed through the inlet pipe and/or the supply line 1075 can interact with other portions of the system 1000 such that thermal energy can be transferred to the inlet feed water $S_1$. For example, in some embodiments, a portion of the supply line 1075 can be run through a portion of the heat exchanger assembly 1300 and/or the condenser assembly 1100. In such embodiments, a portion of the heat that removed from the gas flow (e.g., the inlet air $G_1$, the water vapor $G_2$, and/or the water vapor $G_3$) is transferred into the inlet feed water $S_1$, thereby raising the temperature of the inlet feed water $S_1$ above an ambient temperature. Thus, any such portion of the inlet solution plumbing or the inlet piping can be coupled to or cooperatively function with any suitable structure and/or mechanism to enhance the performance of the condenser assembly 1100 and/or the heat exchanger assembly 1300. For example, in some embodiments, the portion of the supply line 1075 can be coupled to a series of heat transfer fins. In other embodiments, the portion of the supply line 1075 can be configured with a series of bends to increase the length of travel of the inlet feed water $S_1$ (e.g., within the condenser assembly 1100 and/or the heat transfer assembly 1300).

In some embodiments, a water inlet assembly can include one or more controllers and/or valves (not shown in FIG. 1) to adjust the pressure and/or flow rate of the inlet feed water $S_1$ to the processor assembly 1400 and/or to one or more atomizers disposed therein (not shown in FIG. 1). For example, in some embodiments, the water inlet assembly can include a supply manifold with any suitable mechanism for conditioning or further processing the inlet feed water $S_1$. In some embodiments, a pump or other device for producing pressure within the supply manifold can be configured to regulate the pressure and/or flow of the inlet feed water $S_1$ supplied to one or more injector portions of the processor assembly 1400 is within a predetermined range. In some embodiments, a supply manifold can include an accumulator or movable member configured to accumulate, dampen and/or store pressure energy within the inlet feed water $S_1$, thereby producing a constant flow and/or pressure to the processor assembly 1400. In other embodiments, a supply manifold can include a heater (not shown in FIG. 1) to further heat the inlet feed water $S_1$.

The air flow assembly 1200 is configured to circulate air within the system 1000. The air flow assembly 1200 includes an air pump 1210 and any other associated components or subsystems (e.g., filters, a motor, or the like; not shown in FIG. 1) such that the air pump 1210 can produce the desired flow and/or pressure set forth herein. The air pump 1210 can be any suitable fluid machine for producing a pressure and/or flow of air through the system 1000, as described herein. More particularly, the air pump 1210 compresses a flow of source air (e.g., the inlet airflow $G_3$) to produce the flow of air $G_1$ to the condenser 1100. In some embodiments, the air pump 1210 is a centrifugal pump or blower that produces a flow of the air $G_1$ having a flow rate of between 30 cubic feet per minute and 3000 cubic feet per minute and a pressure of between 3 p.s.i. and 10 p.s.i. In some embodiments, the air pump 1210 can produce a pressurized airflow within a plenum or the like having a pressure of approximately 5 p.s.i. at a flow rate of approximately 300 cubic feet per minute. The air pump 1210 can be any suitable pump, such as for example, a Rotex C30-74 supercharger. Although the air pump 1210 is shown and described as producing a pressure of less than 10 p.s.i., in other embodiments, the air pump 1210 can produce any desired range of pressure. The air pump 1210 can be driven by any suitable mechanism, such as, for example, by an electric motor (not shown in FIG. 1). In other embodiments, the air pump 1210 can be driven by a fluid machine (e.g., a turbine powered by shop air or the like).

As shown in FIG. 1, the air circuit is a substantially closed system to conserve kinetic energy and reduce the noise level associated with the air pump 1210 and the flow of the air throughout the system. For example, the air pump (or blower) 1210 receives a flow of the water vapor $G_3$ which is compressed by the air pump 1210 to produce the flow of air $G_1$. The system 1000 also includes a set of vent lines 1080 configured to remove excess vapor or gas that can develop in the collection reservoirs 1060 and 1065 (as identified a V in FIG. 1). Thus, the blower 1210 receives recirculated gas within the system 1000 into the water vapor flow $G_3$, and compresses the gas to produce the flow of the air $G_1$. The air pump 1210 or supply plenum (not shown), however, includes an external air inlet port, from which external air (e.g., "make-up air") can be drawn. In other embodiments, however, the air flow assembly 1200 can include an external inlet port in any suitable location. In some embodiments, the air inlet port can include a valve with a manual or automatic control system. In some embodiments, the air pump 1210 can be configured to draw air through the air inlet port during startup to provide air to the system 1000.

Further to the discussion above, the air $G_1$, which includes the substantially pure water vapor content (from the processor 1400) and is above ambient temperature (e.g., due to compression), is conveyed from the air pump 1210 into the heat exchanger assembly 1300. In some embodiments, the temperature of the air flow $G_1$ at the exit of the air pump 1210 is greater than approximately 80 degrees Celsius, greater than approximately 90 degrees Celsius and/or between approximately 90 degrees Celsius and 100 degrees Celsius. The heat exchanger assembly 1300 includes a first heat exchanger 1310 and a second heat exchanger 1330. The first heat exchanger 1310 includes two closed flow paths. A first flow path (i.e., the "hot" side) receives the inlet air $G_1$ and a second flow path (i.e., the "cold" side) receives the substantially dry airflow $G_2$ in route to the inlet of processor assembly 1400. Therefore, with the airflow $G_1$ being substantially above ambient temperature due to compression and with the airflow $G_2$ being cooled by the condenser assembly 1100, a portion of the heat is removed from the airflow $G_1$ and is transferred to the airflow $G_2$. Thus, the airflow $G_1$ exits the first heat exchanger 1310 at a relatively lower temperature and the airflow $G_2$ exits the first heat exchanger 1310 at a relatively higher temperature. As shown in FIG. 1, the second heat exchanger 1330 is disposed downstream of the first heat exchanger 1310. The second heat exchanger 1330 also includes two closed flow paths. The first flow path receives the airflow $G_1$ and the second flow path receives the airflow including the substantially pure water vapor $G_3$ in route to the air pump 1210. The temperature of the water vapor flow $G_3$ after passing through the processor assembly 1400 is lower than the temperature of the airflow $G_1$ entering the second heat exchanger 1330. Therefore, a portion of heat is removed from the airflow $G_1$ and is transferred to the water vapor $G_3$. Thus, the airflow $G_1$ exits the second heat exchanger 1330 at a relatively lower temperature and the water vapor $G_3$ exits the second heat exchanger 1330 at a relatively higher temperature. In some embodiments, the temperature of the air flow $G_1$ at the exit of the second heat exchanger 1330 is between approximately 60 degrees Celsius and 70 degrees Celsius. Although the first heat exchanger 1310 and the second heat exchanger 1330 are described as including two closed flow paths, in some embodiments, the heat exchanger assembly 1300 can include one or more heat exchangers that include flow paths that are in direct contact. For example, a heat exchanger can be a chamber that receives two or more flows of a gas and includes two or more outlet flows. In such embodiments, the flow of gas can mix within the chamber thereby transferring a portion of heat from flows with a higher relative temperature to flows with a lower relative temperature.

The airflow $G_1$ exits the second heat exchanger 1330 at a temperature significantly lower than the temperature of the airflow $G_1$ exiting the air pump 1210 (yet still higher than an ambient temperature). As set forth above, the temperature drop of the airflow $G_1$ across the heat exchanger assembly 1300 can be approximately 30 degrees Celsius. Additionally, the heat exchanger assembly 1300 results in a pressure drop of the airflow $G_1$. In some embodiments, for example, the pressure drop caused by the heat exchanger assembly can be approximately 1.5 p.s.i. For example, in some embodiments, the airflow $G_1$ at the exit of the air pump 1210 can have a pressure of approximately 18 p.s.i.a. (i.e., approximately 3.3 p.s.i. gauge), and the airflow G1 at the entrance of the condenser assembly 1100 can have a pressure of approximately 16.5 p.s.i.a.

As shown in FIG. 1, after exiting the heat exchanger assembly 1300, the airflow $G_1$ is delivered to the condenser assembly 1100. The condenser assembly 1100 includes a housing that encloses a condenser element (not shown in FIG. 1). The housing of the condenser assembly 1100 defines an interior volume that receives the inlet air $G_1$. The condenser 1100 includes any structure and or mechanisms to transfer thermal energy between the airflow $G_1$ and the relatively colder ambient conditions. Similarly stated, the condenser element condenses the substantially pure water vapor within the airflow $G_1$ to produce the flow of purified liquid water $W_1$ that is substantially free of the solute. As described above, in some embodiments, a portion of the supply line 1075 can be disposed within the housing and/or the condenser element such that a portion of heat is transferred from the airflow $G_1$ to the inlet feed water $S_1$. In addition to removing heat from the condenser assembly 1100 and/or condenser element, warming the inlet feed water $S_1$ also allows for a more rapid absorption and/or atomization of the inlet feed water $S_1$ during evaporation, as described below.

As described above, the flow of the wet air $G_1$ across the surface of the condenser element removes a portion of heat from the air $G_1$ (and the water vapor contained within the air), and transfers the portion of heat to the condenser element and/or housing. More specifically, the temperature of the airflow $G_1$ as it flows along the surface of the condenser element is reduced from a first temperature at a first end portion of the condenser element to a second temperature at a second end portion of the condenser element, downstream of the first end portion. In some embodiments, the first temperature can be approximately 65 degrees Celsius and the second temperature can be approximately 55 degrees Celsius. The condenser assembly 1100 can also produce a pressure drop of, for example, approximately 1 p.s.i. In some embodiments, the housing of the condenser assembly 1100 can include one or more fins configured to transfer a portion of heat from the airflow $G_1$ to the ambient surroundings. The one or more fins increase the surface area of the housing, thereby increasing heat transfer efficiency. Thus, the airflow $G_1$ is cooled within the condenser assembly 1100, thereby producing a flow of air and water vapor (identified as $M_1$ in FIG. 1). The condensed mixture $M_1$ is then separated by the separator 1500 to produce a gaseous flow of substantially cooled, dry air $G_2$ and a flow of substantially purified water $W_1$ (e.g., desalinized water). The purified water $W_1$ can be collected in the collection reservoir 1060.

Although not shown in FIG. 1, in some embodiments, the condenser element includes one or more heat pipes. The heat pipes can be any suitable heat pipe of known configuration that transfers heat between portions of the condenser assembly 1100. For example, the heat pipe can be a gravity action heat pipe, a capillary action heat pipe or the like. The heat pipe has a first end portion and a second end portion, and a substantially adiabatic section therebetween. The heat pipe contains a working fluid, such as for example, water, acetone, ammonia, ethanol, and/or any other suitable fluid. In some such embodiments, the first end portion of one or more heat pipes (not shown) can be disposed within the condenser assembly 1100 and the second end portion of the one or more heat pipes can be disposed within a portion of the processor assembly 1400. In such embodiments, when the airflow $G_1$ flows across the first end portion of the heat pipe (e.g., within the condenser assembly 1100), heat is transferred from the airflow $G_1$ to the first end portion of the heat pipe (and subsequently the heat pipe working fluid) and/or the condenser element. The heat transfer causes the heat pipe working fluid to boil and liquid purified water $W_1$ to form, as mentioned above. The heat pipe working fluid boils at the temperature of the airflow $G_1$ due to the heat pipe being sealed and evacuated below atmospheric pressure. When the heat pipe working fluid is in the vapor phase, the vapor flows through a substantially adiabatic section of the heat pipe to the second end portion of the heat pipe (i.e., the end disposed within the processor assembly 1400). When the vaporized heat pipe working fluid is in the second end portion, heat is transferred from the vaporized heat pipe working fluid to the body of the heat pipe and subsequently can be transferred to the fluid (e.g., the inlet solution $S_1$, the water vapor $G_2$, and/or the mixture $M_2$) within the processor assembly 1400. This transfer of heat increases the temperature of the fluid flowing within the processor assembly 1400 (thereby increasing the amount of the inlet solution $S_1$ that can be absorbed into the water vapor $G_2$) and condenses the heat pipe working fluid back into a substantially liquid phase. The heat pipe working fluid then returns to the first end portion of the heat pipe. Thus, one or more heat pipes can enhance the efficiency of the condenser assembly 1100 and/or the vaporization process within the processing assembly 1400. Although the working fluid is described as reversing flow when changing from a vapor state to a liquid state, in other embodiments, a heat pipe can be configured as a loop style heat pipe, allowing the heat pipe working fluid to flow continuously between the various zones of high and low temperatures.

Upon exiting the condenser assembly 1100, cooled, substantially dry airflow $G_2$ passes to the first heat exchanger 1310. As described above, a portion of the heat from the compressed airflow $G_1$ is transferred to the flow of the substantially dry airflow $G_2$. Thus, the temperature of the airflow $G_2$ exiting the first heat exchanger 1310 is greater than the temperature of the airflow $G_2$ as the airflow $G_2$ exits the condenser assembly 1100. Upon exiting the first heat exchanger 1310, the substantially dry airflow $G_2$ is delivered to the processor assembly 1400, as shown in FIG. 1. In some embodiments, the temperature and pressure of the substantially dry airflow $G_2$ entering the processor assembly 1400 can be approximately 75 degrees Celsius and 15.5 p.s.i.a, respectively. In other embodiments, the pressure of the substantially dry airflow $G_2$ entering the processor assembly 1400 can be at a pressure below atmospheric pressure, which can enhance the evaporation process, as discussed below.

Although not shown in FIG. 1, the processor assembly 1400 includes a housing (or other structure that defines one or more enclosures), an evaporation assembly of the types shown and described herein (e.g., described in detail with reference to FIG. 2), and an atomizer assembly of the types shown and described herein (e.g., described in detail with reference to FIG. 3). As described in further detail below, the housing of the processor assembly also encloses one of the two separators 1500 included in the system 1000 (the second separator 1500 is included in or coupled to the condenser assembly 1100, as described above). The atomizer assembly receives the substantially dry airflow $G_2$ and the inlet solution $S_1$ to produce the mixture $M_2$ of the solution and the air. More specifically, the atomizer receives the inlet feed water $S_1$ from the fluid source 1070 via the supply line 1075. As described above, in some embodiments, the supply line 1075 can interact with any suitable portion of the system 1000 such that the temperature of the inlet solution $S_1$ contained therein is heated above ambient temperature. The atomizer also receives the substantially dry airflow $G_2$ that is heated above ambient temperature.

As described in further detail herein, in some embodiments, an atomizer can include an injector nozzle and a diffuser that can collectively define a mixing chamber. The injector nozzle is fluidically coupled to the supply line 1075. A portion of the injector nozzle defines a first flow path within which the inlet solution $S_1$ flows towards the mixing chamber. A second portion of the injector nozzle and a portion of the diffuser define a flow path within which the substantially dry airflow $G_2$ flows towards the mixing chamber. Thus, the inlet solution $S_1$ flows within the first flow path into the mixing chamber and the substantially dry airflow $G_2$ flows within the second flow path into the mixing chamber, thereby producing the mixture $M_2$. The injector nozzle can be any suitable nozzle, injector, spray head, broadcaster, or the like.

The diffuser can be any suitable device, mechanism, or component that is configured to direct at least a portion of the flow of the substantially dry airflow $G_2$ and/or at least a portion of the flow of the inlet solution $S_1$ before and/or after the mixing of the substantially dry airflow $G_2$ and the inlet solution $S_1$. In some embodiments, the diffuser can includes a set of vanes configured to produce a rotational velocity within the flow of the substantially dry airflow $G_2$. In other embodiments, the diffuser can include any suitable surface finish or feature configured to increase turbulence within the flow of the substantially dry airflow $G_2$.

The rotational velocity of the substantially dry airflow $G_2$ and/or the mixture $M_2$ (produced by the vanes) produces a cyclonic flow of the mixture $M_2$ that flows through an opening of the diffuser that is downstream of the mixing chamber. The diffuser includes a second portion configured to define a third flow path within which the mixture $M_2$ flows. The second portion of the diffuser can be any suitable configuration. For example, in some embodiments, the second portion of the diffuser includes a surface that diverges (e.g., at any suitable angle, such as, for example, about 20°, about 40°, about 60°, about 80°, about 100°, about 120°, about 140°, about 160°, or about 180°) along a longitudinal centerline of the diffuser. In some embodiments, the second portion of the diffuser can include one or more discontinuities along a surface of the second portion. For example, the second portion can include a set of shoulders, detents, grooves, protrusions, or the like. The arrangement of the discontinuities can reduce the amount of back flow of the mixture $M_2$ as the mixture $M_2$ flows along the second portion of the diffuser.

The flow of the mixture $M_2$ then enters the evaporation assembly included in the processor assembly 1400. In some embodiments, the evaporation assembly includes an inlet flow member and a diffuser of the types shown and described herein. Thus, the inlet flow member and the diffuser collectively define an evaporation volume. Moreover, a surface of the inlet flow member and a surface of the diffuser define a first flow path within which the mixture $M_2$ flows towards the evaporation volume. As described above, the diffuser and/or the inlet flow member can include and suitable surface and/or surface feature configured to direct at least a portion of the flow of the mixture $M_2$ prior to the mixture $M_2$ entering the evaporation volume. For example, a surface of the diffuser and/or a surface of the inlet flow member can produce a rotational velocity within the flow of the mixture $M_2$. The diffuser defines an opening downstream of the evaporation volume. The arrangement of the evaporation volume and the opening is such that the particle size of the mixture $M_2$ is further reduced as the mixture $M_2$ flows from the evaporation volume to the opening. For example, in some embodiments, the arrangement of the diffuser can be such that a pressure downstream of the evaporation volume is less than a pressure upstream of the evaporation volume. In such embodiments, the pressure drop can further reduce the particle size of the mixture $M_2$ and can enhance evaporation.

In some embodiments, the evaporation assembly of the processor assembly 1400 can include a set of inlet flow members and diffusers, of the types shown and described herein. Such evaporation assemblies can include a set of inlet flow member and diffuser pairs. The evaporation assemblies described herein are configured such that the particle size of the mixture $M_2$ is reduced as the mixture $M_2$ flows through the processor assembly 1400 towards the separator 1500. As described above, the separator 1500 is fluidically coupled to and/or enclosed by the housing of the outlet portion of the processor 1400 such that the substantially vaporized mixture $M_2$ flows from the processor 1400 into the separator 1500. The separator 1500 produces a gaseous flow containing substantially pure water vapor $G_3$ (i.e., substantially saturated air) and a flow of waste products $W_2$, including the solute, dissolved solids, and/or brine. The waste products $W_2$ can be collected in collection reservoir 1065.

The separator 1500 can include any structure and/or mechanism to separate the water vapor $G_3$ and the solid waste products $W_2$. In some embodiments, for example, the separator 1500 can include a series of structures and/or define a tortuous path to separate the heavier solute from the vapor and/or the purified solution. In other embodiments, the separator 1500 can include a centrifugal separation mechanism to separate the heavier solute from the vapor.

The water vapor $G_3$ exits the processor assembly 1400 and enters the second heat exchanger 1330. As described above, the water vapor $G_3$ has a temperature that is lower than the temperature of the airflow $G_1$. Thus, a portion of the heat of the inlet air $G_1$ is transferred to the water vapor $G_3$. Upon exiting the second heat exchanger 1330, the water vapor $G_3$ is fed back to the air flow assembly 1200. As discussed above, the system 1000 is a substantially closed loop system; thus, the air blower 1210 compresses the water vapor $G_3$ and the vent gases and/or vapor 1080 to produce the airflow $G_1$.

In some embodiments, the water desalinization system 1000 can include a control system (not shown in FIG. 1) to control the flow of air and or water within certain portions of the system. For example, the control system can include a set of components such as pressure sensors and adjustable valves to monitor and/or control the flow rate and pressure of air through the air pump 1210. Similarly, the flow rate, pressure, and/or saturation of the solution entering or exiting the atomizer assembly and/or the evaporator assembly can be controlled. In this manner, the saturation level of the mixture $M_2$ can be monitored and controlled either manually (i.e., direct user control) or via feedback using the control system.

As described above, the processor assembly 1400 and any of the water purification systems and methods described herein can include an evaporation assembly within which a solution is evaporated into a gas flow. FIG. 2 is a schematic illustration of an evaporation assembly 2470 according to an embodiment. As described above, the evaporation assembly 2470 can be one of multiple different types of evaporation assemblies included in a processor assembly (e.g., the processor assembly 1400 described above with reference to FIG. 1). The evaporation assembly 2470 receives a mixture $M_3$ of a gas (e.g., air) and a solution (e.g., unpurified water such as, for example, lake water, brackish water, salt water, industrial waste water or the like) to produce a vaporized portion $P_1$ of a solvent (e.g., the water) from the solution.

The evaporation assembly 2470 includes a diffuser 2471 having a first surface 2472, a second surface 2480, and defining a throat opening 2479, and an inlet flow member 2490 having a first surface 2491 and a second surface 2492. A first portion 2473 of the first surface 2472 of the diffuser 2471 and the first surface 2491 of the inlet flow member 2490 collectively define a first flow path 2477 within which the mixture $M_3$ can flow. A second portion 2474 of the first surface 2472 of the diffuser 2471 and the second surface 2492 of the inlet flow member 2490 collectively define an evaporation volume 2478. The second surface 2480 of the diffuser 2471 defines a second flow path 2482 within which the vaporized portion $P_1$ of the solvent can flow.

The diffuser 2471 can be any suitable device, mechanism, or component that is configured to define or direct at least a portion of a flow of the mixture $M_3$ and/or define or direct at least a portion of a flow of the vaporized portion $P_1$ of the solvent. The first surface 2472 of the diffuser 2471 can define or include any suitable surface and/or surface feature configured to direct, at least partially, the flow of the mixture $M_3$. For example, as shown in FIG. 2, the first portion 2473 of the first surface 2472 of the diffuser 2471 includes a set of vanes 2475 that extend from the first surface 2472. The vanes 2475 can be arranged to define at least a portion of the flow characteristic of the mixture $M_3$. For example, as shown in FIG. 2, the vanes 2475 produce a rotational velocity within the flow of the mixture $M_3$ flowing within the first flow path 2477. The rotational velocity component of the flow of the mixture $M_3$ can, for example, enhance the vaporization and/or evaporation of the mixture $M_3$. Moreover, the rotational velocity produced by the vanes 2475 produces a cyclonic flow of the mixture $M_3$ and/or the vaporized portion $P_1$ that flows downstream of the evaporation volume 2478 and through the throat opening 2479 of the diffuser 2471.

The vanes 2475 can include any suitable geometry to produce the desired characteristics in the flow of the mixture $M_3$. For example, in some embodiments, the vanes 2475 can be angled relative to the longitudinal centerline $C_1$ of the diffuser 2471 such that the resulting velocity of the flow of the mixture $M_3$ has both a rotational component and an axial component. In some embodiments, for example, the vanes 2475 and the longitudinal centerline $C_1$ can define an angle of approximately 75 degrees, of less than 75 degrees, of approximately 60 degrees, of less than approximately 60 degrees, of approximately 45 degrees or less than approximately 45 degrees.

The first surface 2472 of the diffuser 2471 defines a circumferential opening between the first flow path 2477 and the evaporation volume 2478. More specifically, the vanes 2475 include a leading edge that defines the circumferential opening. Similarly, the throat opening 2479 of the diffuser 2471 is a circumferential opening disposed between the evaporation volume 2478 and the second flow path 2482. In some embodiments, the diameter of the circumferential opening of the first surface 2472 is larger than the diameter of the throat opening 2479, thereby reducing and/or eliminating a choke point (e.g., a point where the flow is slowed, choked, reduced, or otherwise limited) of the flow of the mixture $M_3$. In some embodiments, the ratio of the diameter of the circumferential opening of the first surface 2472 and the diameter of the throat opening 2479 can be between about 0.7 and 0.9. In other embodiments, the ratio can be larger than about 0.9 (e.g., 1.0, 1.25, 1.5, 2.0, or any fraction therebetween). In still other embodiments, the ratio can be smaller than 0.7 (e.g., 0.6, 0.5, 0.4, 0.3, 0.2, 0.1, or any suitable fraction therebetween).

Figure 2:
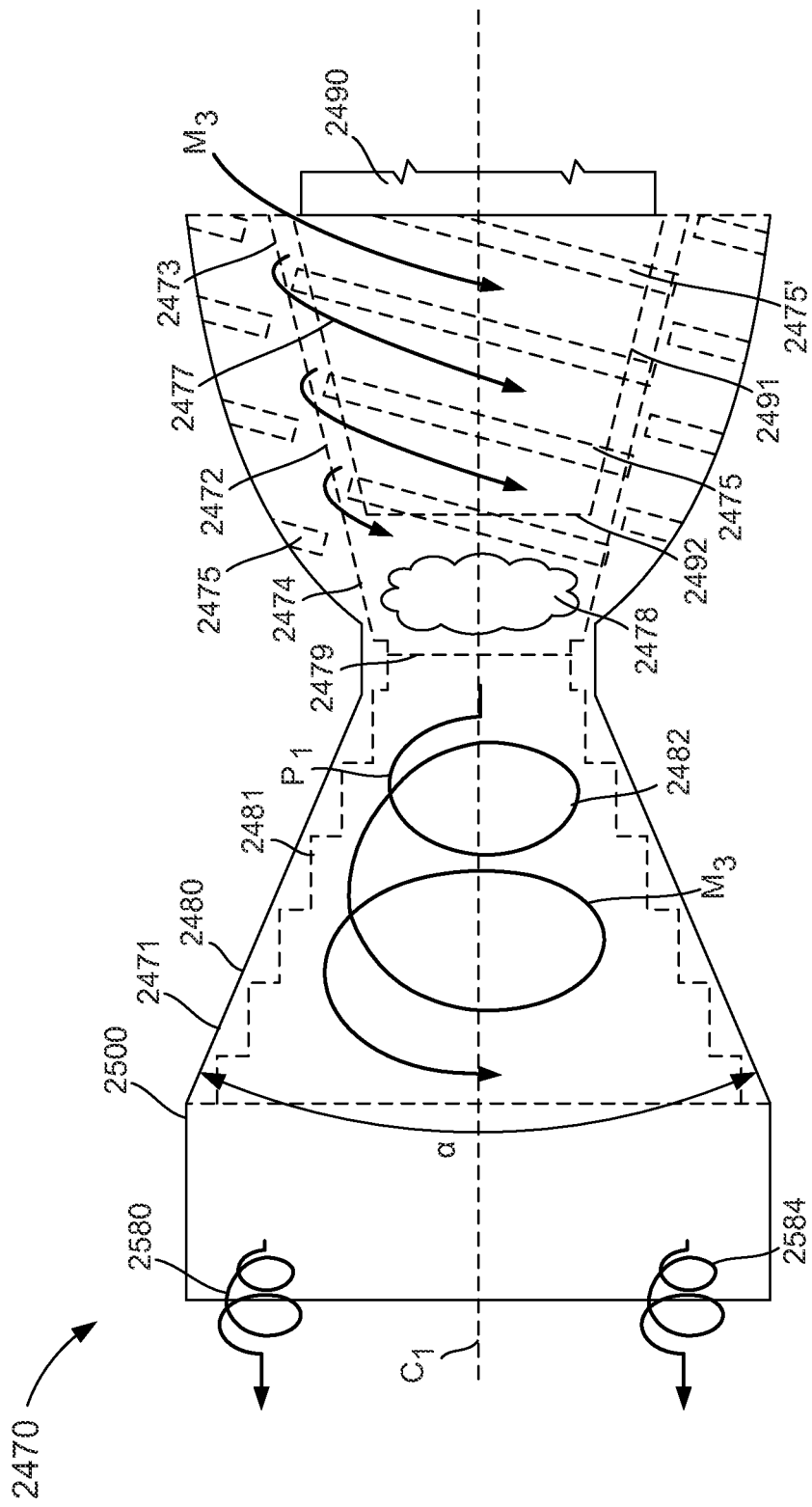
FIG. 2 is a schematic illustration of an evaporator assembly according to an embodiment.
Figure 3:
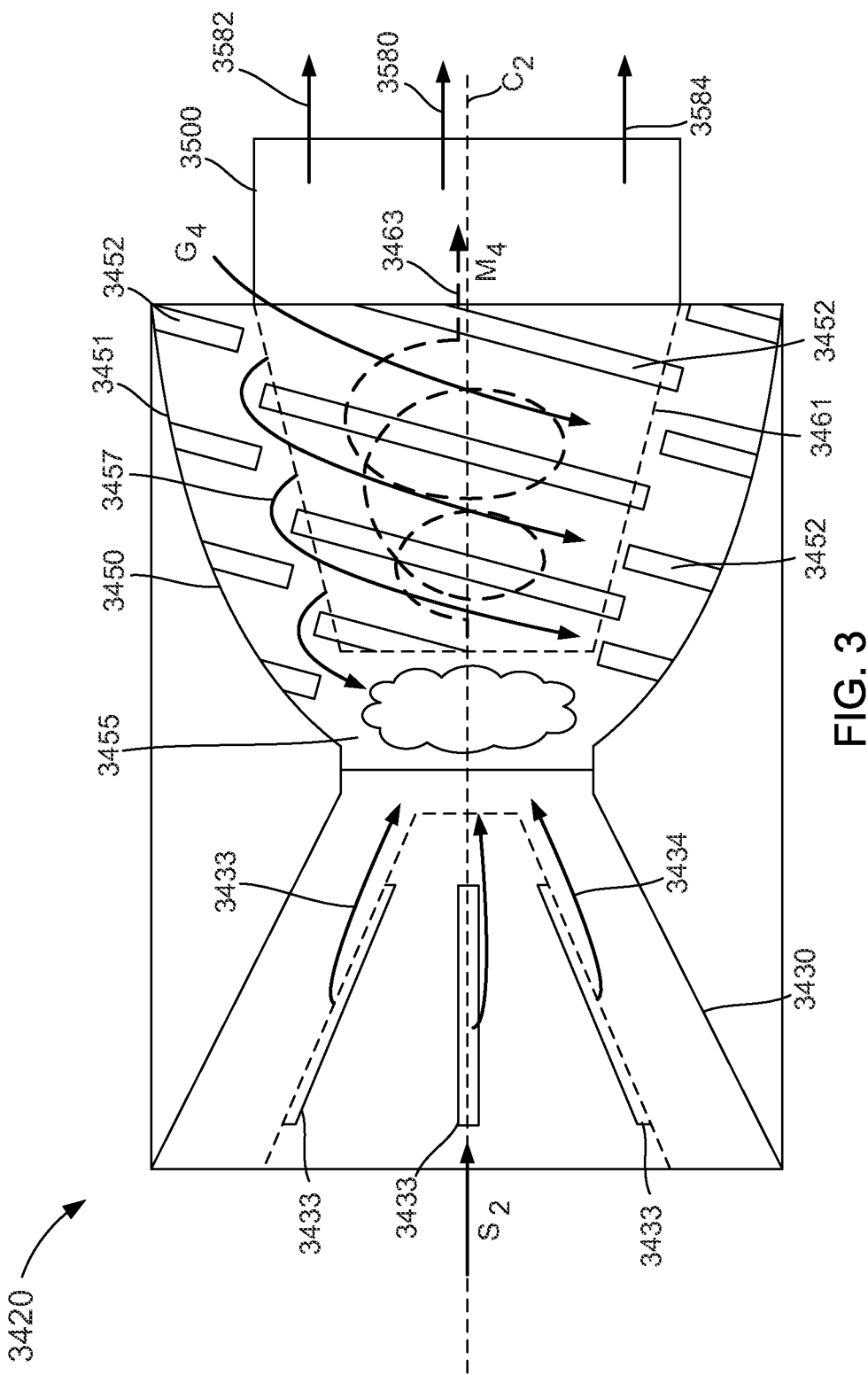
FIG. 3 is a schematic illustration of an atomizer assembly according to an embodiment.

Although the vanes 2475 are shown in FIG. 2 as extending from an inner surface (i.e., the first surface 2472), in other embodiments, the vanes 2475 can extend from an outer surface of the diffuser 2471 (see e.g., the vanes 2475'). In some embodiments, the inlet flow member 2490 can include a feature substantially similar to or the same as the vanes 2475 and the first surface 2472 of the diffuser 2471 can be substantially smooth (i.e., the first surface 2472 does not include the vanes 2475). In some embodiments, the diffuser 2471 and/or the inlet flow member 2490 can include any other suitable feature that increases turbulence within the flow of the mixture $M_3$ flowing within the first flow path 2477. For example, in some embodiments, the diffuser 2471 and/or the inlet flow member 2490 can define a pitted surface finish; define a set of detents or channels; include a set of protrusions; and/or include any suitable combination thereof.

As described above, the second surface 2480 of the diffuser 2471 defines a second flow path 2482 within which at least a portion of the mixture $M_3$ and/or the vaporized portion $P_1$ of the solvent flows. The second surface 2480 of the diffuser 2471 can be any suitable shape or configuration. For example, in some embodiments, the second surface 2480 of the diffuser 2471 diverges along a longitudinal centerline $C_1$ of the diffuser 2471. Similarly stated, the second surface 2480 of the diffuser 2471 extends in a substantially conical direction away from the throat opening 2479. In some embodiments, the second surface 2480 can have a divergence angle (also referred to as the total diffusion angle α) of about 95° to about 105°. In other embodiments, the second surface 2480 can diverge from the longitudinal centerline $C_1$ at any suitable angle, such as, for example, about 20°, about 40°, about 60°, about 80°, about 120°, about 140°, about 160°, or about 180°. Thus, the diameter of the second surface 2480 adjacent to the throat opening 2479 is smaller than the diameter of the second surface 2480 at a point along the longitudinal centerline $C_1$ that is downstream of the throat opening 2479.

The divergence of the second surface 2480 is such that the area between the throat opening 2479 within a plane substantially normal to the longitudinal centerline $C_1$ of the diffuser 2471 increases as the plane is moved in a downstream direction relative to the throat opening 2479. Similarly stated, the flow area defined by the second surface 2480 of the diffuser 2471 increases along the longitudinal centerline $C_1$. The increase in the flow area defined by the second surface 2480 of the diffuser 2471 decreases the pressure at the throat opening 2479. Thus, the pressure drop draws the mixture through the throat opening 2479 and further reduces the particle size of the mixture $M_3$. Moreover, the reduction of the particle size of the mixture $M_3$ saturates the portion of the mixture $M_3$ comprised of gas, thereby separating a portion of the solute in the solution from the solvent. Similarly stated, the volume of the mixture $M_3$ comprised of the vaporized portion $P_1$ of the solvent is increased.

Although in some embodiments, the second surface 2480 can be substantially smooth and/or free of discontinuities, in other embodiments, the second surface 2480 of the diffuser 2471 includes one or more discontinuities. For example, as shown in FIG. 2, the second surface 2480 can include or define a set of shoulders 2481 (shown in dashed lines). In other embodiments, the second surface 2480 can include or define a set of detents, grooves, protrusions, or the like. The arrangement of the shoulder 2481 reduces the amount of back flow of the mixture $M_3$ and/or the vaporized portion $P_1$ of the solvent as the mixture $M_3$ flows along the longitudinal centerline $C_1$ of the diffuser 2471. Expanding further, the cyclonic rotation of the mixture $M_3$ as the mixture $M_3$ flows from the throat opening 2479 along the longitudinal center $C_1$ of the diffuser 2471 conveys the larger particles and/or the more dense particles of the mixture $M_3$ onto the second surface 2480 of the diffuser 2471. Because the throat opening 2479 is an area of localized low pressure, such particles flow along the second surface 2480 toward the throat opening 2479 (e.g., a reverse flow). Thus, the shoulders 2481 included in or defined by the second surface 2480 produce a build-up of the particles disposed on each shoulder 2481. Moreover, when the build-up of the particles reaches a given threshold, at least a portion of the particles flow from and/or detach from the given shoulder 2481. When the portion of the particles move toward the throat opening 2479 from one shoulder 2481 to an adjacent shoulder 2481 at least a portion of the particles become entrained in the mixture $M_3$ and/or the vaporized portion $P_1$ of the solvent and flow within the second flow path 2481. In this manner, the re-entrained particles can be systematically exposed to the primary flow thereby allowing for a more thorough evaporation process. Moreover, in some embodiments, the shoulders 2481 and/or discontinuities can be substantially circumferential. This arrangement causes any reverse-flow portion of the solution to be evenly distributed (circumferentially) when being re-introduced into the primary flow.

As shown in FIG. 2, the separator 2500 is fluidically coupled to the second flow path 2482. In some embodiments, the separator 2500 and the evaporation assembly 2470 are disposed in adjacent positions within a processor housing with the separator 2500 being downstream of the evaporation assembly 2470. The separator 2500 produces a gaseous flow of water vapor 2580 (i.e., substantially saturated air) and a flow of near solid waste products 2584, including the solute, dissolved solids, and/or brine. The waste products 2584 can each be collected in a collection reservoir (not shown in FIG. 2).

Although not shown, the separator 2500 can include any structure and/or mechanism to separate the water vapor 2580 (e.g., the vaporized portion $P_1$ of the solvent) and the solid waste products 2584. In some embodiments, for example, the separator 2500 can include a series of structures and/or define a tortuous path to separate the heavier solute from the vapor and/or the purified solution. In other embodiments, the separator 2500 can include a centrifugal separation mechanism to separate the heavier solute from the vapor.

Although a single evaporator assembly 2470 is shown in FIG. 2, in some embodiments, any suitable numbers of evaporator assemblies 2470 can be disposed adjacent to one another. In such embodiments, the mixture $M_3$ and/or the vaporized portion $P_1$ of the solvent can be serially passed from one a first evaporation assembly 2470 to an adjacent evaporation assembly 2470.

As described above, the processor assembly 1400 and any of the water purification systems and methods described herein can include an atomizer assembly within which a solution is atomized into a gas flow. FIG. 3 is a schematic illustration of an atomizer assembly 3420 according to an embodiment. As described above, the atomizer assembly 3420 can be included in a processor assembly (e.g., the processor assembly 1400 described above with reference to FIG. 1). The atomizer assembly 3420 receives a gas $G_4$ (e.g., air, water vapor, or the like) and a solution $S_2$ (e.g., unpurified water such as, for example, industrial wastewater, lake water, brackish water, salt water, or the like) to produce an at least partially atomized mixture $M_4$ of the gas $G_4$ and the solution $S_2$.

The atomizer assembly 3420 includes an injector nozzle 3430 and a diffuser 3450 that collectively define, at least partially, a mixing chamber 3455. The injector nozzle is fluidically coupled to the supply line (not shown in FIG. 4) such that a flow of the solution $S_2$ is delivered to the injector nozzle 3430. The injector nozzle 3430 can be any suitable nozzle, injector, spray head, broadcaster, or the like. For example, as shown in FIG. 3, the injector nozzle 3430 defines a set of elongate openings 3433 that extend along a surface of the injector nozzle 3433 and within which the inlet solution $S_2$ can flow. More particularly, the elongate openings 3433 of the injector nozzle 3433 define at least a portion of a flow path 3434 within which the solution $S_2$ flows towards the mixing volume 3455. Thus, the flow of the inlet solution $S_2$ enters the injector nozzle 3430 and is divided among the elongate openings 3433 to enhance the atomization of the inlet solution $S_2$, as described in further detail herein.

The diffuser 3450 can be any suitable device, mechanism, or component that is configured to direct at least a portion of the flow of the gas $G_4$ prior to entering the mixing chamber 3455 and/or configured to direct at least a portion of the mixture $M_4$ after exiting mixing chamber 3455. More specifically, a first surface 3451 of the diffuser 3450 defines a flow path 3457 within which the gas $G_4$ flows towards the mixing volume 3455. As shown in FIG. 3, the first surface 3451 of the diffuser 3450 includes and/or defines a set of vanes 3452. The vanes 3452 can be arranged to define at least a portion of the flow characteristic of the gas $G_4$ flowing within the flow path 3457. For example, the vanes 3452 can produce a rotational velocity within the flow of the gas $G_4$ that can enhance the atomization of the gas $G_4$ and/or the inlet solution $S_2$. Thus, the inlet solution $S_2$ flows within the flow path 3434 into the mixing chamber 3455 and the gas $G_4$ flows within the flow path 3457 into the mixing chamber 3455, thereby producing the mixture $M_4$. Moreover, the rotational velocity produced by the vanes 3452 produces a cyclonic flow of the mixture $M_4$ that flows downstream of the mixing chamber 3455, as described in further detail herein.

Although the flow path 3434 defined by the injector nozzle 3430 and the flow path 3457 defined by the first surface 3451 of the diffuser 3461 are shown in FIG. 3 as being in opposing directions, in other embodiments, the flow path 3434 defined by the injector nozzle 3430 and the flow path 3457 defined by the first surface 3451 of the diffuser 3450 can be in substantially similar directions. In such embodiments, the arrangement of the vanes 3452 of the diffuser 3450 and the elongate openings 3433 of the injector nozzle 3430 are such that when the gas $G_4$ enters the mixing chamber 3455, the flow of the gas $G_4$ is substantially perpendicular to the flow of the inlet solution $S_2$. As described above, the elongate openings 3433 divide the flow of the inlet solution $S_2$, thereby increasing the surface area of the inlet solution $S_2$ that is in direct contact with the flow of the gas $G_4$. This arrangement enhances the atomization of the gas $G_4$ and the inlet solution $S_2$.

The second surface 3461 of the diffuser 3450 defines a second flow path 3463 within which the mixture $M_4$ flows. The second surface 3461 of the diffuser 3450 can be any suitable configuration. For example, as shown in FIG. 3, the second surface 3461 of the diffuser 3450 diverges along a longitudinal centerline $C_2$ of the diffuser 3450. Similarly stated, the second surface 3461 of the diffuser 3450 extends in a substantially conical direction away from the mixing chamber 3455. In some embodiments, the second surface 3461 can have a divergence angle (also referred to as the total diffusion angle) of about 95° to about 105°. In other embodiments, the second surface 3461 can diverge from the longitudinal centerline $C_2$ at any suitable angle, such as, for example, about 20°, about 40°, about 60°, about 80°, about 120°, about 140°, about 160°, or about 180°. Thus, the diameter of the second surface 3461 adjacent to the mixing chamber 3455 is smaller than the diameter of the second surface 3461 at a point along the longitudinal centerline $C_2$ that is downstream of the mixing chamber 3455.

The divergence of the second surface 3461 is such that the area between the mixing chamber 3455 within a plane substantially normal to the longitudinal centerline $C_2$ of the diffuser 3450 increases as the plane is moved in a downstream direction relative to the mixing chamber 3455. Similarly stated, the flow area defined by the second surface 3461 of the diffuser 3450 increases along the longitudinal centerline $C_2$. The increase in the flow area defined by the second surface 3461 of the diffuser 3450 decreases the pressure at the mixing chamber 3455. Thus, the pressure drop draws the mixture $M_4$ into the second flow path 3463 and further reduces the particle size of the mixture $M_4$. Moreover, the reduction of the particle size of the mixture $M_4$ saturates the portion of the mixture $M_4$ comprised of gas, thereby separating a portion of the solute in the solution $S_2$ from the solvent. Similarly stated, the volume of the mixture $M_4$ comprised of an atomized portion of the solvent is increased.

As shown in FIG. 3, the separator 3500 is fluidically coupled to the second flow path 3463. In some embodiments, the separator 3500 and the atomizer assembly 3420 are disposed in adjacent positions within a processor assembly (e.g., within a processor housing) with the separator 3500 being downstream of the atomizer assembly 3420. The separator 3500 produces a gaseous flow of water vapor 3580 (i.e., substantially saturated air), a flow of substantially purified water 3582 (e.g., desalinized water), and a flow of near solid waste products 3584, including the solute, dissolved solids, and/or brine. The purified water 3582 and the waste products 3584 can each be collected in a collection reservoir (not shown in FIG. 3).

Although not shown, the separator 3500 can include any structure and/or mechanism to separate the water vapor 3580, the substantially purified water 3582, and the solid waste products 3584. In some embodiments, for example, the separator 3500 can include a series of structures and/or define a tortuous path to separate the heavier solute from the vapor and/or the purified solution. In other embodiments, the separator 3500 can include a centrifugal separation mechanism to separate the heavier solute from the vapor.

FIGS. 4-38 illustrate a water purification system 4000 according to an embodiment. As described in more detail herein, the system 4000 is configured to receive an inlet flow of water containing a solute (e.g., industrial wastewater, water produced by a hydraulic fracturing operation, seawater or the like) and produce a flow of water substantially free of the solute (e.g., desalinated water, or water that is free other dissolved solids). In particular, inlet air, which contains substantially pure water vapor, is processed and/or a flow is produced by the air flow assembly 4200 and is passed through the heat exchanger assembly 4300 to remove a portion of heat produced by the compression produced by the air flow assembly 4200. Upon exiting the heat exchanger assembly 4300, the cooled inlet air is passed to the condenser assembly 4100 where the air is further cooled, thereby condensing a portion of the air to produce a flow of air and water vapor. The condensed mixture is then separated by one of the separators 4500 to produce a gaseous flow of substantially dry, cool air and a flow of substantially purified water (e.g., desalinized water). The output of substantially purified water is shown by the arrow AA in FIGS. 4 and 5. The purified water is collected in one or more collection reservoirs (not shown). The water vapor is again passed through a portion of the heat exchanger assembly 4300, thereby increasing the temperature of the substantially dry air. The heated, substantially dry air is passed to the processor assembly 4400 and is mixed with the inlet solution (i.e., the feedwater) to form a mixture of air, water vapor and concentrated brine solution. The mixture is then separated by one of the separators 4500 to produce a gaseous flow of water vapor and a flow of waste products. The output of waste products is shown by the arrow BB in FIG. 4. The waste products are collected in one or more collection reservoirs. The water vapor is then conveyed to the air flow assembly 4200, where the air processor 4200 processes the water vapor to produce the flow of the air through the system. As discussed below, the system 4000 is a substantially closed loop system configured to recycle the thermal energy resulting from the condensation and/or evaporation of the inlet air and/or the water vapor therein to improve the efficiency of the system.

Figure 4:
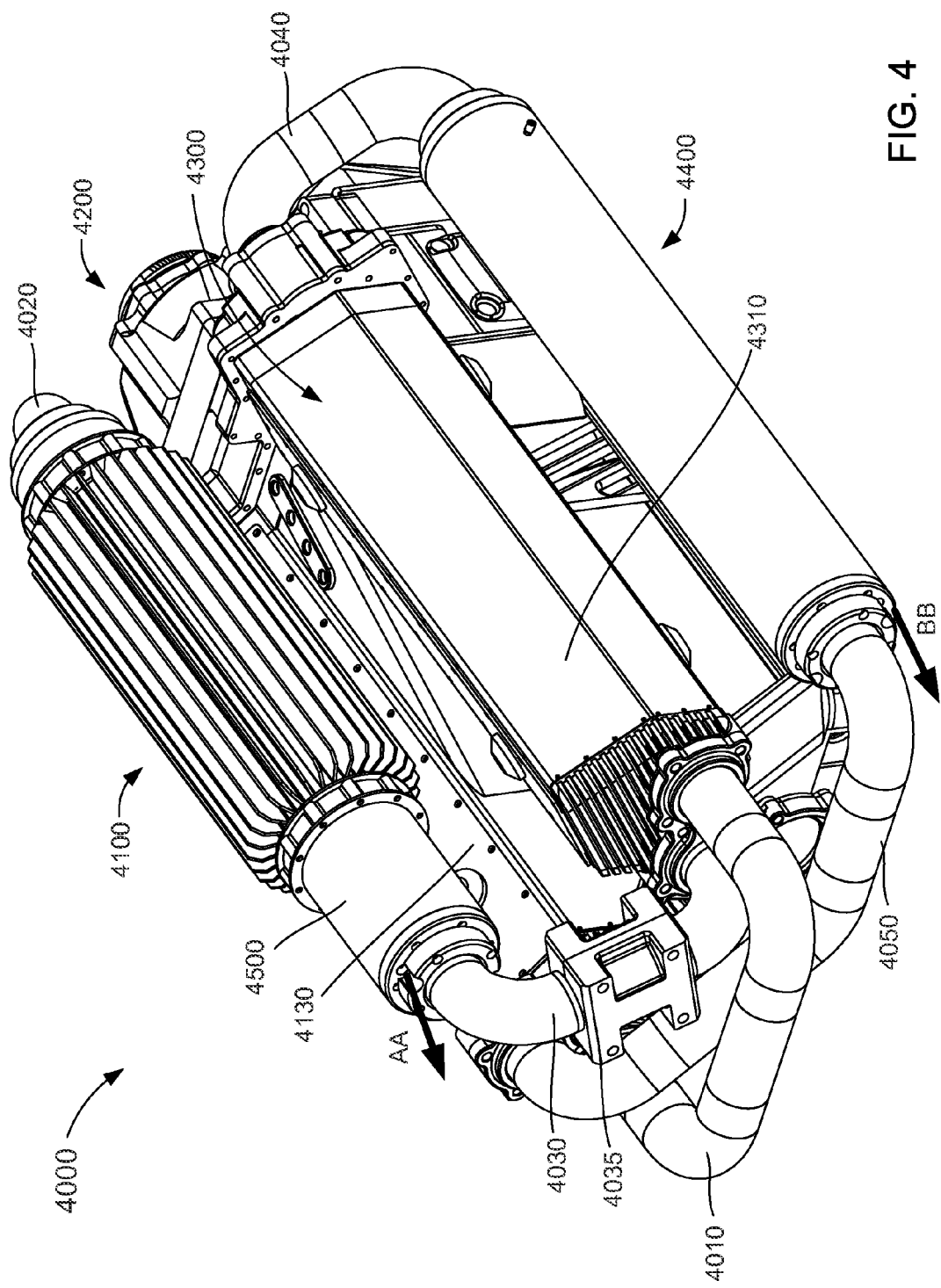
FIGS. 4-6 are various perspective views of a water purification system according to an embodiment.
Figure 5:
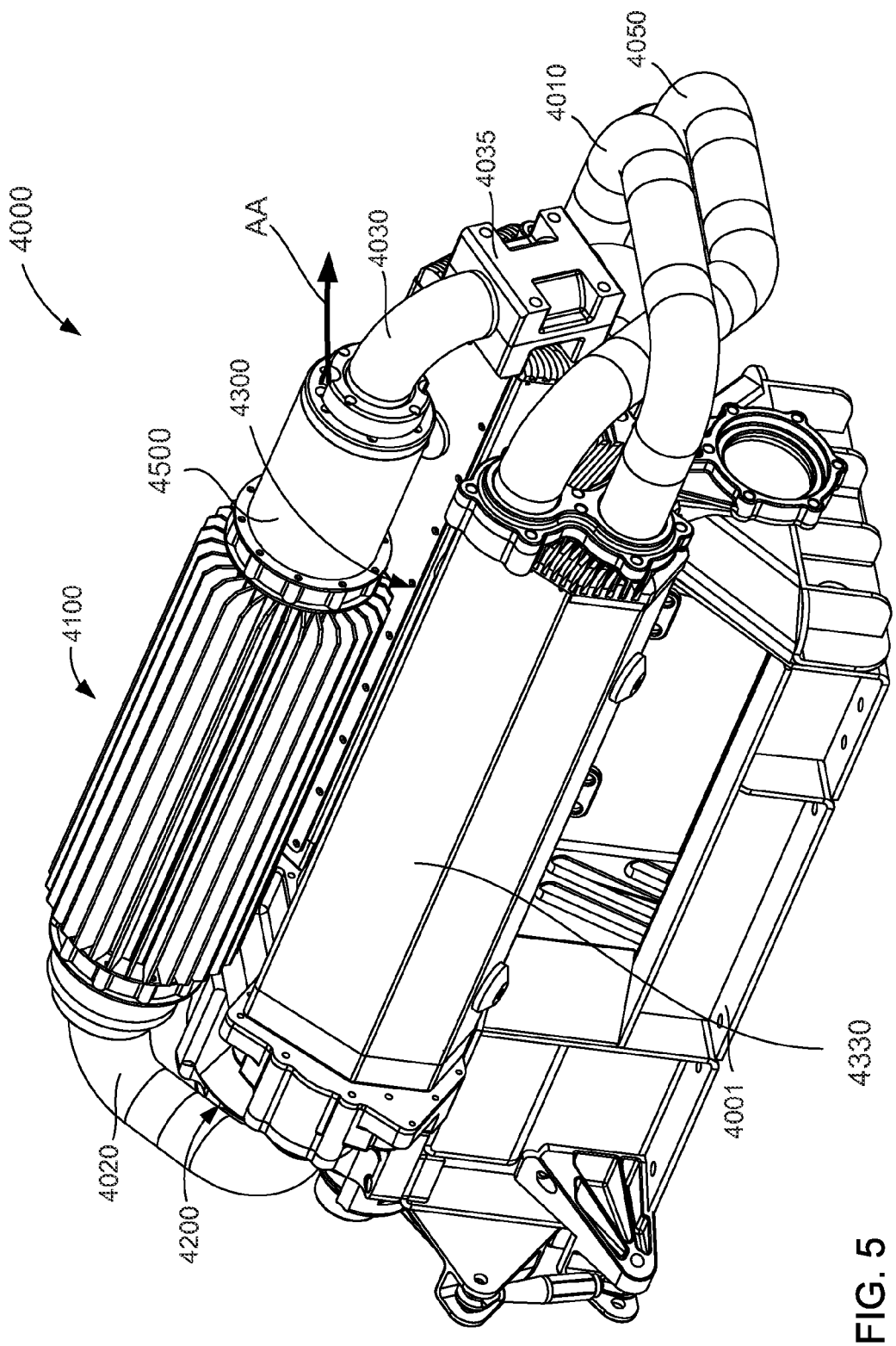
Figure 6:
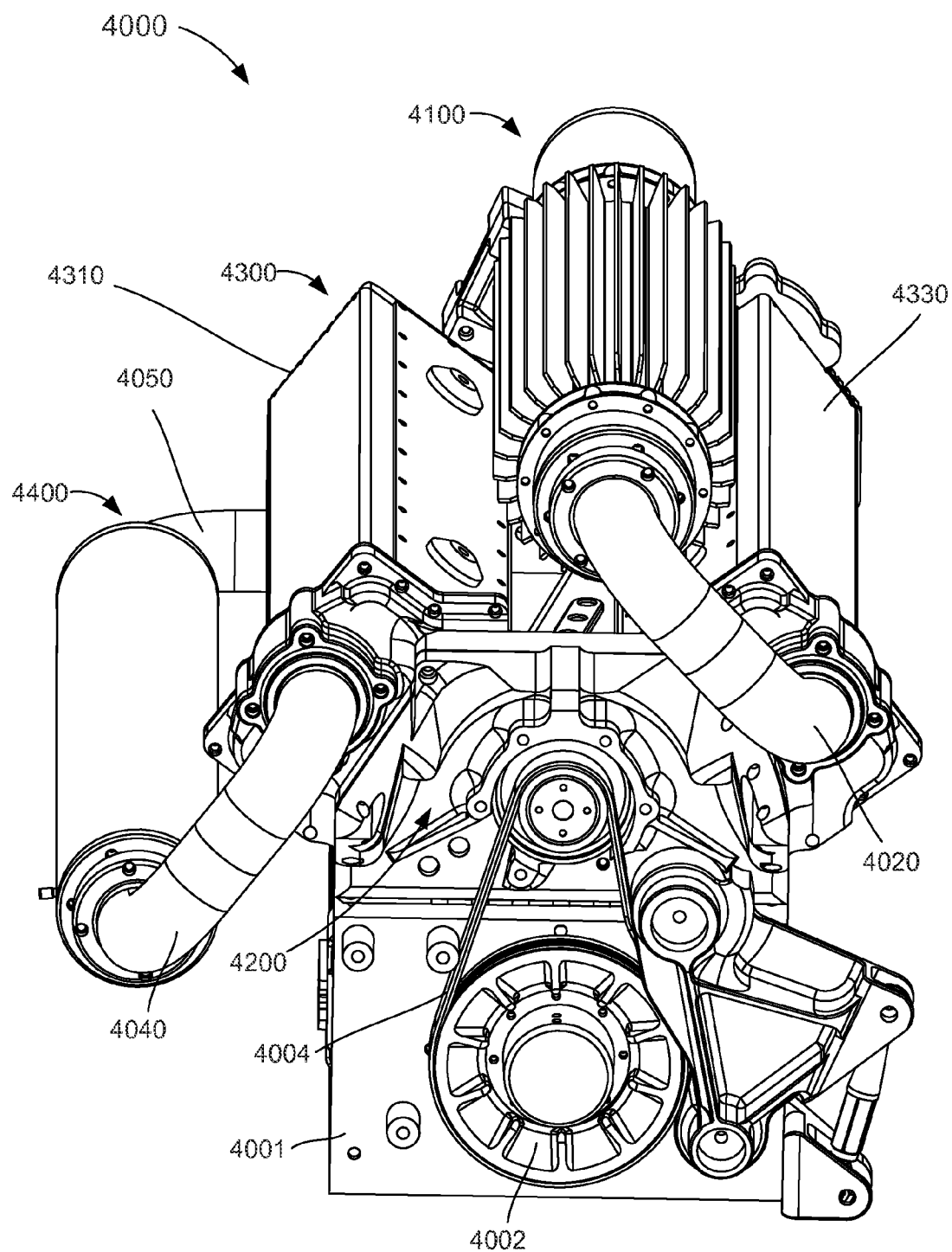

The system 4000 includes an air flow assembly 4200 (see e.g., FIGS. 7 and 8), a heat exchanger assembly 4300 (see e.g., FIGS. 9-11), a condenser assembly 4100 (see e.g., FIGS. 12 and 13), a processor assembly 4400 (see e.g., FIGS. 14-34), and a pair of separator assemblies 4500 (see e.g., 35-38). FIGS. 4-6 are perspective views of the system 4000. As shown, the system 4000 is supported by and/or coupled to a frame 4001. The frame 4001 encloses, at least partially, a motor (not shown) such that a drive pulley 4002 extends from the rear of the frame 4001. The drive pulley 4002 engages a belt 4004 that is operatively coupled to a portion of the air flow assembly 4200 (see e.g., FIG. 6). The frame 4001 can contain various protrusions, tensioners, extrusions, and/or bolt-on components, which are not described in detail herein, to facilitate the interaction and/or interconnection of the components of the desalinization system 4000 described herein. For example, while not shown in FIGS. 4-38, the frame 4001 can house or substantially enclose one or more reservoirs that can receive a flow of the purified water and/or a flow of the waste products. Furthermore, any existing shape, size, form, material, and/or the like can be modified to tune the system. The use of the word "tune" used herein relates to the changing of system parameters such that a desired effect is achieved in the functioning, appearance, weight, efficiency, and/or the like. For example, the shape, size, and position of the tensioner can be modified, resulting in overall weight reduction of the system, thereby increasing portability.

As shown in FIGS. 4-6, the assemblies included in the system 4000 are interconnected via a set of ducts and/or pipes. The set of pipes defines at least a portion of a flow path that fluidically couples, either directly or indirectly, the air flow assembly 4200, the heat exchanger assembly 4300, the condenser assembly 4100, the processor assembly 4400, and/or the separators 4500. More specifically, the system 4000 includes a heat exchanger pipe 4010 that fluidically couples an outlet of a first heat exchanger 4310 to an inlet of a second heat exchanger 4330 (see e.g., FIG. 4); a condenser inlet pipe 4020 that fluidically couples an outlet of the second heat exchanger 4330 to an inlet of the condenser assembly 4100 (see e.g., FIGS. 5 and 6); a condenser outlet pipe 4030 that fluidically couples an outlet of the condenser assembly 4100 to an inlet of the first heat exchanger 4310 and includes a sensor port 4035 configured to receive any suitable diagnostic instrument; a processor inlet pipe 4040 that fluidically couples a second outlet of the first heat exchanger 4310 to an inlet of the processor assembly 4400; and a processor outlet pipe 4050 that fluidically couples an outlet of the processor assembly 4400 to a second inlet of the second heat exchanger 4330. Thus, a flow of a fluid (e.g., dry air, saturated air, water vapor, liquid solution, or the like) can flow within the flow path defined by the set of pipes between each of the distinct assemblies included in the system 4000, as described in detail herein.

Figure 7:
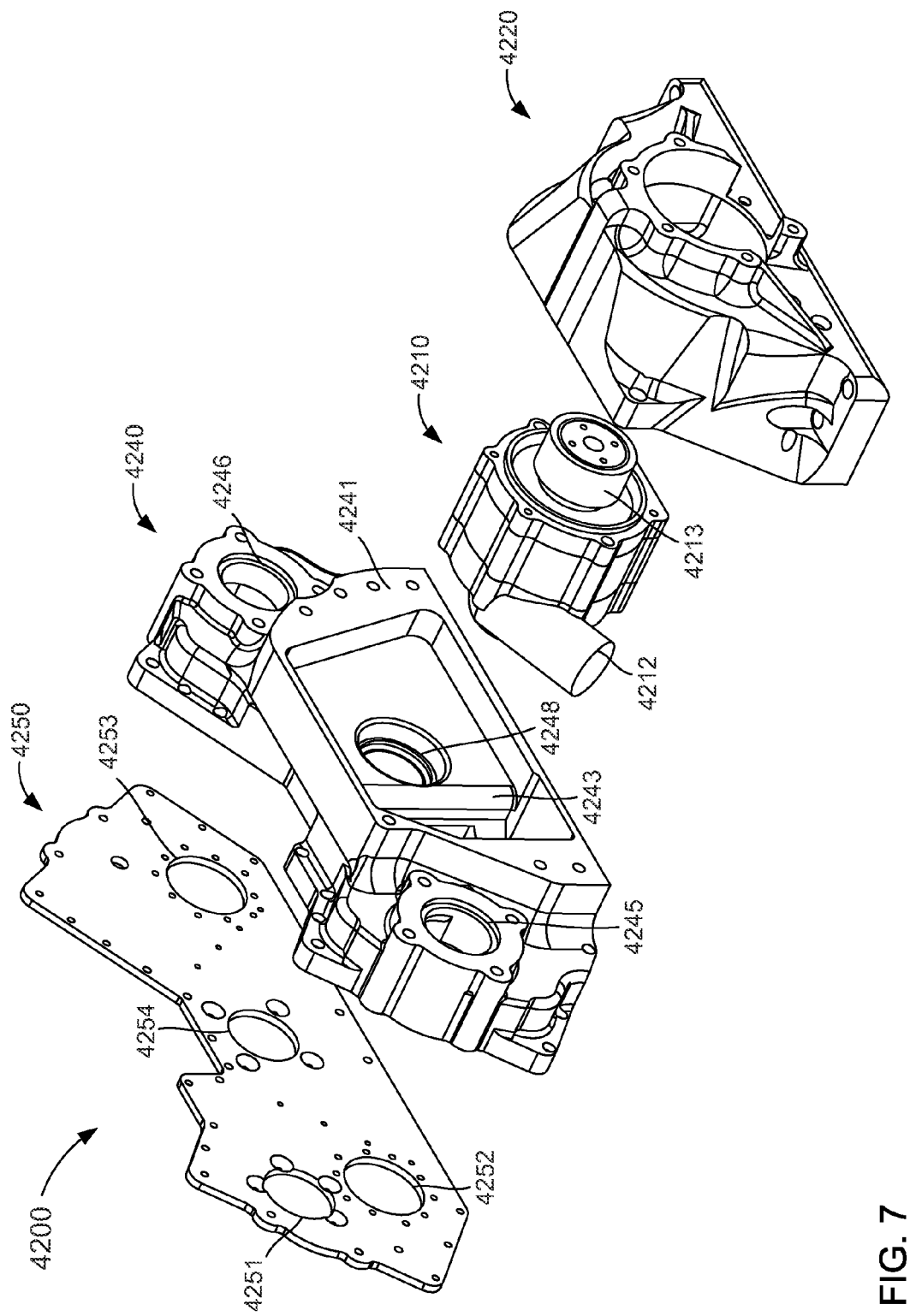
FIGS. 7 and 8 are a front exploded view and a rear exploded view, respectively, of an air flow assembly included in the water purification system of FIG. 4.
Figure 8:
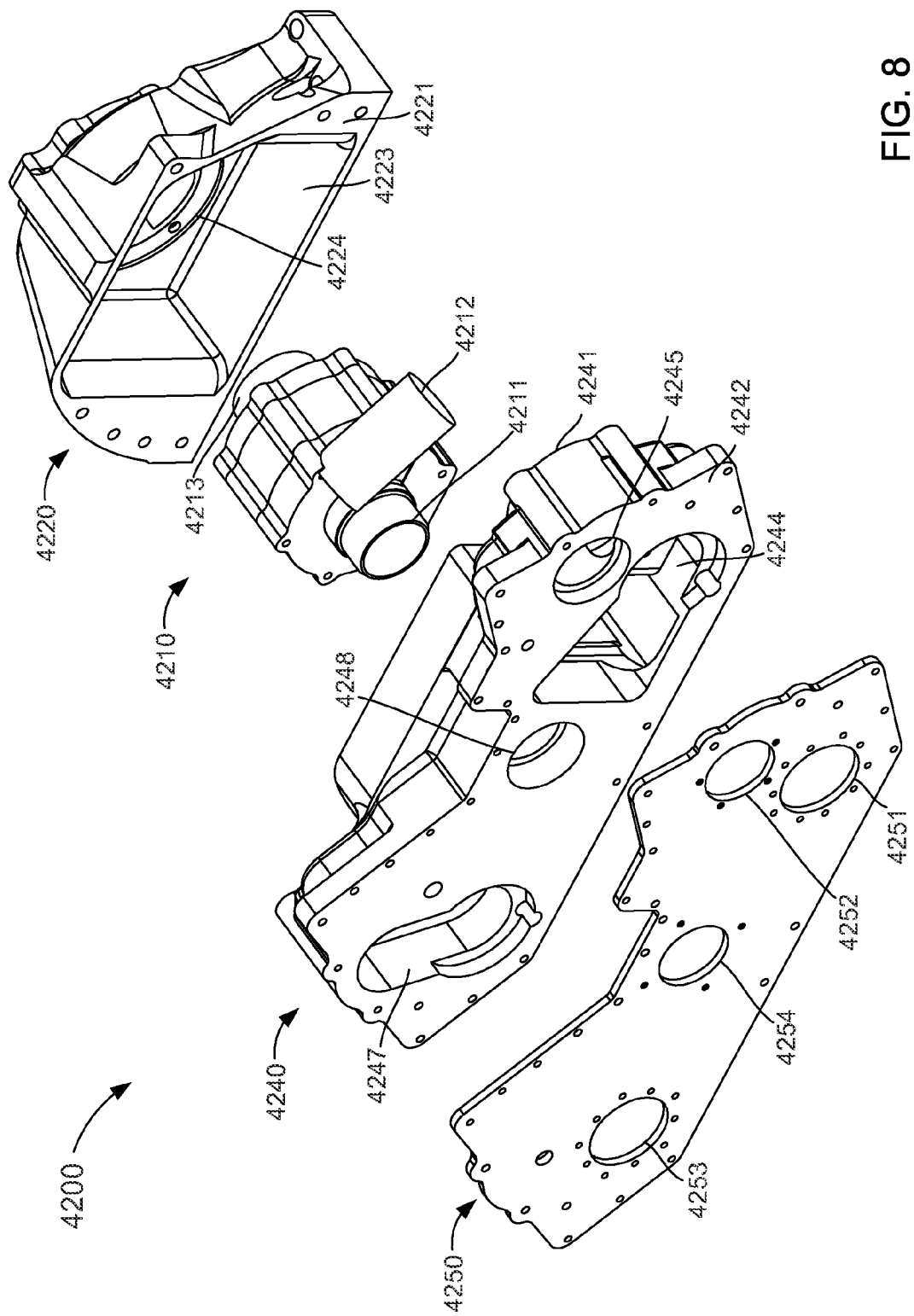

FIGS. 7 and 8 are exploded views of the air flow assembly 4200. The air flow assembly 4200 circulates a gas and/or produces a flow of a gas (e.g., air) within the system 4000. The air flow assembly 4200 includes the air pump 4210, a pump housing 4220, an adapter 4240, and an adapter plate 4250. The air pump 4210 includes an inlet portion 4211, an outlet portion 4212, and a drive portion 4213. The drive portion 4213 of the air pump 4210 is operatively coupled to the drive belt 4004 described above. In other embodiments, the air pump 4210 can be driven by a fluid machine (e.g., a turbine powered by shop air or the like). The inlet portion 4211 of the air pump 4210 receives a flow of a gas which is then compressed an expelled out of the outlet portion 4212 at a higher pressure.

The air pump 4210 can be any suitable fluid machine. For example, the air pump 4210 can be a centrifugal pump or blower that produces a flow of air (e.g., inlet air) having a flow rate of between 30 cubic feet per minute and 3000 cubic feet per minute and a pressure of between 3 p.s.i. and 40 p.s.i. In some embodiments, the air pump 4210 can produce a pressurized airflow within a plenum or the like having a pressure of approximately 5 p.s.i. at a flow rate of approximately 300 cubic feet per minute. The air pump 4210 can be any suitable pump, such as for example, a Rotex C30-74 supercharger. Although the air pump 4210 is shown and described as producing a pressure of less than 40 p.s.i., in other embodiments, the air pump 4210 can produce any desired range of pressure.

The pump housing 4220 includes an engagement surface 4221, a mounting surface 4224, and defines an inner volume 4223. The air pump 4210 is at least partially disposed within the inner volume 4223 of the pump housing 4220 and is coupled to (e.g., mechanically fastened to) the mounting surface 4224. The engagement surface 4221 is coupled to a first surface 4241 of the adapter 4240. More specifically, the pump housing 4220 is coupled to the adapter 4240 and forms a substantially air tight seal between the engagement surface 4221 of the pump housing 4220 and the first surface 4241 of the adapter 4240.

The first surface 4241 defines an inner volume 4243, a first outlet opening 4245, a second outlet opening 4246, and a return opening 4248. The inner volume 4243 receives and encloses at least a portion of the air pump 4210. The first outlet opening 4245 is in fluid communication with a second outlet of the first heat exchanger 4310. The second outlet opening 4246 is in fluid communication with a first outlet of the second heat exchanger 4330. The return opening 4248 is in fluid communication with a return portion (described in detail below) of the second heat exchanger 4330. Moreover, inlet portion 4211 of the air pump 4210 is in fluid communication with and/or at least partially disposed in the return opening 4248.

Figure 9:
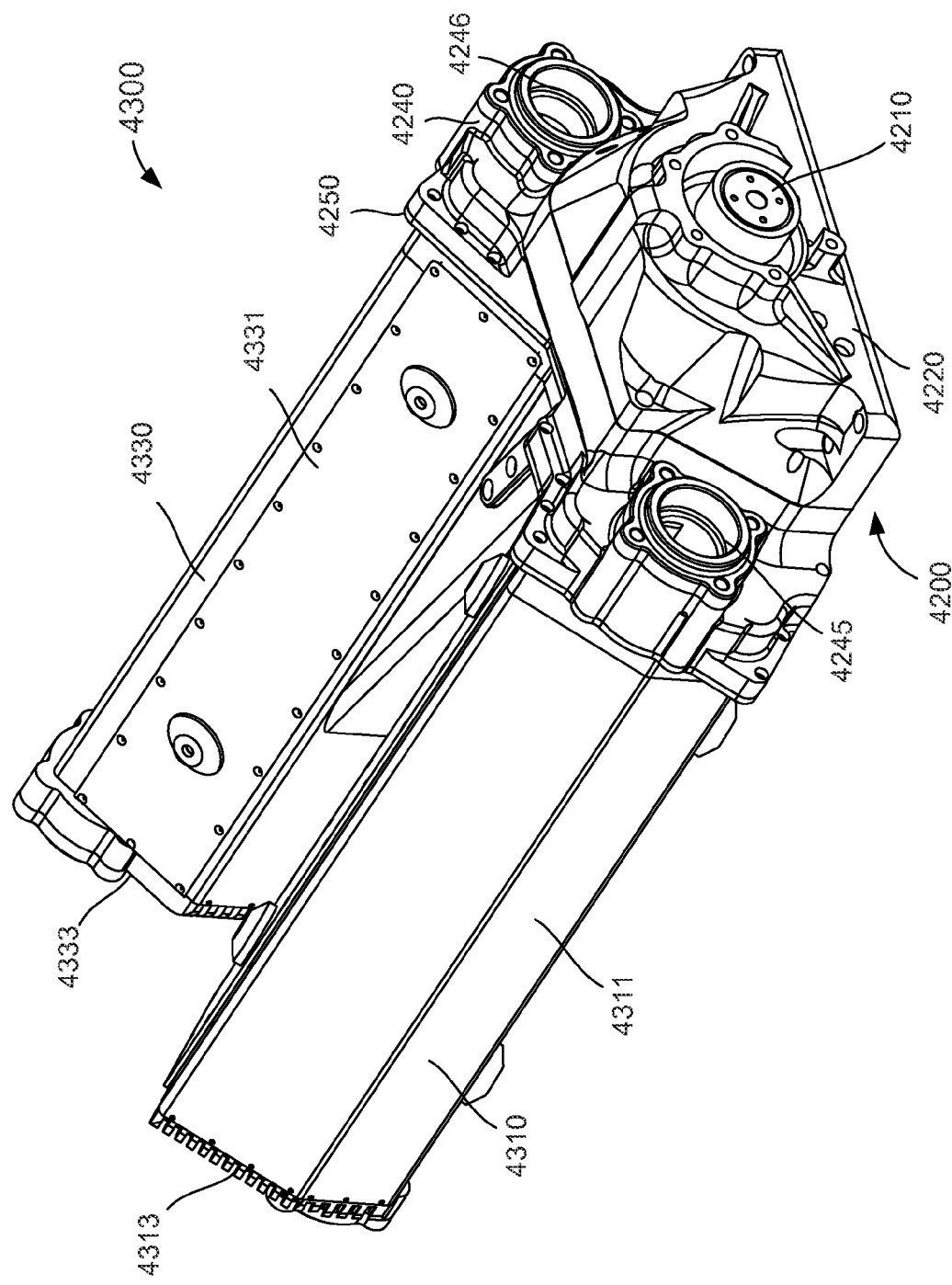
FIG. 9 is a perspective view of a heat exchanger assembly included in the water purification system of FIG. 4.

The adapter 4240 further includes a second surface 4242, as shown in FIG. 8. The second surface 4242 of the adapter 4242 defines an inlet plenum 4244 and an outlet plenum 4247. Furthermore, the arrangement of the adapter 4240 is such that the first outlet opening 4245, the second outlet opening 4246, and the return opening 4248 extend through the second surface 4242. The second surface 4242 of the adapter 4240 is coupled to the adapter plate 4250. More specifically, the second surface 4242 and the adapter plate 4250 couple together to form a substantially air tight seal. The adapter plate 4250 includes an inlet opening 4251, a first outlet opening 4252, a second outlet opening 4253, and a return opening 4254. The first outlet opening 4252 and the return opening 4254 substantially correspond with the first outlet opening 4245 and the return opening 4248, respectively, of the adapter 4240. Similarly stated, the first outlet opening 4252 and the return opening 4254 are substantially coaxial when the adapter 4240 is coupled to the adapter plate 4250. The inlet opening 4251 of the adapter plate 4250 is in fluid communication with the inlet plenum 4244 defined by the adapter 4240. Similarly, the second outlet opening 4253 is in fluid communication with the outlet plenum 4247. Thus, the inlet opening 4244 can receive a flow of air, from the air pump 4210, via the inlet plenum 4244 and the second outlet opening 4246 of the adapter 4240 can receive a flow, from the second heat exchanger 4330, via the outlet plenum 4247 and the second outlet opening 4253 of the adapter plate 4250. As shown in FIG. 9, the adapter plate 4250 is coupled to the heat exchanger assembly 4300 to place the air processor system 4200 in fluid communication with the heat exchanger assembly 4300.

As described above, the air circuit (e.g., the flow path within which the air flows) is a substantially closed system to conserve kinetic energy and reduce the noise level associated with the air pump 4210 and the flow of the air throughout the system. For example, the air pump 4210 receives a flow of air from the second heat exchanger 4330 which is then compressed and delivered to the inlet plenum 4244. Although not shown in FIGS. 4-38, the system 4000 can include a set of vent lines configured to remove excess vapor or gas that can develop in the collection reservoirs or other parts of the system. Thus, the air pump 4210 receives existing gasses within the system 4000 and compresses the gasses to produce the flow of the inlet air to the inlet plenum 4244. In some embodiments, however, the air pump 4210, the pump housing 4220, and/or the adapter 4240 can include an external air inlet port, from which external air (e.g., "make-up air") can be drawn. In other embodiments, however, the air flow assembly 4200 can include an external inlet port in any suitable location. In some embodiments, the air inlet port can include a valve with a manual or automatic control system. In some embodiments, the air pump 4210 can be configured to draw air through the air inlet port during startup to provide an initial volume of air to the system 4000. Moreover, in some embodiments, the air flow assembly 4200 can include a throttling valve to control the pressures throughout the system 4000. For example, in some embodiments, the air flow assembly 4200 can be adjusted such that the pressure of the air entering the processor assembly 4400 is below atmospheric pressure. In this manner, the air flow assembly 4200 can be tuned to enhance the evaporation and/or separation of the system 4000.

Figure 10:
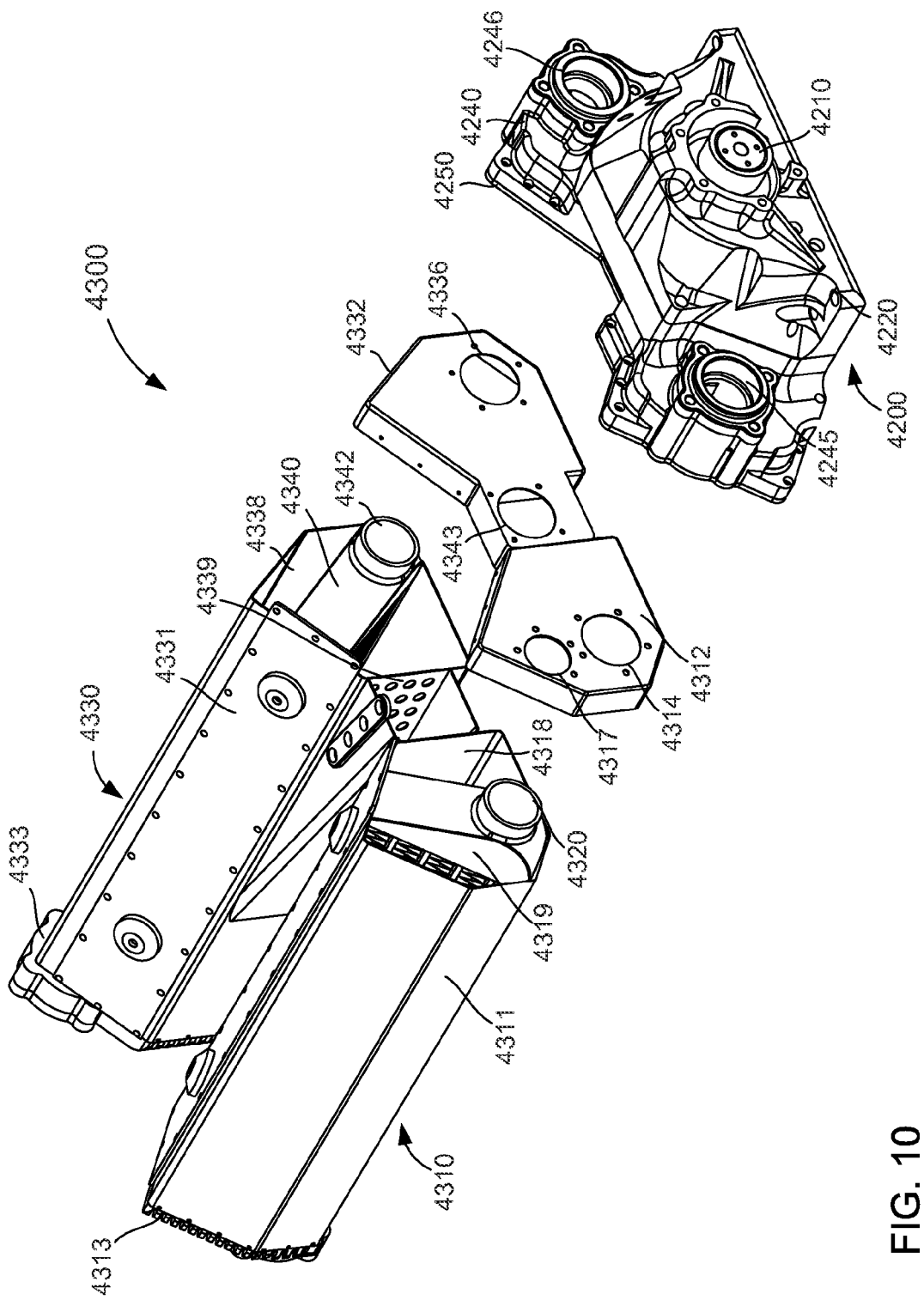
FIGS. 10 and 11 are a front exploded view and a rear exploded view, respectively, of the heat exchanger assembly of FIG. 9.
Figure 11:
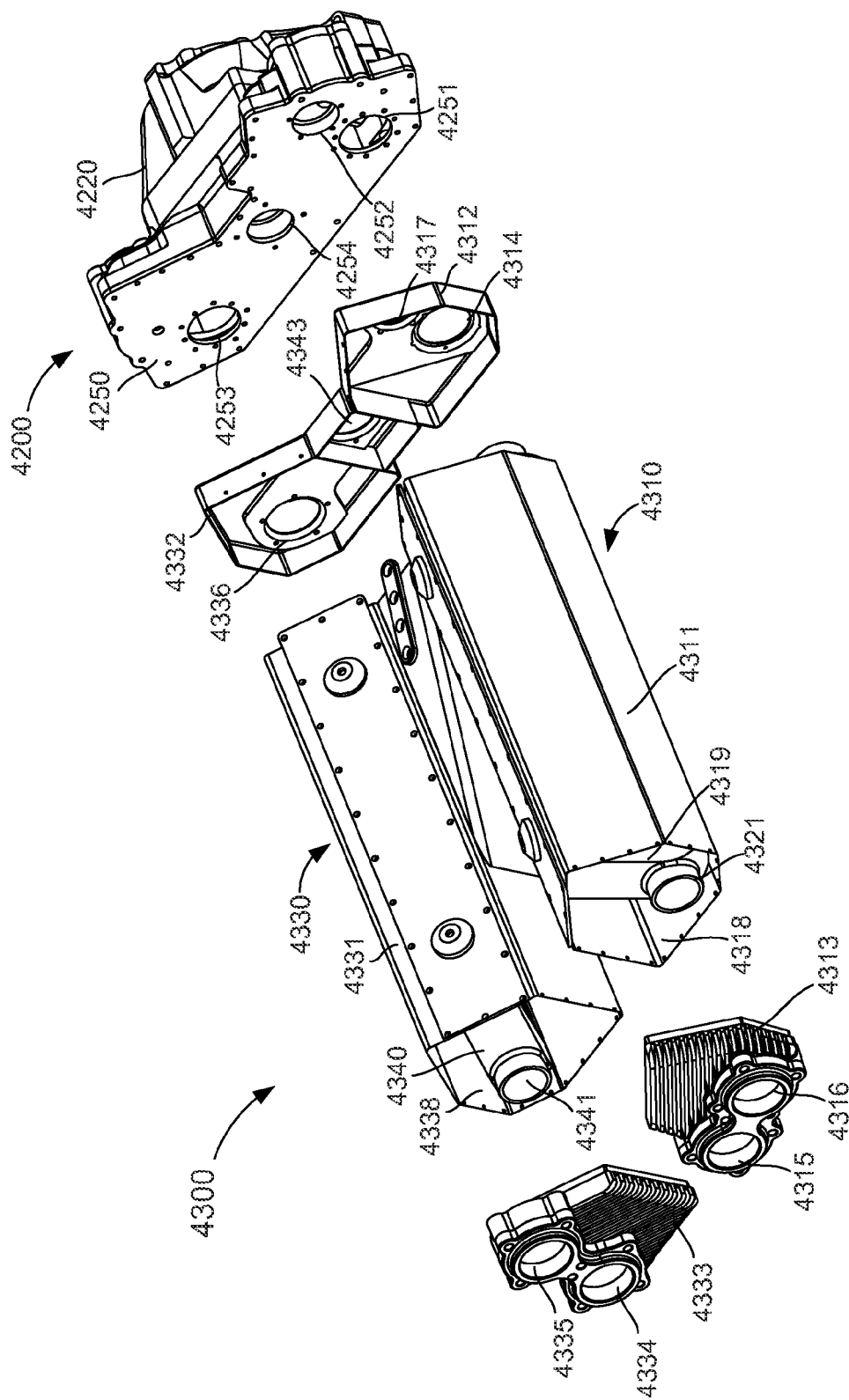

FIGS. 9-11 illustrate the heat exchanger assembly 4300. The heat exchanger assembly 4300 includes the first heat exchanger 4310 and the second heat exchanger 4330. The first heat exchanger 4310 and the second heat exchanger 4330 are each physically and fluidically coupled to the air flow assembly 4200 via the adapter plate 4250 (FIG. 9). As shown in FIGS. 10 and 11, the first heat exchanger 4310 includes a housing 4311, a first end portion 4312, a second end portion 4313, and a heat exchanger element 4319. The heat exchanger element 4319 can be any suitable configuration that is designed to transfer a portion of heat from one flow of a fluid (e.g., air or liquid) to a second flow of fluid, as is commonly known.

The housing 4311 defines an inner volume 4318 and houses or encloses the heat exchanger element 4319. The housing 4311 is coupled to the first end portion 4312 and the second end portion 4313. More specifically, the housing 4311 and the first end portion 4312, and the housing 4311 and the second end portion 4313 form substantially fluid tight seals. The first end portion 4312 defines a first inlet opening 4314 relative to the flow path of the air circuit and a second outlet opening 4317 relative to the flow path of the air circuit. The second end portion 4313 defines a second inlet opening 4315 relative to the flow path of the air circuit and a first outlet 4316 relative to the flow path of the air circuit. The heat exchanger element 4319 includes an inlet 4320 that is in fluid communication with and/or disposed within the first inlet opening 4314 of the first end portion 4312, and an outlet 4321 that is in fluid communication with and/or disposed within the first outlet opening 4316 of the second end portion 4313. The inner volume 4318 defined by the housing 4311 is in fluid communication with the second inlet opening 4315 of the second end portion 4313 and in fluid communication with the second outlet opening 4317 of the first end portion 4312.

The first heat exchanger 4310 defines two closed flow paths. A first flow path is defined between the first inlet opening 4314 of the first end portion 4312 and the first outlet opening 4316 of the second end portion 4313. Thus, a portion of the first flow path is disposed within and/or includes the internal portion of the heat exchanger element 4319. A second flow path is defined between the second inlet opening 4315 of the second end portion 4313 and the second outlet opening 4317 of the first end portion 4312. Thus, a portion of the second flow path flows within the inner volume 4318 of the housing 4311 and outside of the heat exchanger element 4319. In this manner, a portion of heat can be transferred from the first flow path to the second flow path (or vice versa) as the flow paths move along (i.e., within and about) the heat exchanger element 4319 (i.e., convection heat transfer). As described above, the first outlet opening 4316 of the first heat exchanger 4310 is in fluid communication with a first inlet portion of the second heat exchanger 4330 via the heat exchanger pipe 4010.

The second heat exchanger 4330 includes a housing 4331, a first end portion 4332, a second end portion 4333, and a heat exchanger element 4340. The housing 4331 defines an inner volume 4338 that encloses the heat exchanger element 4340. The housing 4331 is coupled to the first end portion 4332 and the second end portion 4333. More specifically, the housing 4331 and the first end portion 4332 and the housing 4331 and the second end portion 4333 from substantially fluid tight seals. The first end portion 4332 defines an outlet opening 4336 and a return opening 4343. The second end portion 4333 defines a first inlet opening 4334 and a second inlet opening 4335. The heat exchanger element 4340 includes an inlet 4341 that is in fluid communication with and/or disposed within the first inlet opening 4334 of the second end portion 4333 and an outlet 4342 that is in fluid communication with and/or disposed within the first outlet opening 4336 of the first end portion 4332. The inner volume 4338 defined by the housing 4331 is in fluid communication with the second inlet opening 4335 of the second end portion 4333. Furthermore, the housing 4331 defines a return portion 4339 of the inner volume 4338 that is in fluid communication with the return opening 4343 of the first end portion 4332.

As described above with reference to the first heat exchanger 4310, the second heat exchanger 4330 defines two closed flow paths. A first flow path is defined between the first inlet opening 4334 of the second end portion 4333 and the outlet opening 4336 of the first end portion 4332. Thus, a portion of the first flow path is disposed within and/or includes the internal portion of the heat exchanger element 4340. A second flow path is defined between the second inlet opening 4335 of the second end portion 4333 and the return opening 4343 of the first end portion 4332. Thus, a portion of the second flow path flows within inner volume 4338 of the housing 4331 (outside of the heat exchanger element 4340) and enters the return portion 4339. Moreover, with the return opening 4343 fluidicially coupled to the inlet 4211 of the air pump 4210 (e.g., via the adapter plate 4250 and the adapter 4240), the second flow path is fluidically coupled to the inlet 4211 of the air pump 4210. In this manner, a portion of heat can be transferred from the first flow path to the second flow path (or vice versa) as the flow paths move along the heat exchanger element 4340.

Figure 12:
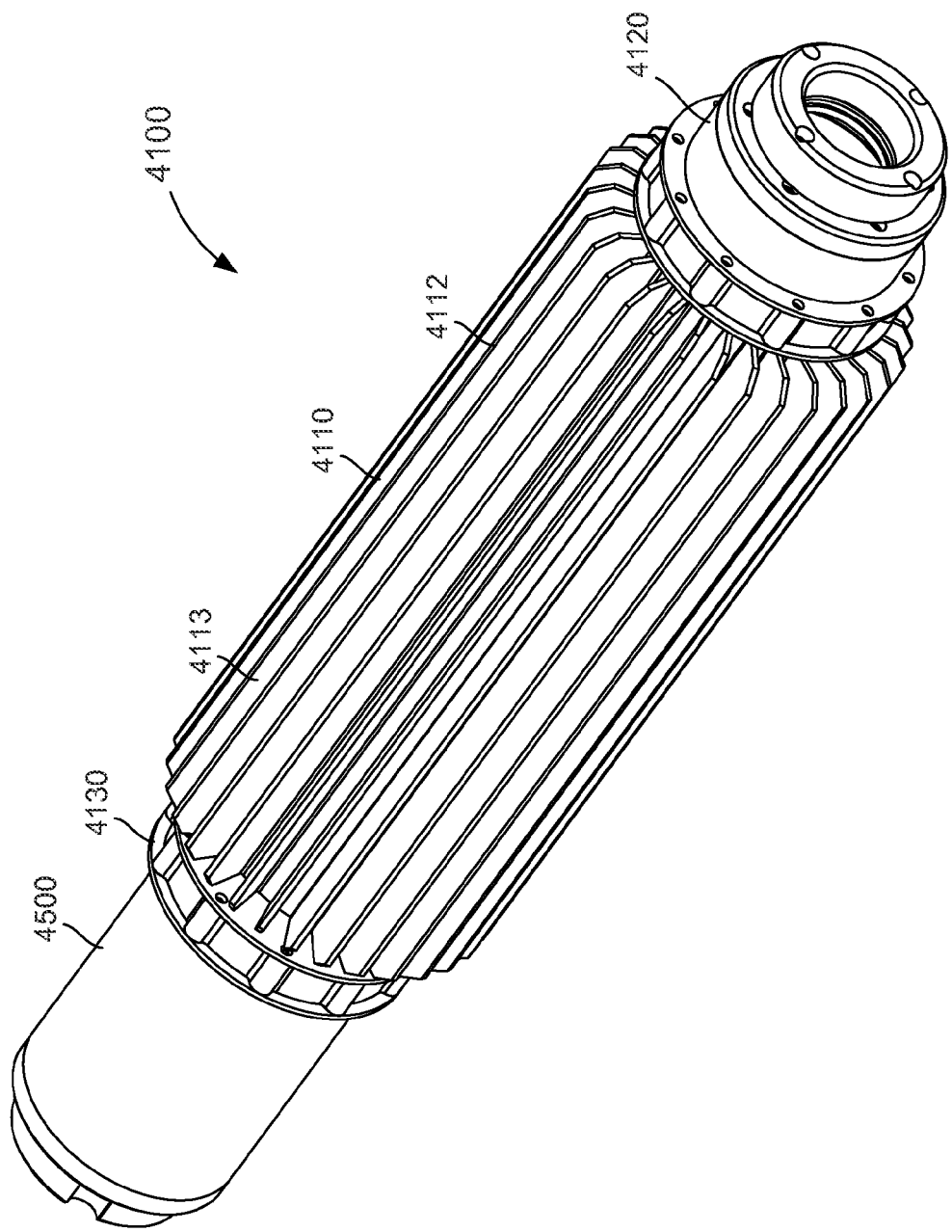
FIG. 12 is a perspective view of a condenser assembly included in the water purification system of FIG. 4.
Figure 13:
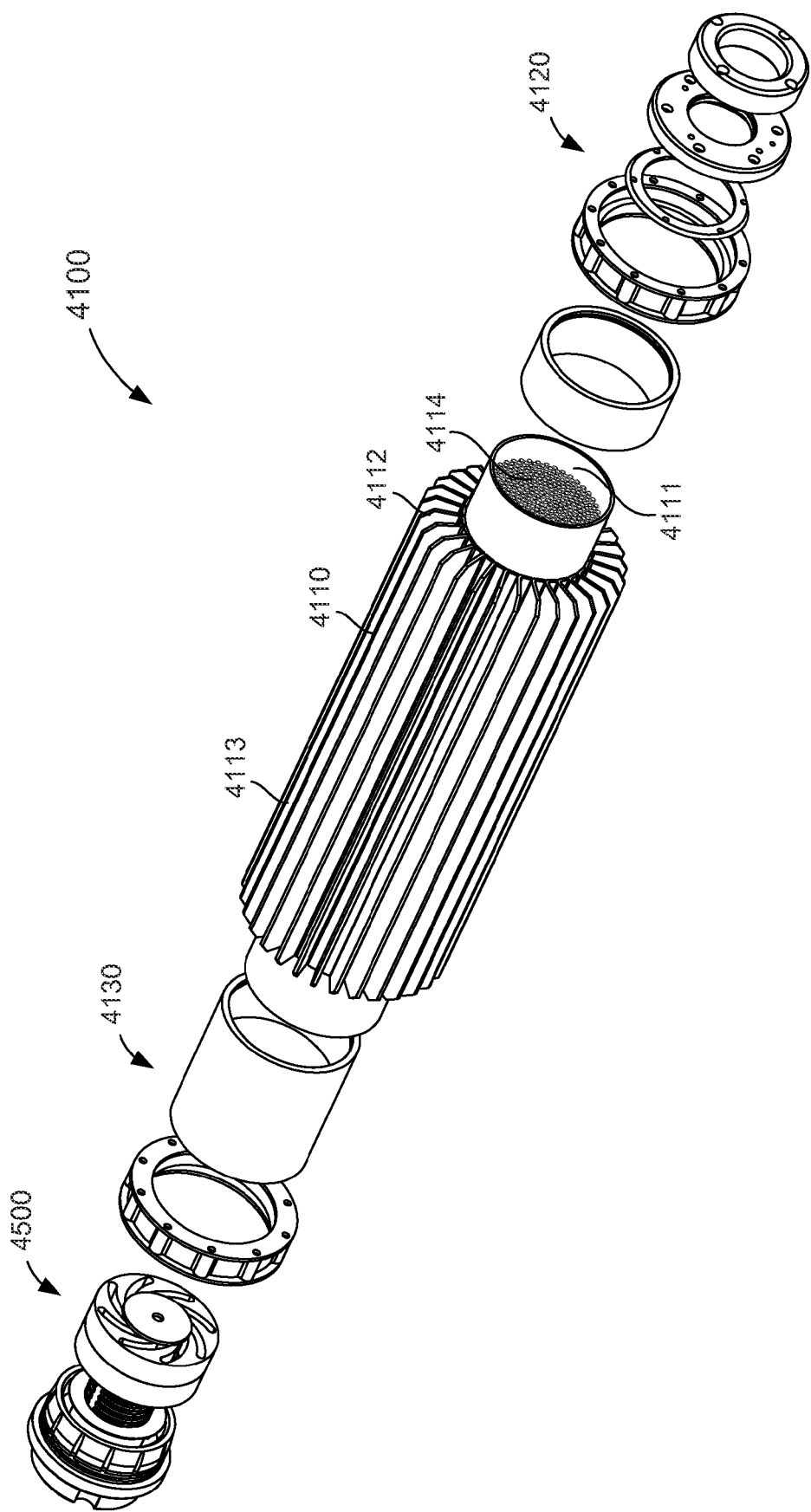
FIG. 13 is an exploded view of the condenser assembly of FIG. 12.
Figure 14:
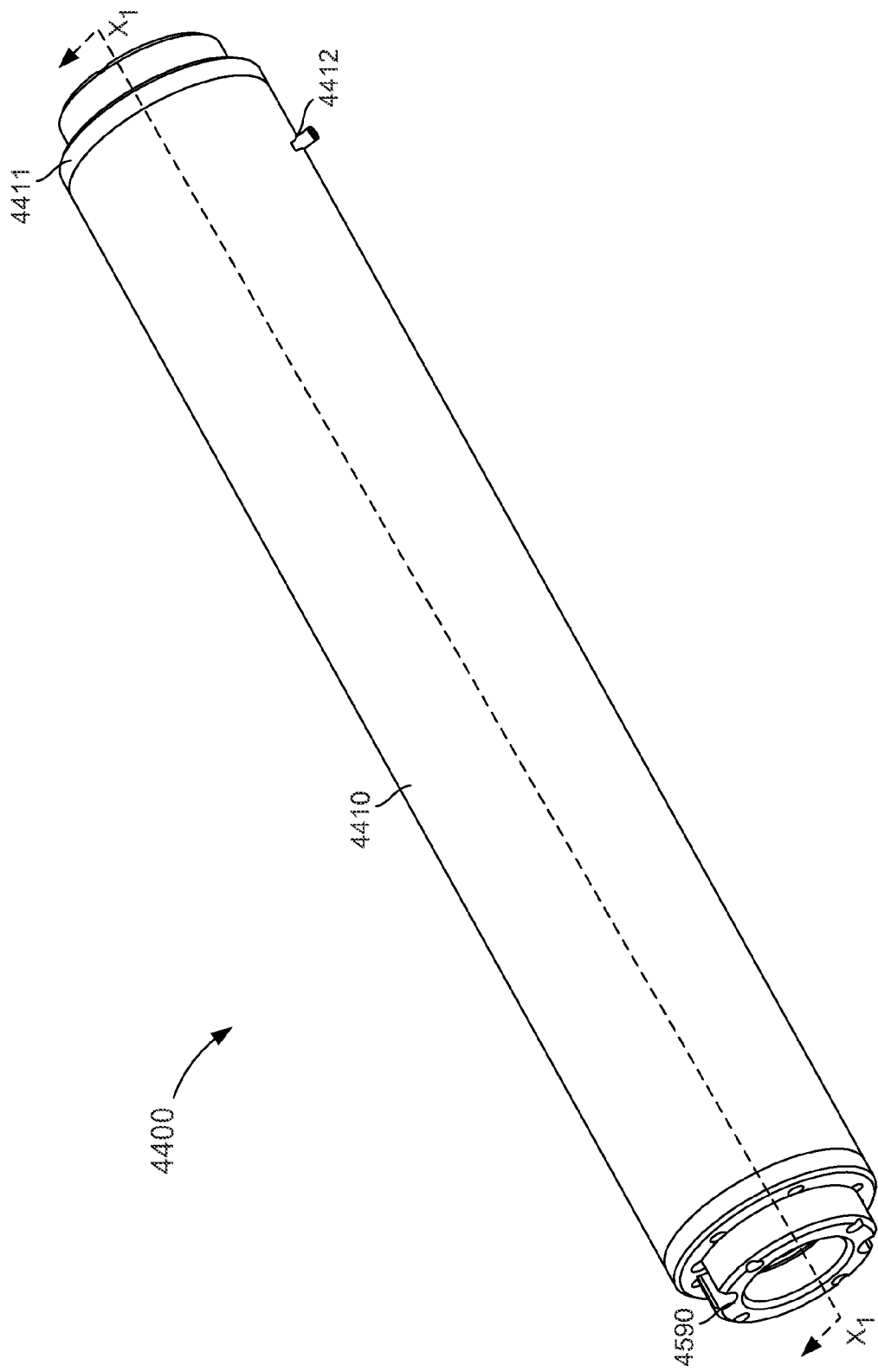
FIG. 14 is a perspective view of a processor assembly included in the water purification system of FIG. 4.
Figure 15:
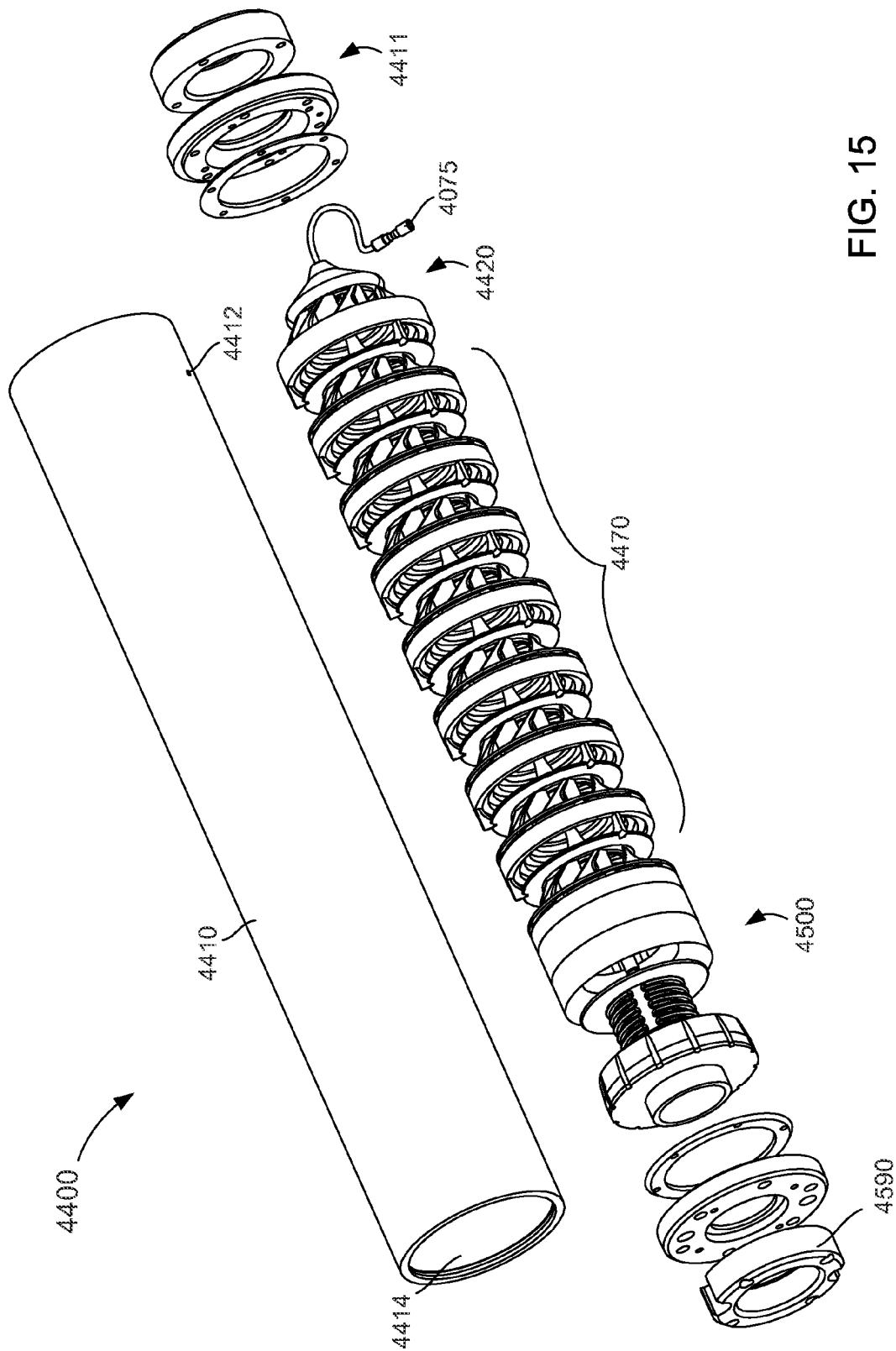
FIG. 15 is an exploded view of the processor assembly of FIG. 14.

FIGS. 12 and 13 illustrate the condenser assembly 4100. As described above, the condenser assembly 4100 is fluidically coupled to the second outlet opening 4246 of the adapter 4240 via the condenser inlet pipe 4020. Thus, with the second outlet opening 4246 of the adapter 4240 in fluid communication with the outlet opening 4336 of the second heat exchanger 4330, the condenser assembly 4100 receives a flow of a fluid from the second heat exchanger 4330, as described in further detail herein.

The condenser assembly 4100 includes a housing 4110, a condenser element 4114, an inlet coupler 4120, and an outlet coupler 4130. As described in further detail herein, a portion of the housing 4110 and/or the outlet coupler 4130 houses or substantially encloses one of the two separator assemblies 4500 included in the system 4000. The inlet coupler 4120 is physically and fluidically coupled to the condenser inlet pipe 4020 and the housing 4110. More specifically, the inlet coupler 4120 forms a substantially fluid tight seal with the condenser inlet pipe 4020 and the housing 4110. Thus, a flow of a fluid (e.g., an airflow containing substantially pure water vapor) can be transferred from the condenser inlet pipe 4020 into the housing 4110.

The housing 4110 of the condenser assembly 4100 includes an outer surface 4112 and defines an inner volume 4111 that houses the condenser element 4114. As shown in FIGS. 12 and 13, the outer surface 4112 of the housing 4110 forms and/or includes a set of fins 4113. The fins 4113 are relatively thin strips of conductive material (e.g., a metal such as, copper, brass, tin, steel, etc.) that, when heated (e.g., from the fluid flow through the condenser element 4114), transfer a portion of the heat from the surface of the fins 4113 to the ambient surroundings (e.g., via convection heat transfer). Expanding further, the inclusion of fins 4113 on the outer surface 4112 of the housing 4110 increases the surface area of the outer surface 4112. Therefore, with the relative large surface of the fins 4113, the outer surface 4112 can transfer more heat to the ambient surroundings that would otherwise be transferred.

The condenser element 4114 includes any structure and or mechanisms to transfer thermal energy between a flow of a fluid and the condenser element 4114. More specifically, the condenser element 4114 includes a set of relatively tightly packed tubes with the tubes around the circumference to the condenser element 4114 in contact with an inner surface of the housing 4110. In this manner, when a flow of a fluid (e.g., a vapor such as water vapor) with a temperature greater than the ambient temperature is passed along the condenser element 4114 (e.g., along an outer surface of the tubes and/or within the tubes comprising the condenser element) a portion of the heat of the fluid is transferred to the condenser element 4114 and the housing 4110. Thus, the temperature of the fluid is reduced as the fluid flow from an inlet portion to an outlet portion of the condenser assembly 4100. Furthermore, the removal of the portion of heat from the fluid is sufficient in changing the state of at least a portion of the fluid from a vapor to a liquid. Similarly stated, at least a portion of the fluid is condensed as the fluid moves from an inlet portion to an outlet portion of the condenser assembly 4100.

As described above, one of the separator assemblies 4500 is included in the condenser assembly 4100 (the separator assembly 4500 is described in detail in the discussion of the processor assembly 4400 below). The separator assembly 4500 is in fluid communication with the inner volume 4111 defined by the housing 4110 of the condenser assembly 4100. Thus, with the separator assembly 4500 downstream of the condenser element 4114, the separator assembly 4500 receives a flow of fluid that is cooled and has a portion of the water vapor therein at least partially condensed. As described in detail below, the separator assembly 4500 separates the flow of fluid to produce a gaseous flow of substantially dry, cooled air and a flow of substantially purified water. The purified water exits the separator assembly 4500 and is collected in one or more collection reservoirs (not shown). The outlet coupler 4130 of the condenser assembly 4100 is physically and fluidically coupled to the condenser outlet pipe 4030. Thus, any uncondensed water vapor exits the separator assembly 4500 and flows within flow path defined by the condenser outlet pipe 4030 to the first exchanger 4310, as described in further detail herein.

FIGS. 14-33 illustrate the processor assembly 4400. As described above, the processor assembly 4400 is fluidically coupled to the first outlet opening 4245 of the adapter 4240 via the processor inlet pipe 4040. Thus, with the first outlet opening 4245 of the adapter 4240 in fluid communication with the second outlet opening 4317 of the first heat exchanger 4310, the processor assembly 4400 receives a flow of a fluid from the first heat exchanger 4310, as described in further detail herein. In particular, the processor assembly 4400 receives the substantially dry air the flows out of the condenser assembly 4100.

The processor assembly 4400 includes a housing 4410 (see e.g., FIGS. 14-16), an atomizer assembly 4420 (see e.g., FIG. 16-25), and evaporation assembly 4470 (see e.g., FIGS. 26-34). As described in further detail below, a portion of the housing 4410 houses or substantially encloses one of the two separator assemblies 4500 included in the system 4000. The housing 4110 includes an inlet coupler 4411 and defines an inlet solution port 4412 and an inner volume 4414. The atomizer assembly 4420, the evaporation assembly 4470 and at least a portion of the separator assembly 4500 are disposed within the inner volume 4414 defined by the housing 4410. The inlet solution port 4412 receives a portion of a supply line within which an inlet solution can flow from a fluid reservoir (not shown in FIGS. 4-34, but described in detail above with reference to FIG. 1) into the atomizer assembly 4420, as described in further detail herein. The inlet coupler 4411 is physically and fluidically coupled to the processor inlet pipe 4040 and the housing 4410. More specifically, the inlet coupler 4411 forms a substantially fluid tight seal with the processor inlet pipe 4040 and with the housing 4410. Thus, a flow of a fluid can be transferred from the processor inlet pipe 4040 into the housing 4410.

Figure 16:
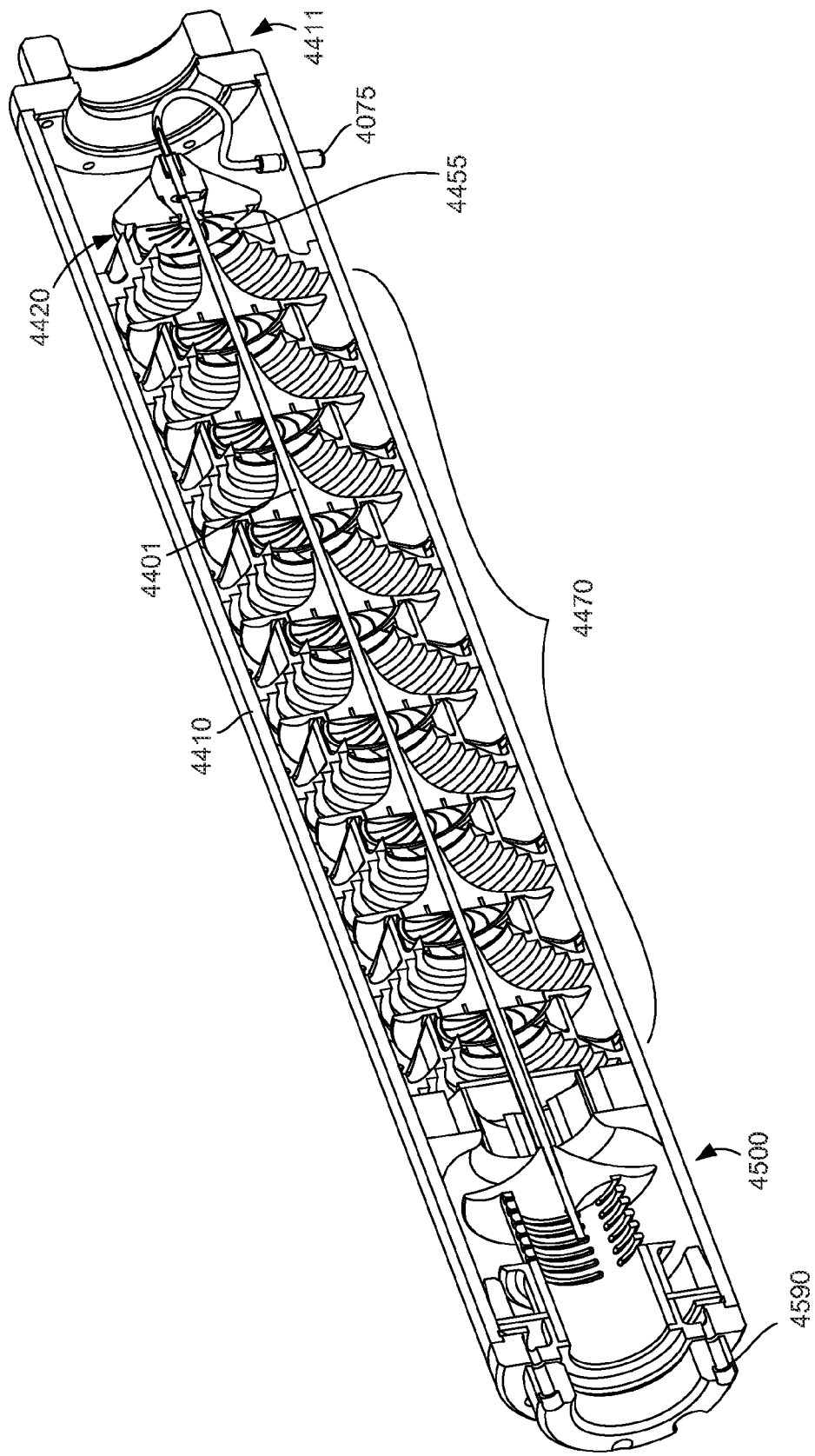
FIG. 16 is a cross-sectional view of the processor assembly taken along the line $X_1$-$X_1$ in FIG. 14.
Figure 17:
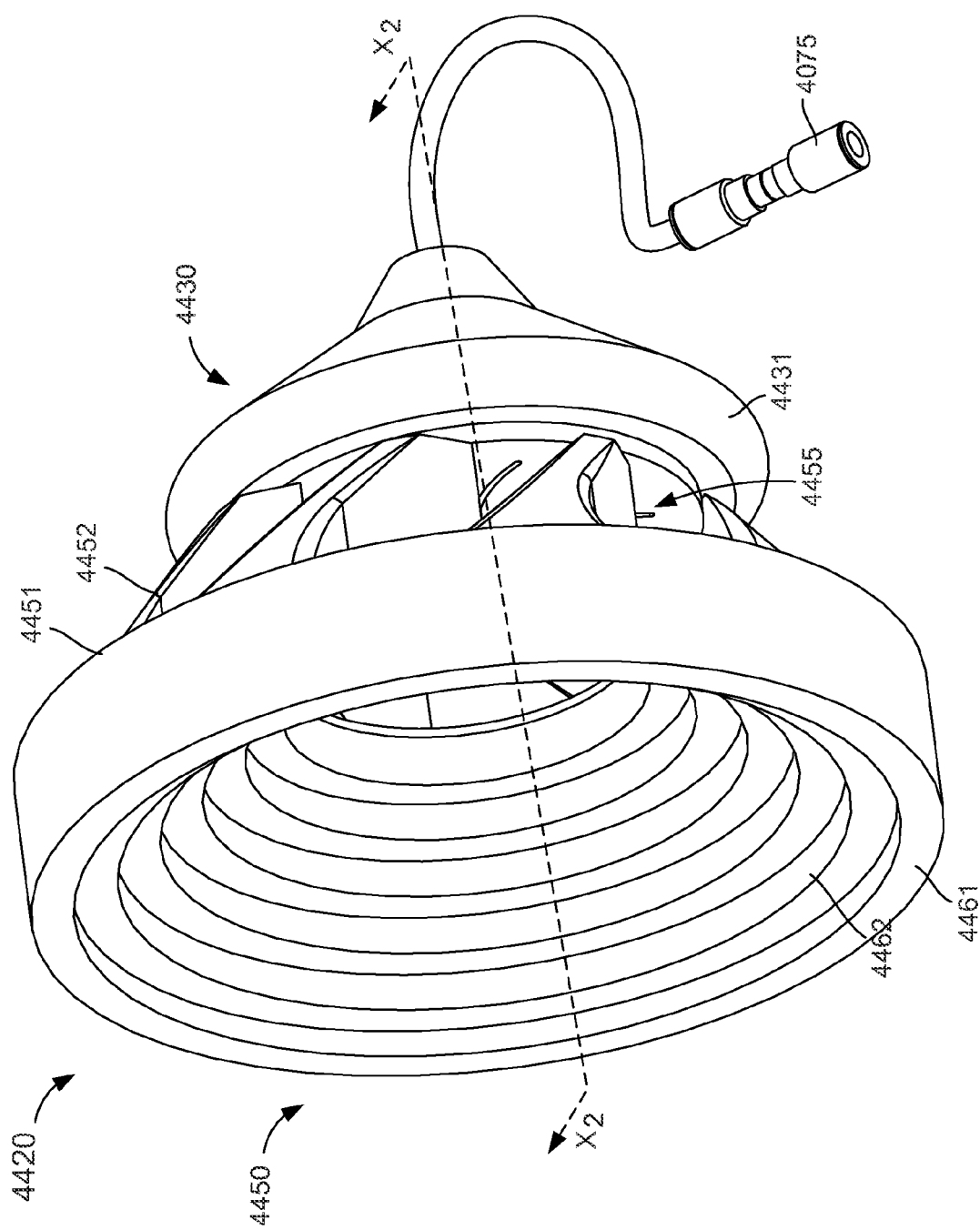
FIG. 17 is a perspective view of an atomizer assembly included in the processor assembly of FIG. 14.
Figure 18:
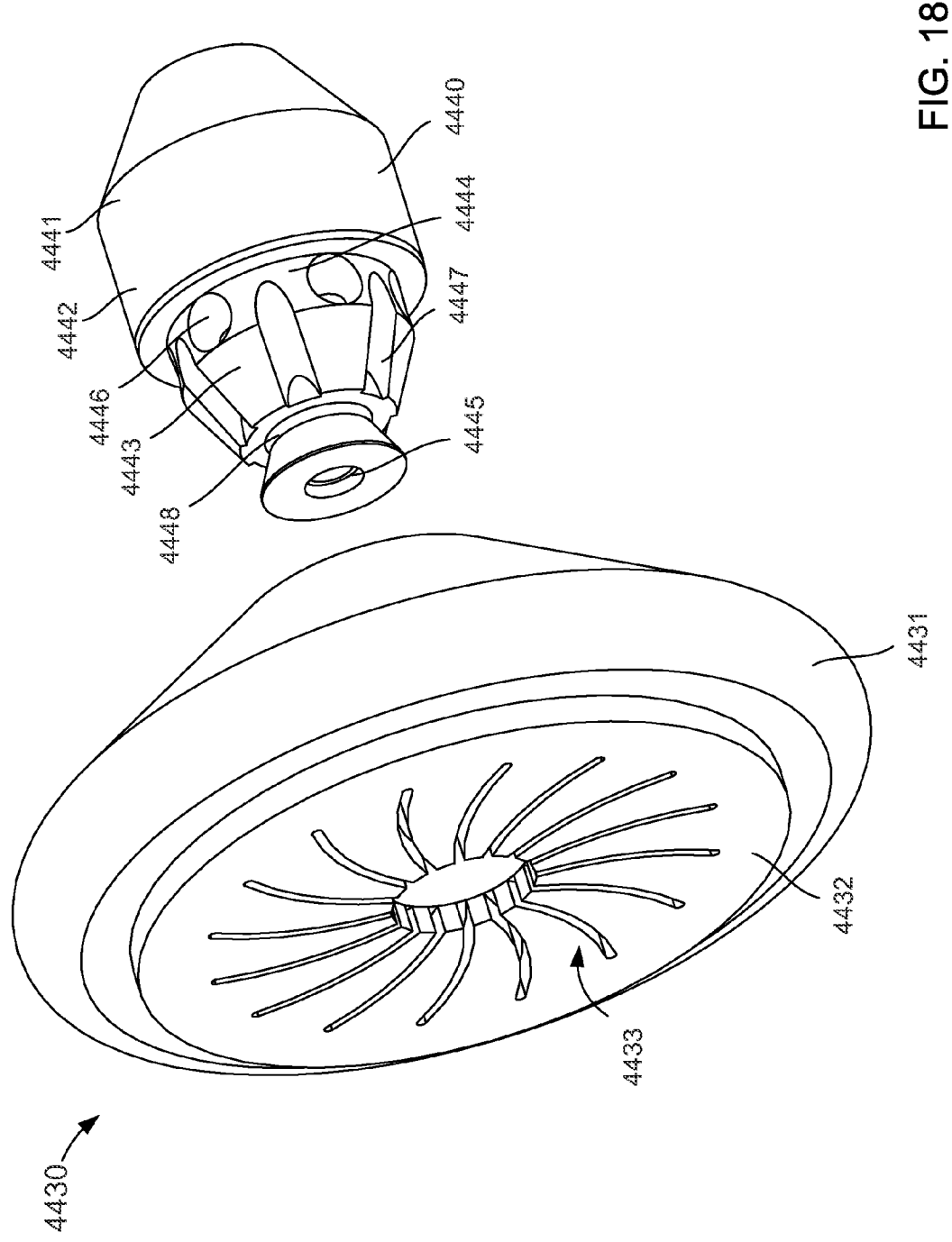
FIG. 18 is an exploded view of an injector nozzle included in the atomizer assembly of FIG. 17.
Figure 20:
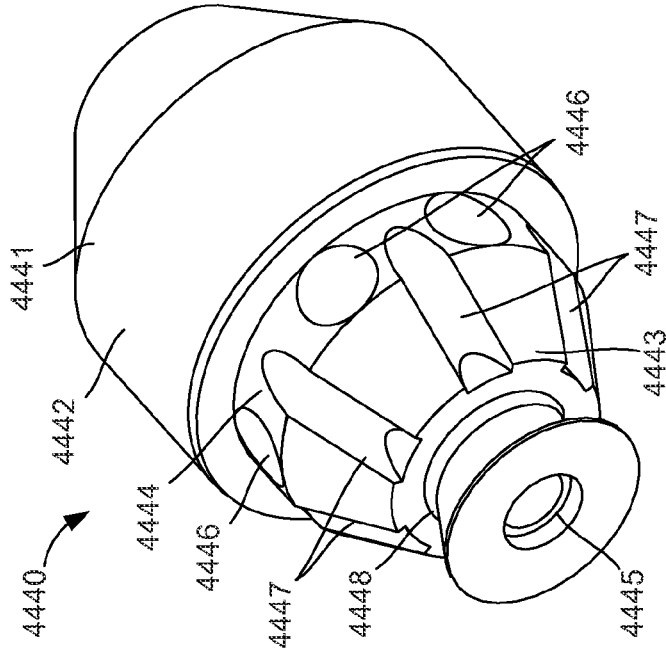
FIG. 20 is a front perspective view of a second injector member included in the injector nozzle of FIG. 18.
Figure 19:
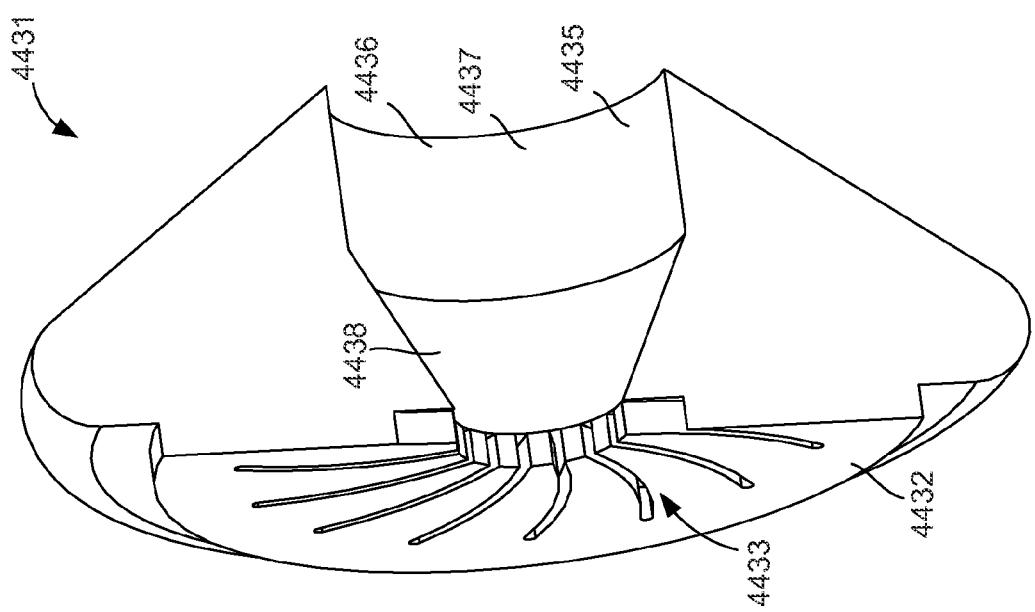
FIG. 19 is a cross-sectional view of the first injector member taken along the line $X_2$-$X_2$ in FIG. 17.

FIGS. 16-25 illustrate the atomizer assembly 4420 included in the processor assembly 4400. The atomizer assembly 4420 (also referred to herein as "atomizer") includes an injector nozzle 4430 and a diffuser 4450 that collectively define a mixing chamber 4455 (FIG. 17). The injector nozzle 4430 is fluidically coupled to the supply line 4075 such that a flow of a solution (e.g., feedwater, which can be seawater, industrial wastewater, water produced by hydraulic fracturing or the like) is delivered to the of the injector nozzle 4430. As shown in FIG. 18, the injector nozzle 4430 includes a first injection member 4431 and a second injection member 4440. The first injection member 4431 includes an inner surface 4435 having a first portion 4437 and a second portion 4438. The inner surface 4435 defines an opening 4436 configured to receive the second injection member 4440 (see e.g., FIG. 21). The first injection member 4431 further includes an engagement surface 4432 that defines a set of elongate openings 4433. The elongate openings 4433 can extend in a curvilinear path from the inner surface 4435 towards an outer edge of the engagement surface, as described in further detail herein. The engagement surface 4432 and a portion of the diffuser 4420 define the mixing chamber 4455, as described in further detail herein.

The second injection member 4440 includes an outer surface 4441 having a first portion 4442, a second portion 4443, and a third portion 4444. The second injection member 4440 also defines a center opening 4445, a set of flow openings 4446, a set of channels 4447, and a recess 4448 (see e.g., FIG. 20). The center opening 4445 receives a portion of the supply line 4075 and places the flow openings 4446 in fluid communication with the supply line 4075. Similarly stated, the center opening 4445 define a flow path between the supply line 4075 and the set of flow openings 4446.

Figure 21:
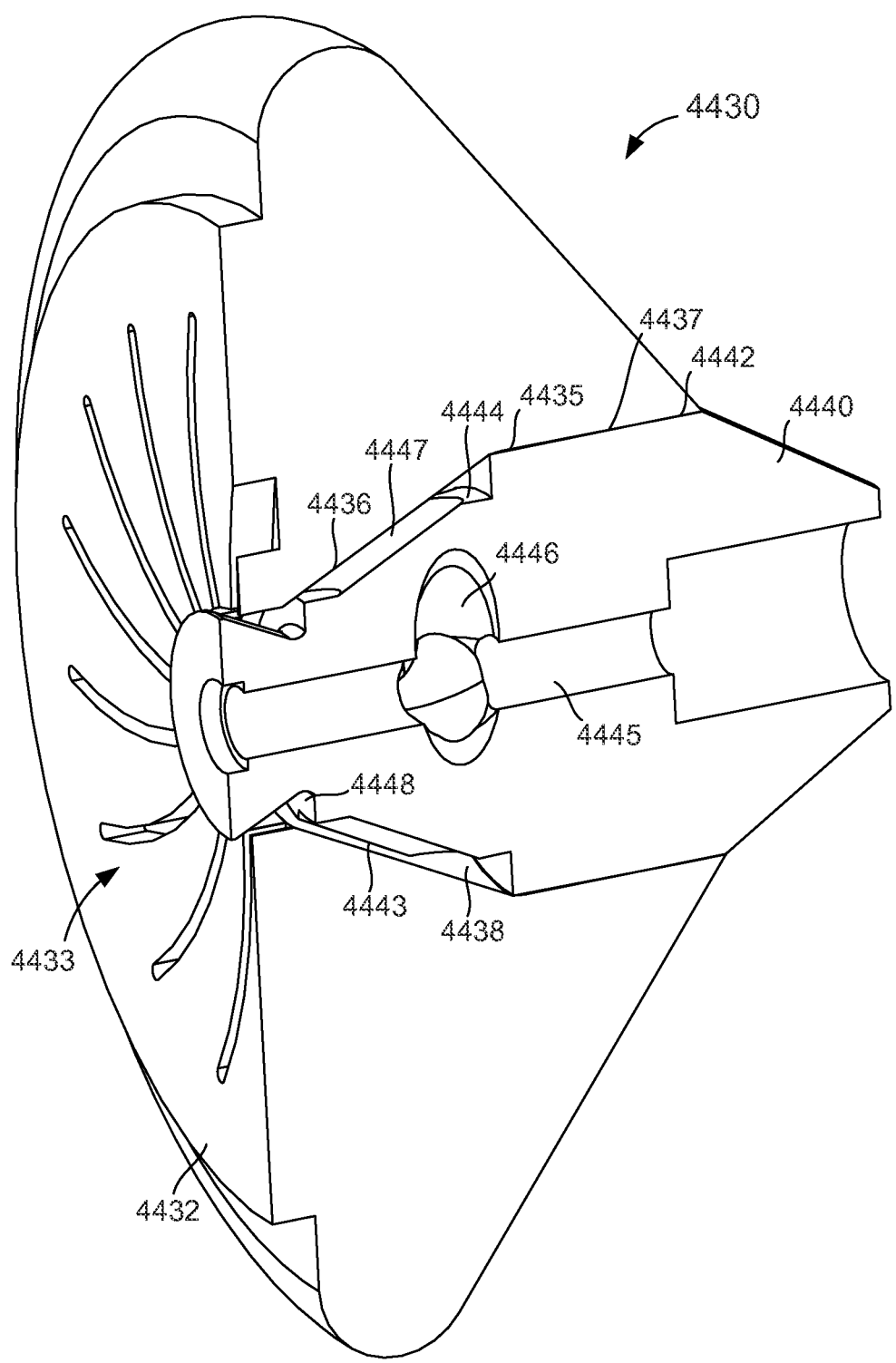
FIG. 21 is a cross-sectional view of the injector nozzle taken along the line $X_2$-$X_2$ in FIG. 17.

As shown in FIG. 21, the second injection member 4440 is disposed within the opening 4436 defined by the first injection member 4431. More specifically, the first portion 4442 of the outer surface 4441 of the second injection member 4440 forms a friction fit with the first portion 4437 of the inner surface 4435 defining the opening 4436. Similarly, the second portion 4443 of the outer surface 4441 of the second injection member 4440 forms a friction fit with the second portion 4438 of the inner surface 4435. In this manner, the first portion 4442 and the second portion 4443 of the outer surface 4441 of the second injection member 4440 form a substantially fluid tight seal with the inner surface 4435 of the first injection member 4431.

When the second injection member 4440 is disposed within the opening 4436 of the first injection member 4431, the third portion 4444 of the outer surface 4441 is spaced at a distance from the inner surface 4435. In this manner, a flow of a fluid (e.g., an inlet solution) can flow through the flow openings 4446 and into the space between the third portion 4444 and the inner surface 4435. Furthermore, the space between the third portion 4444 and the inner surface 4435 allows the flow of solution to enter the flow channels 4447 and flow towards the recess 4448. As shown in FIG. 21 the recess 4448 is in fluid communication with the elongate openings 4433 defined by the engagement surface 4432. Thus, the arrangement of the first injection member 4431 and the second injection member 4440 places the elongate openings 4433 defined by the engagement surface 4432 in fluid communication with the supply line 4075.

Figure 22:
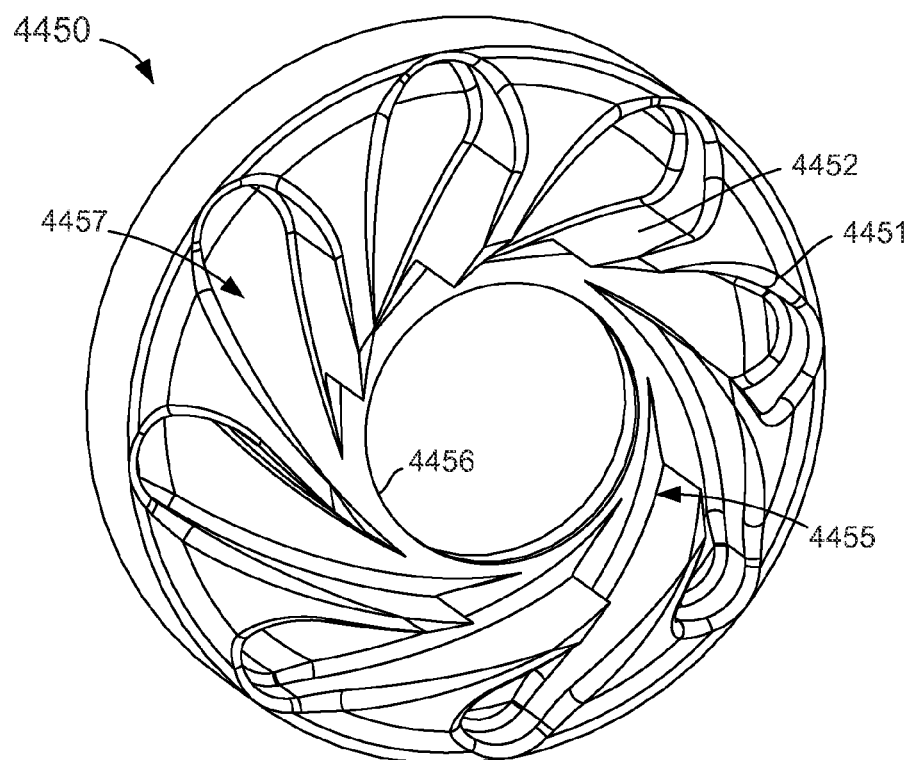
FIG. 22 is a front perspective view of a diffuser included in the atomizer assembly of FIG. 17.

Referring now to FIGS. 22-25, the diffuser 4450 can be any suitable device, mechanism, or component that is configured to direct and/or act upon at least a portion of the flow of a gas (e.g., air, water vapor, or the like) prior to the flow of gas entering the mixing chamber 4455. The diffuser 4450 is also configured to direct and/or act upon a mixture of the gas and the inlet solution after exiting mixing chamber 4455. The diffuser 4450 includes a first surface 4451 and a second surface 4461 (see FIG. 24), and defines a throat opening 4456. As shown in FIG. 22, the first surface 4451 includes a set of vanes 4452 (also referred to as flow guidance structures and/or flow members). The vanes 4452 are arranged to produce at least a portion of the flow characteristic of the gas flowing within a flow path 4457 defined between adjacent vanes 4452. In particular, the vanes 4452 produce a rotational velocity within the flow of the gas that can enhance the atomization and/or evaporation of the gas and/or the inlet solution. Moreover, the rotational velocity produced by the vanes 4452 produces a cyclonic flow of a mixture of the gas and the inlet solution that flows downstream of the mixing chamber 4455, as described in further detail herein.

The arrangement of the elongate openings 4433 defined by the engagement surface 4432 of the first injection member 4431 and the vanes 4452 of the diffuser 4450 are such that when the gas (e.g., flowing within the flow path 4457) flows across the elongate openings 4433, the flow of the gas is substantially perpendicular to the flow of the inlet solution. Expanding further, the elongate openings 4433 divide the flow of the inlet solution, thereby increasing the surface area of the inlet solution that is in direct contact with the flow path 4457 of the gas. This arrangement enhances the atomization of the gas and the inlet solution and further enhances the mixing of the gas and the solution, as described in further detail herein.

Figure 23:
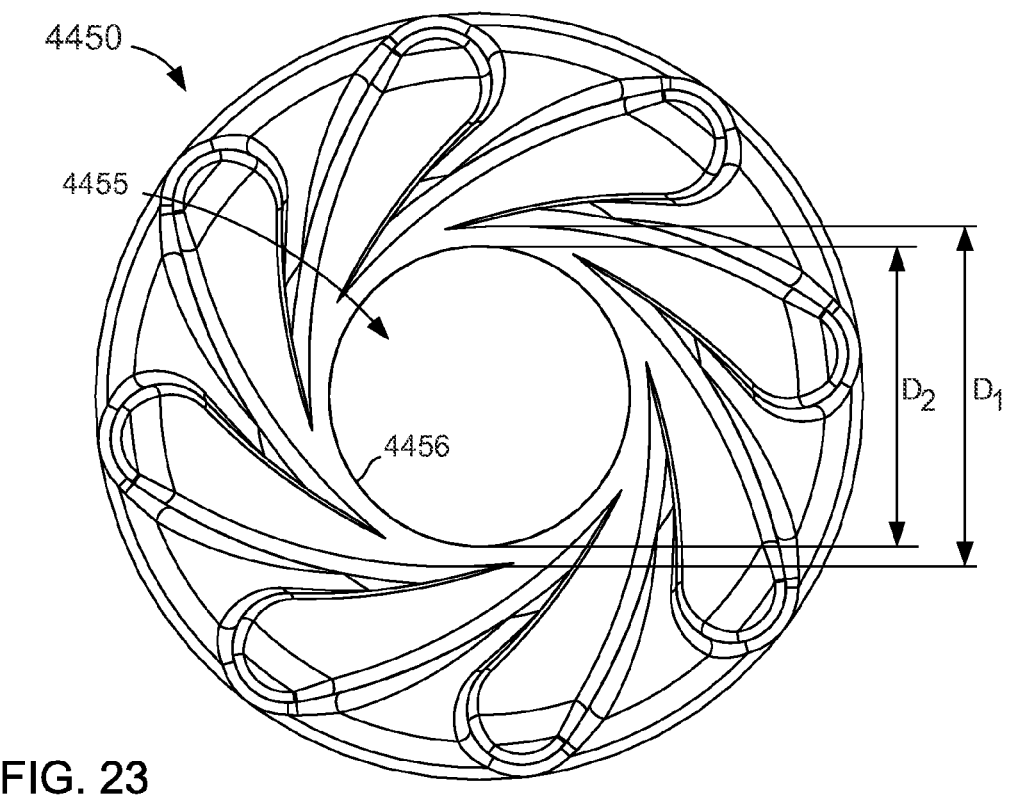
FIG. 23 is a front view of the diffuser of FIG. 22.

As shown in FIG. 23, the mixing chamber 4455 defined by the injection nozzle 4430 and the diffuser 4450 has a circumferential opening with a diameter $D_1$. More specifically, the vanes 4452 include a leading edge that defines the circumferential opening of the mixing chamber 4455. The throat opening 4456 of the diffuser 4450 is disposed between the mixing chamber 4455 and the second surface 4461 and has a circumferential opening with a diameter $D_2$. The diameter $D_1$ defined by the leading edge of the vanes 4452 is larger than the diameter $D_2$ of the throat opening 4456, thereby reducing or eliminating a choke point (e.g., a point where the flow is slowed, choked, reduced, or otherwise limited) of the flow of the mixture downstream of the mixing chamber 4455. In some embodiments, the ratio of the diameter $D_1$ and the diameter $D_2$ can be between about 0.7 and 0.9. In other embodiments, the ratio can be larger than about 0.9 (e.g., 1.0, 1.25, 1.5, 2.0, or any fraction therebetween). In still other embodiments, the ratio can be smaller than 0.7 (e.g., 0.6, 0.5, 0.4, 0.3, 0.2, 0.1, or any suitable fraction therebetween).

Figure 25:
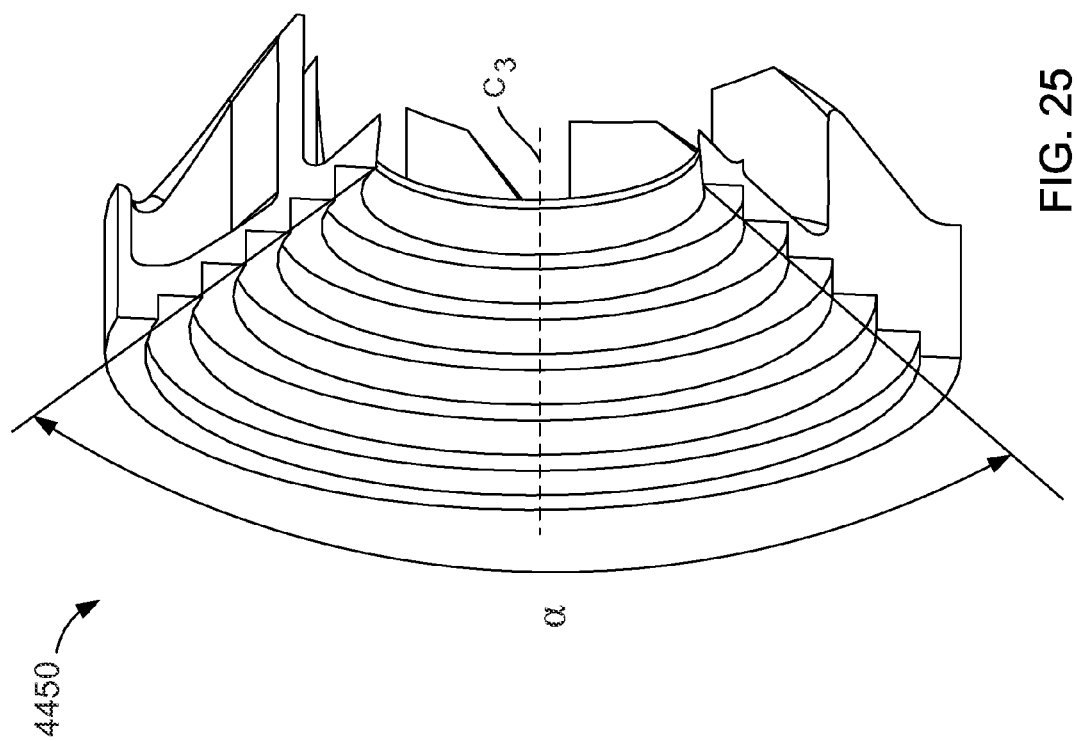
FIG. 25 is a cross-sectional view of the diffuser taken along the line $X_3$-$X_3$ in FIG. 24.

The second surface 4461 of the diffuser 4450 includes a set of shoulders 4462 and defines a second flow path 4463 within which the mixture of the gas and inlet solution flow after mixing in the mixing chamber 4455. The second surface 4461 of the diffuser 4450 can be any suitable configuration. For example, as shown in FIG. 25, the second surface 4461 of the diffuser 4450 diverges along a longitudinal centerline $C_3$ of the diffuser 4450. Similarly stated, the second surface 4461 of the diffuser 4450 extends in a substantially conical direction away from the mixing chamber 4455. In some embodiments, the second surface 4461 can have a divergence angle (or total angle of diffusion) $\alpha$ of about 95° to about 105°. In other embodiments, the second surface 4461 can have any suitable divergence angle $\alpha$ such as, for example, about 20°, about 40°, about 60°, about 80°, about 90°, about 95°, about 100°, about 110°, about 120°, about 140°, about 160°, or about 180°. Thus, the diameter of the second surface 4461 adjacent to the mixing chamber 4455 is smaller than the diameter of the second surface 4461 at a point along the longitudinal centerline $C_3$ that is downstream of the mixing chamber 4455.

The divergence of the second surface 4461 is such that the area between the mixing chamber 4455 within a plane substantially normal to the longitudinal centerline $C_3$ of the diffuser 4450 increases as the plane is moved in a downstream direction relative to the mixing chamber 4455. Similarly stated, the flow area defined by the second surface 4461 of the diffuser 4450 increases along the longitudinal centerline $C_2$. The increase in the flow area defined by the second surface 4461 of the diffuser 4450 decreases the localized pressure at the mixing chamber 4455. Thus, the pressure drop draws the mixture into the second flow path 4463 and further reduces the particle size of the mixture after mixing in the mixing chamber 4455. Moreover, the reduction of the particle size of the mixture further saturates the portion of the mixture comprised of gas, thereby separating a portion of the solute in the solution from the solvent. Similarly stated, the volume of the mixture comprised of an atomized portion of the solvent is increased.

As described above, the second surface 4461 of the diffuser 4450 includes the set of shoulders 4462. The shoulders 4462 can be any suitable shape, size, or configuration. For example, while shown in FIGS. 24 and 25 as being substantially uniformed terraces (e.g., annular rings with a substantially square cross-section), the shoulders 4462 can be rounded, asymmetrical, non-uniform, and/or any other suitable configuration. By way of example, in some embodiments, the cross-sectional area of each shoulder 4462 can vary such that the shoulders 4462 decrease in cross-sectional area along the longitudinal centerline $C_3$ and away from the throat opening 4456 (or vice versa).

The arrangement of the shoulders 4462 reduces the amount and/or controls the characteristics of back flow (or reverse flow) as the mixture flows along the longitudinal centerline $C_3$ of the diffuser 4450 downstream of the throat opening 4456. Expanding further, the cyclonic rotation of the mixture (described above) as the mixture flows in the second flow path 4463 conveys the larger particles and/or the more dense particles of the mixture via centrifugal force onto the second surface 4461 of the diffuser 4450. Because f the localized area of low pressure in the throat opening 4456, such particles flow along the second surface 4461 toward the throat opening 4456 (e.g., a reverse flow). Thus, the shoulders 4462 included in or defined by the second surface 4461 limit or breakup the backflow and produce a build-up of the particles disposed on each shoulder 4462. Moreover, when the build-up of the particles reaches a given threshold, at least a portion of the particles flow and/or separate from the given shoulder 4462. When the portion of the particles move from one shoulder 4462 to an adjacent shoulder 4462 that is upstream, at least a portion of the particles become entrained in the mixture of the primary flow within the second flow path 4463. For example, in some instances, particles that are smaller in size than a given threshold can become entrained in the flow of the mixture along the second flow path 4463. In other instances, particles that are less dense than a given threshold can become entrained in the flow. In still other embodiments, particles with a larger size and/or particles that are denser than a given size or density threshold, respectively, can become entrained in the flow. Thus, the arrangement of the second surface 4461 of the diffuser 4450 (i.e., the shoulders 4462) is such the second flow path 4463 continually flows past the particles that are slung on the second surface 4461 and, therefore, allow the particles to be entrained in the flow of the mixture.

FIGS. 26-34 illustrate the evaporation assembly 4470 included in the processor assembly 4400. The evaporation assembly 4470 receives a mixture (e.g., produced by the atomizer assembly 4420) of a gas and the inlet solution to produce a vaporized portion of a solvent (e.g., water) from the solution. Referring back to FIGS. 15 and 16, the processor assembly 4400 includes a set of evaporation assemblies 4470 that are arranged serially within the housing 4410 of the processor assembly 4400. Thus, a discussion of one evaporation assembly 4470 is meant to apply to all the evaporation assemblies 4470 included in the processor assembly 4400. Although shown as being arranged serially, in other embodiments, the processor assembly 4400 can include a set of evaporation assemblies 4470 in parallel.

The evaporation assembly 4470 includes a diffuser 4471 having a first surface 4472, a second surface 4480, and defining a throat opening 4479, and an inlet flow member 4490 having a first surface 4491, a second surface 4492, and a third surface 4495. A first portion of the first surface 4472 of the diffuser 4471 and the first surface 4491 of the inlet flow member 4490 collectively define a first flow path 4477 within which the mixture can flow, as shown by the arrow CC in FIG. 27. A second portion of the first surface 4472 of the diffuser 4471 and the second surface 4492 of the inlet flow member 4490 collectively define an evaporation volume 4478 (see e.g., FIG. 27) that is upstream of the throat opening 4479. The second surface 4480 of the diffuser 4471 defines a second flow path 4482 within which at least a portion of the mixture and the vaporized portion of a solvent can flow, as described in further detail herein.

As shown in FIGS. 26-30, the inlet flow member 4490 is disposed within the processor assembly 4400 adjacent the diffuser 4471. More specifically, the inlet flow member 4490 includes a set of legs 4497 that are in contact with a portion of the second surface 4480 of the diffuser 4471 such that a portion of the third surface 4495 is spaced a distance from the second surface 4480 of the diffuser 4470. Similarly, a portion of the first surface 4472 of the diffuser 4471 is in contact with a portion of the first surface 4491 of the inlet flow member 4490 such that a portion of the first surface 4491 of the inlet flow member 4490 is spaced a distance from the first surface 4472 of the diffuser 4471 (see e.g., FIG. 26). Furthermore, the inlet flow member 4490 defines a tie rod opening 4494 along a center line $C_L$ of the assembly (see FIG. 27) that receives a tie rod 4401 included in the processor assembly 4400 such that the inlet flow members 4490 disposed therein are substantially aligned relative to one another.

Figure 27:
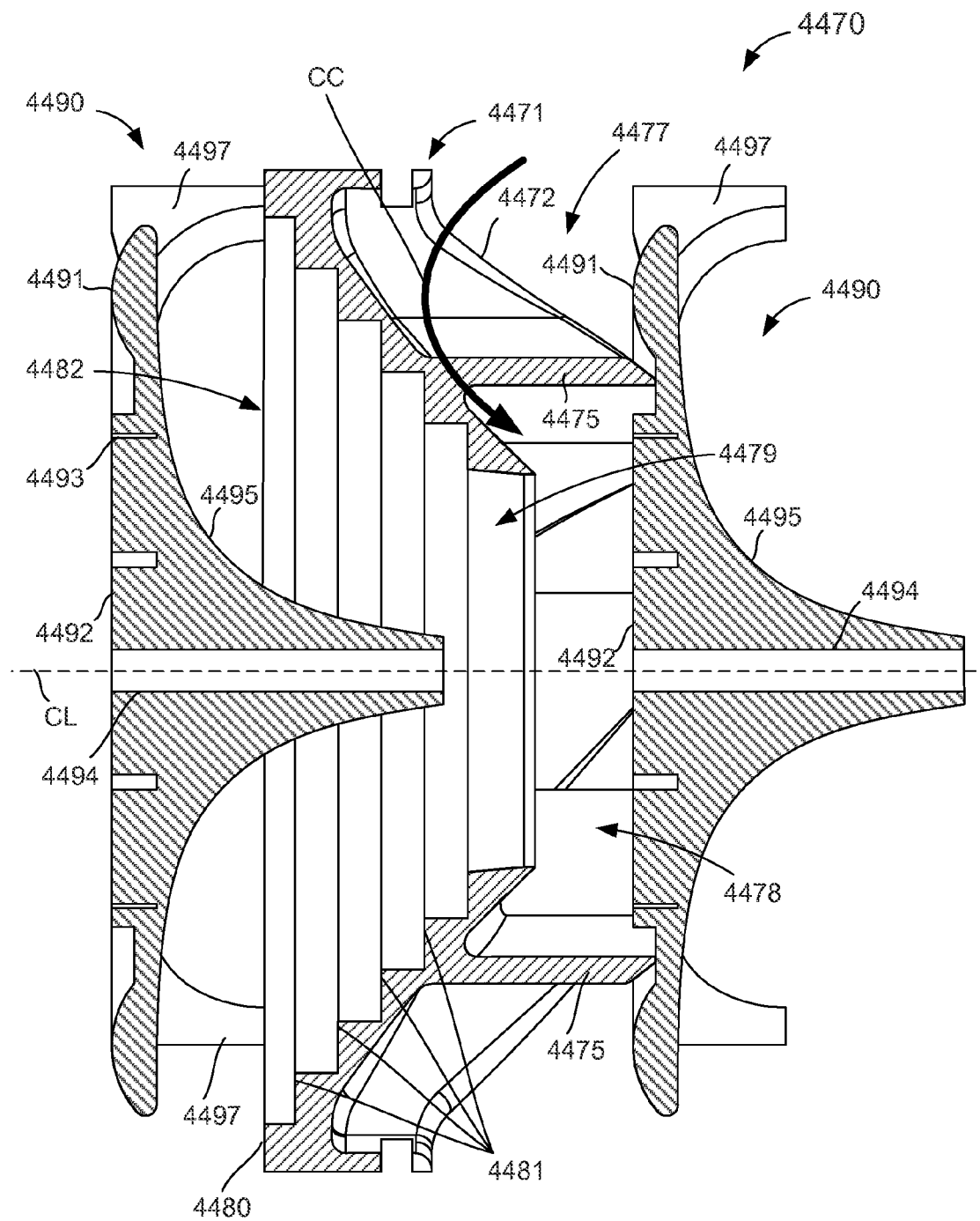
FIG. 27 is a cross-sectional view of the evaporator assembly taken along the line $X_4$-$X_4$ in FIG. 26.
Figure 28:
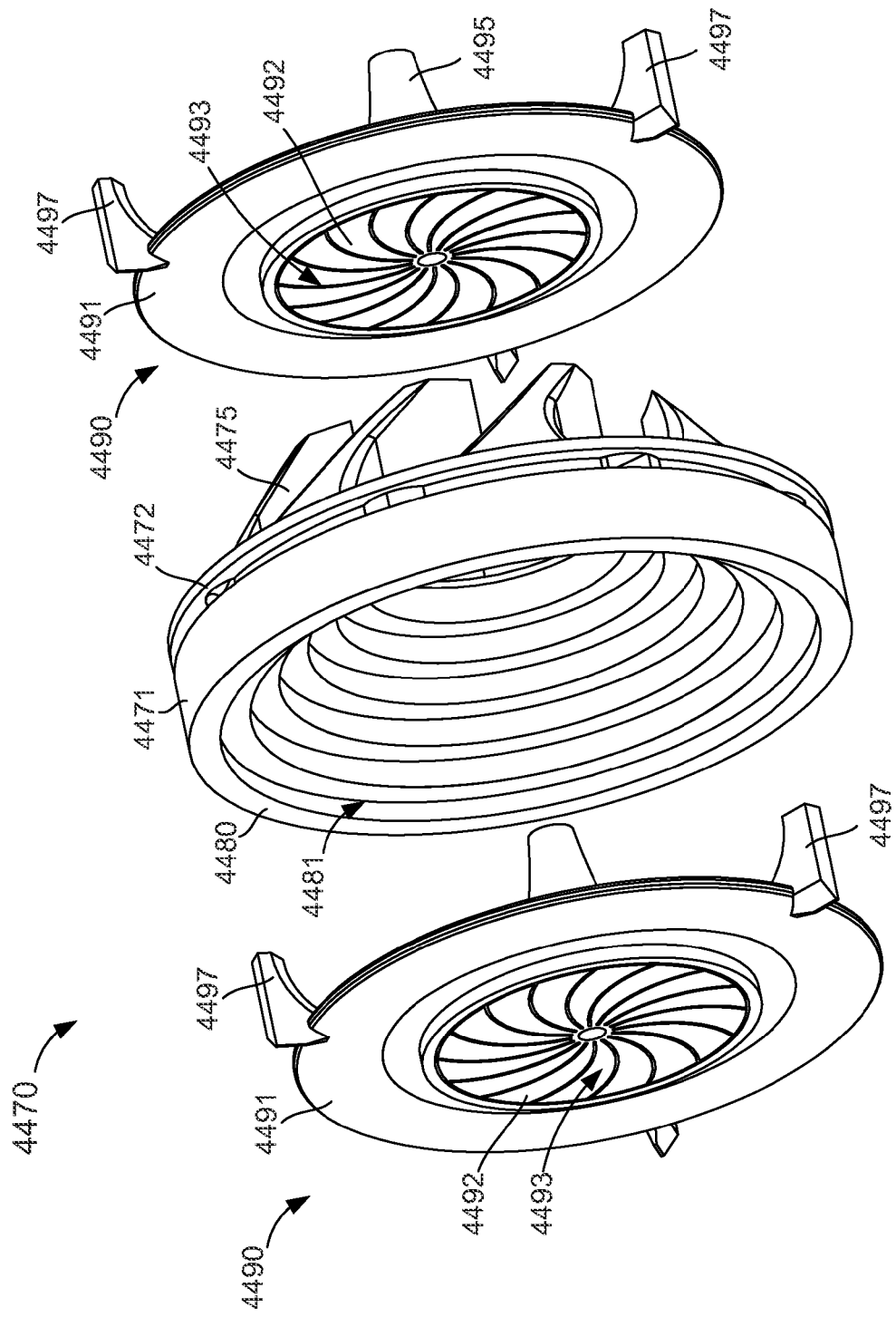
FIG. 28 is an exploded view of the portion of the evaporator assembly of FIG. 26.
Figure 30:
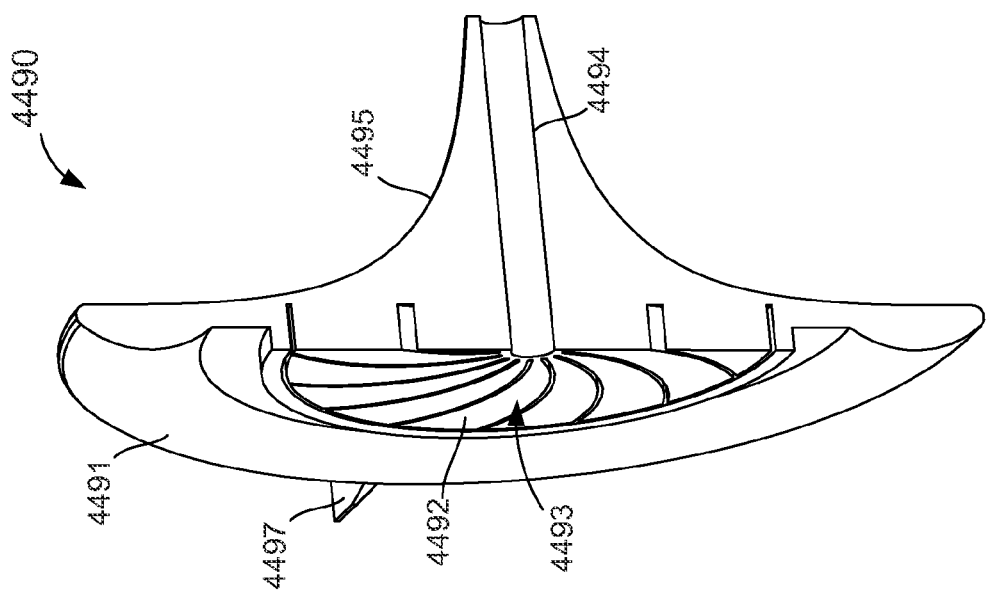
FIG. 30 is a cross-sectional view of the inlet flow member taken along the line $X_5$-$X_5$ in FIG. 29.
Figure 29:
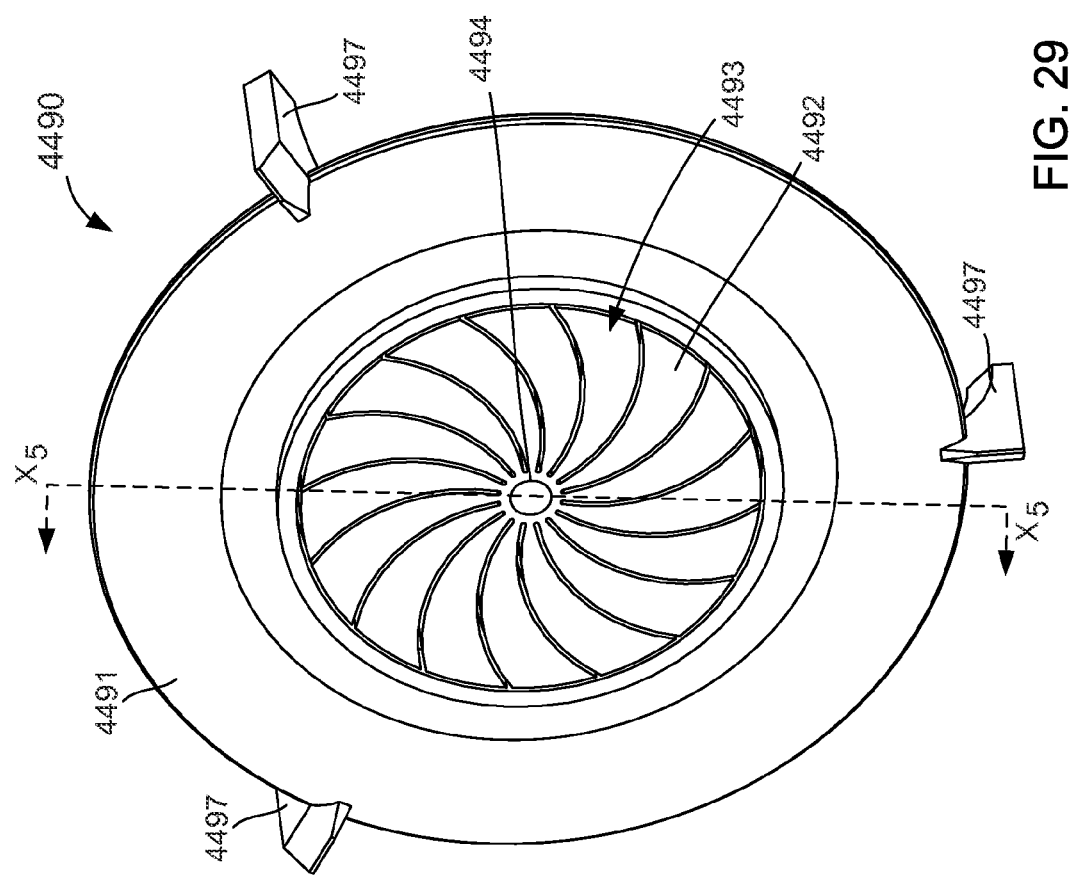
FIG. 29 is a front perspective view of an inlet flow member included in the evaporator assembly of FIG. 26.

As shown in FIG. 27 and further described herein, the first surface 4491 of the inlet flow member 4490 is a curved surface configured to direct at least a portion of a flow of the mixture into the first flow path 4477. Similarly, the third surface 4495 of the inlet flow member 4490 is a substantially inverse horn-shaped surface that diverges as the surface approaches the first surface 4491. Thus, the third surface 4995 of the inlet flow member 4490 and the second surface 4480 of the diffuser 4471 direct at least a portion of a flow of the mixture and/or the vapor portion of the solution in the second flow path 4482 that diverges from (e.g., spreads out from) the throat opening 4479, as described in further detail herein. As shown, the second surface 4492 of the inlet flow member 4490 defines a set of elongate openings 4493. The elongate openings 4493 extend in a curvilinear path from a position adjacent to the tie rod opening 4494 towards an outer edge of the second surface 4492, as described in further detail herein.

Figure 31:
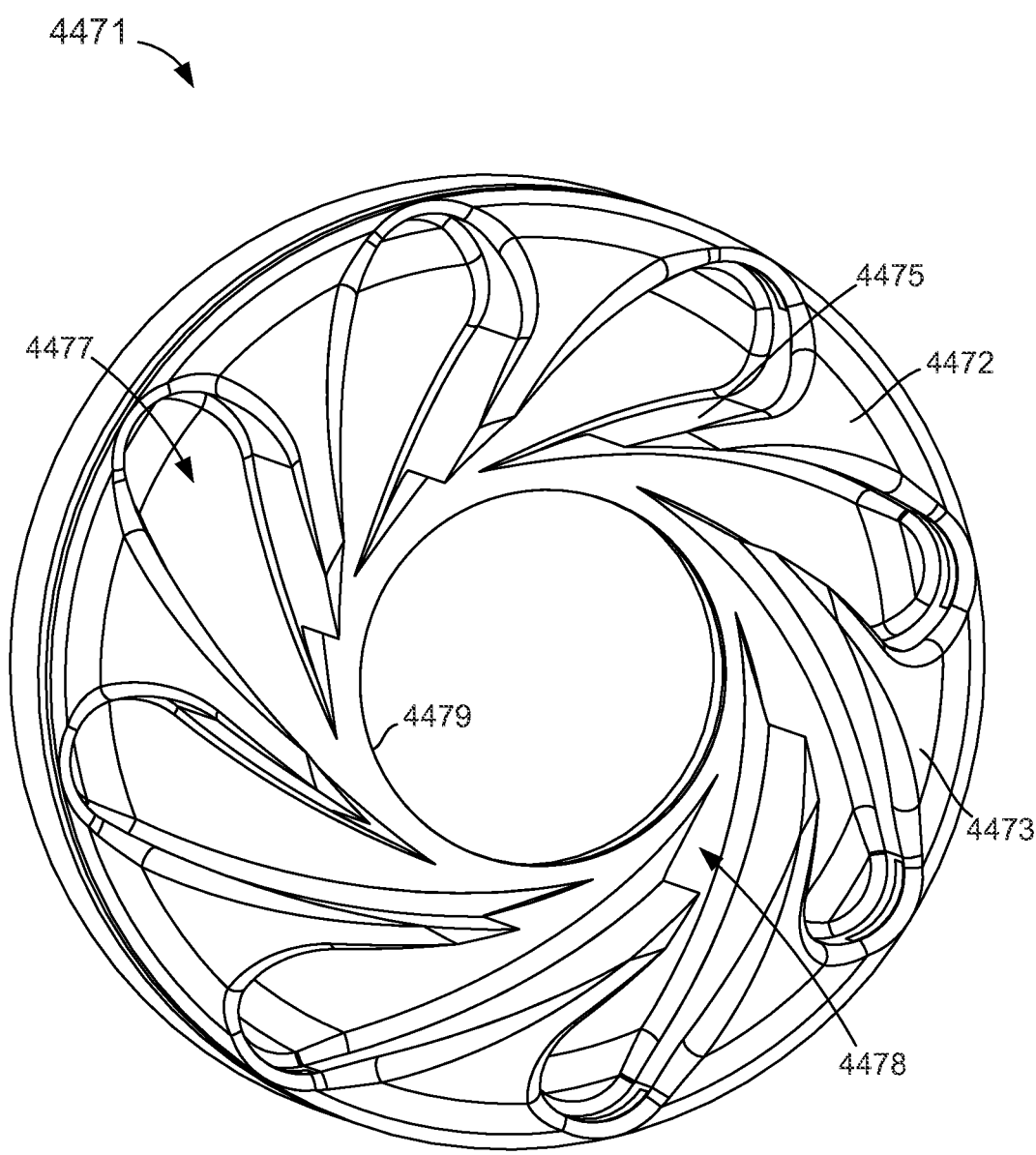
FIG. 31 is a front perspective view of a diffuser included in the evaporator assembly of FIG. 26.
Figure 33:
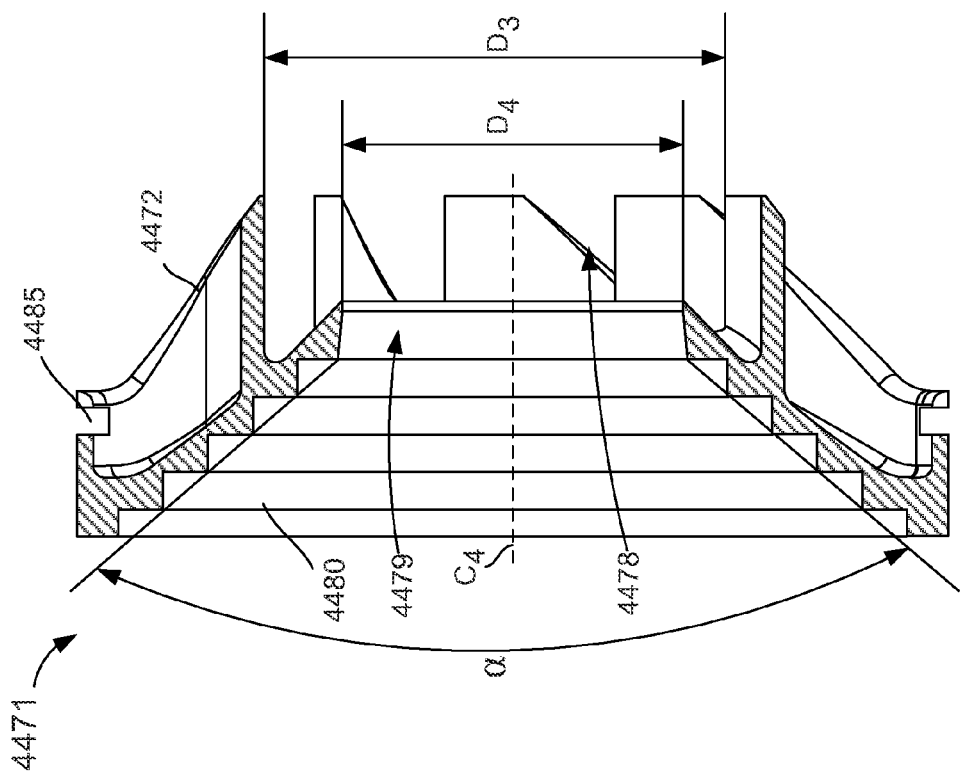
FIG. 33 is a cross-sectional view of the diffuser taken along the line $X_6$-$X_6$ in FIG. 32.
Figure 32:
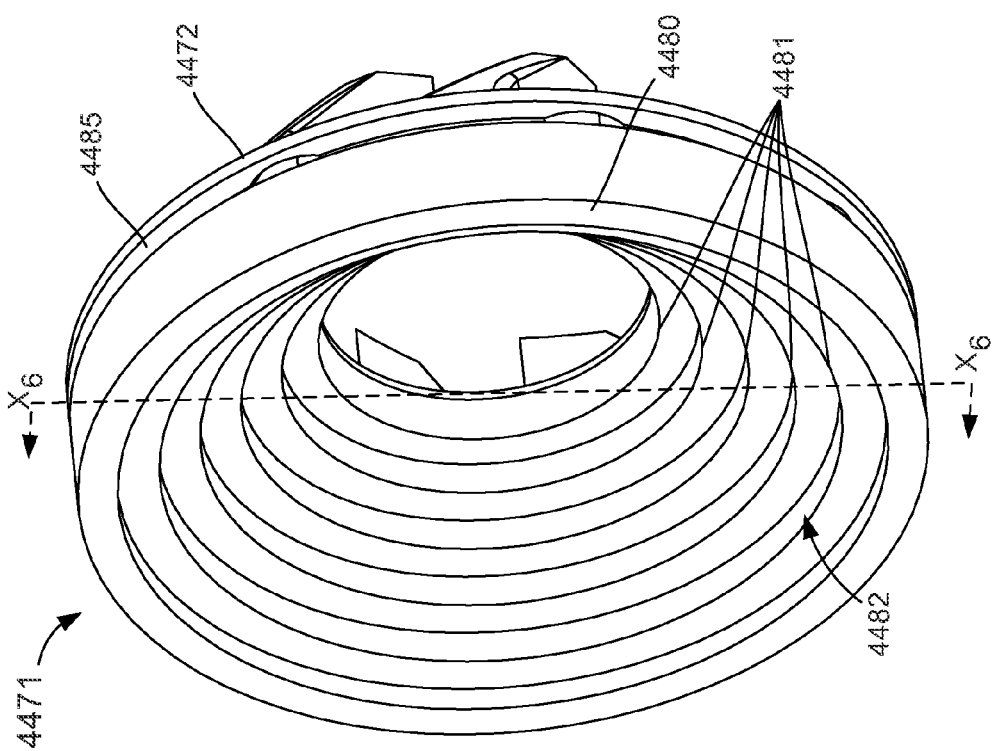
FIG. 32 is a rear perspective view of the diffuser of FIG. 31.
Figure 34:
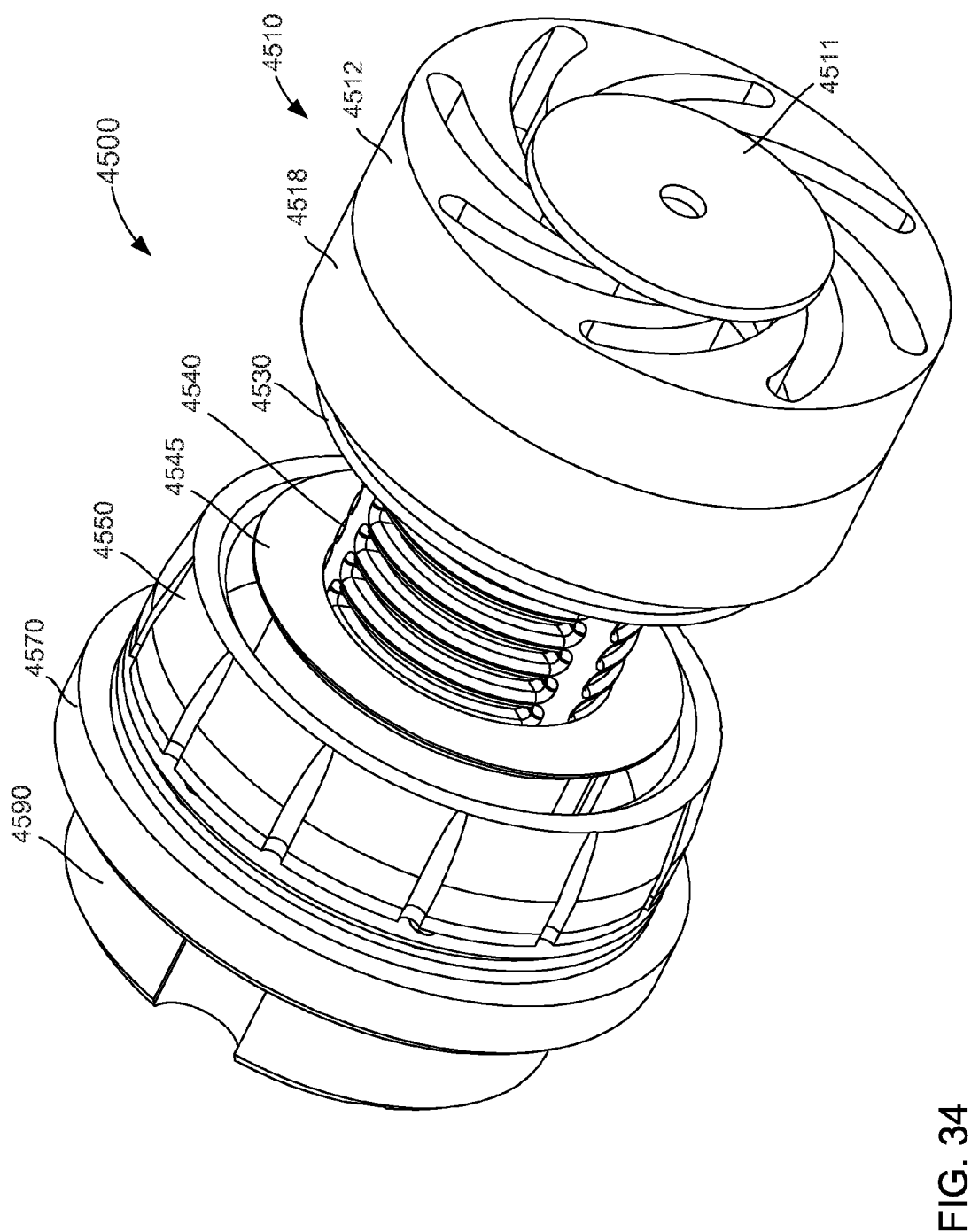
FIG. 34 is a perspective view of a separator assembly included in the processor assembly of FIG. 14.

Referring now to FIGS. 31-33, the diffuser 4471 can be any suitable device, mechanism, or component that is configured to define or direct at least a portion of a flow of the mixture and/or a flow of the vaporized portion of the solvent. The diffuser 4471 can be substantially similar in form and function as the diffuser 4450 included in the atomizer assembly 4200, thus similar portions of the diffuser 4471 are identified yet not described in detail. The diffuser 4571 of the evaporation assembly 4470 differs from the diffuser 4450 of the atomizer assembly 4450 with the inclusion of a seal member groove 4485 defined by the first surface 4472 (see e.g., FIGS. 32 and 33). In this manner, the seal member groove 4485 can receive a seal member (not shown) such as an O-ring or the like that forms a substantially fluid tight seal with an inner surface of the processor housing 4410. Thus, a flow of the mixture is limited and/or prevented from flowing along a circumferential surface of the diffuser 4471.

The first surface 4472 of the diffuser 4471 includes a set of vanes 4475. The vanes 4475 can be arranged to define at least a portion of the flow characteristic of the inlet mixture. For example, as described above, the vanes 4475 produce a rotational velocity within the flow of the mixture flowing within the first flow path 4477, as well as produce a cyclonic flow of the mixture and/or the vaporized portion of the solution that flows downstream of the evaporation volume 4478 and through the throat opening 4479 of the diffuser 4471. The first surface 4472 of the diffuser 4471 has a circumferential opening between the first flow path 4477 and the evaporation volume 4478. More specifically as shown in FIG. 33, the vanes 4475 include a leading edge that defines the circumferential opening with a diameter $D_3$. Similarly, the throat opening 4479 of the diffuser 4471 is a circumferential opening between the evaporation volume 4478 and the second flow path 4482 with a diameter $D_4$. The diameter $D_3$ defined by the leading edge of the vanes 4475 is larger than the diameter $D_4$ of the throat opening 4479, thereby reducing or eliminating a choke point (e.g., a point where the flow is slowed, choked, reduced, or otherwise limited) of the flow of the mixture downstream of the evaporation volume 4478. In some embodiments, the ratio of the diameter $D_3$ and the diameter $D_4$ can be between about 0.7 and 0.9. In other embodiments, the ratio can be larger than about 0.9 (e.g., 1.0, 1.25, 1.5, 2.0, or any fraction therebetween). In still other embodiments, the ratio can be smaller than 0.7 (e.g., 0.6, 0.5, 0.4, 0.3, 0.2, 0.1, or any suitable fraction therebetween).

As described above with reference to the diffuser 4450 of the atomizer assembly 4420, the second surface 4480 of the diffuser 4471 includes a set of shoulders 4481 and is configured diverge along a longitudinal centerline $C_4$ of the diffuser 4471. In some embodiments, the second surface 4480 can have a divergence angle $\alpha$ of about 95° to about 105°. In other embodiments, the second surface 4480 can have any suitable divergence angle $\alpha$ such as, for example, about 20°, about 40°, about 60°, about 80°, about 90°, about 95°, about 100°, about 110°, about 120°, about 140°, about 160°, or about 180°. The divergence of the second surface 4480 is such that the area between the evaporation volume 4478 within a plane substantially normal to the longitudinal centerline $C_4$ of the diffuser 4471 increases as the plane is moved downstream relative to the evaporation volume 4478. The increase in the flow area defined by the second surface 4480 decreases the pressure at or within the evaporation volume 4478. Thus, the pressure drop draws the mixture into the second flow path 4482 and further reduces the particle size of the mixture, thereby increasing the evaporation of the solvent.

Figure 35:
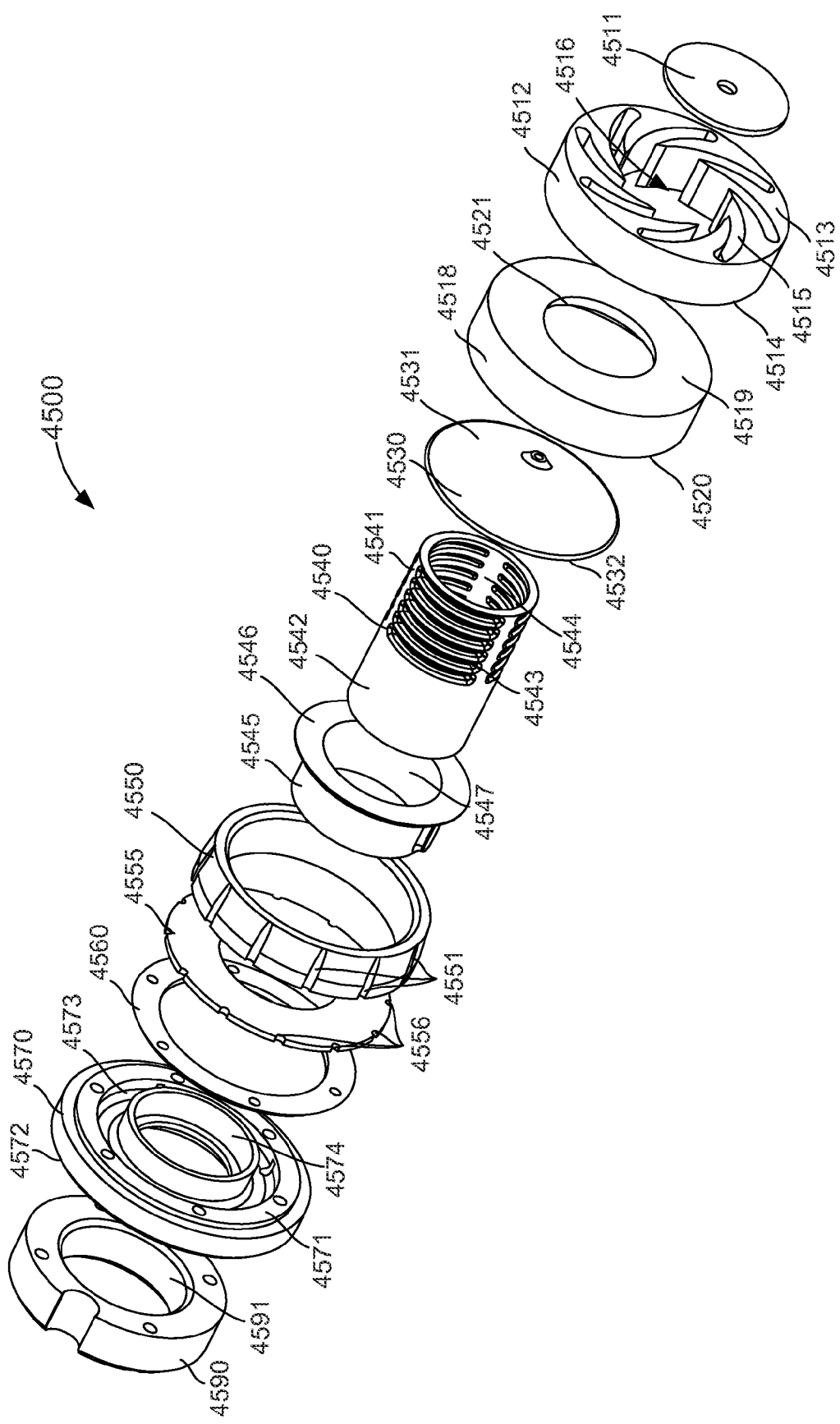
FIG. 35 is an exploded view of the separator assembly of FIG. 36.

As described above, the shoulders 4481 can be any suitable shape, size, or configuration. The arrangement of the shoulders 4481 reduces the amount of back flow as the mixture flows along the longitudinal centerline $C_4$ of the diffuser 4471 downstream of the throat opening 4479. Expanding further, the cyclonic rotation of the mixture (described above) as the mixture flows in the second flow path 4481 conveys the larger particles and/or the more dense particles of the mixture via centrifugal force onto the second surface 4480 of the diffuser 4471. Because f the localized area of low pressure in the throat opening 4479, such particles flow along the second surface 4480 toward the throat opening 4479 (e.g., a reverse flow). Thus, the shoulders 4481 included in or defined by the second surface 4480 breakup the backflow and produce a build-up of the particles disposed on each shoulder 4481. Therefore, as described above, when the build-up of particles reaches a given threshold, at least a portion of the particles flow from one shoulder 4481 to an adjacent shoulder 4481 that is upstream. When the portion of the particles move from one shoulder 4481 to an adjacent shoulder 4481, at least a portion of the particles become entrained in the mixture and flow within the second flow path 4482. Thus, the arrangement of the second surface 4480 of the diffuser 4471 (i.e., the shoulders 4462) is such the second flow path 4482 continually flows past the particles that are slung on the second surface 4480 and, therefore, allow the particles to be entrained in the flow of the mixture.

FIGS. 34-38 illustrate the separator assembly 4500 included in the processor assembly 4400 (and in the condenser assembly 4100 as described above with reference to FIG. 13). The separator assembly 4500 includes a centrifuge assembly 4510, an outlet flow member 4530, a vapor separator 4540, a vapor barrier 4545, a secondary drain 4550, an end plate 4555, a flange 4560, a terminal member 4570, and a coupler 4590 (see e.g., FIG. 34). The separator assembly 4500 receives a mixture of the gas and the solution and a vaporized portion of the solvent and produces a gaseous flow of water vapor (i.e., substantially saturated air) and a flow of waste products, including the solute, dissolved solids, and/or brine. Although described in the context of the processor 4400, the separator 4500 can also be similar to the separator shown and described in the condenser assembly 4100 (see e.g., FIG. 13). In the context of the condenser, the separator assembly produces a substantially dry gas flow and a flow of substantially purified liquid water. The purified water and the waste products can each be collected in a collection reservoir (not shown in FIGS. 4-38).

The centrifuge assembly 4510 includes a separator plate 4511, a centrifuge member 4512, and a drain member 4518. The centrifuge assembly 4510 is disposed upstream of the other portions of the separator assembly 4500 and is adjacent to and/or in contact with the second surface 4480 of the diffuser 4471 included in the last evaporation assembly 4470 (see e.g., FIG. 16). The separator plate 4511 is a cylindrical plate that is disposed adjacent to a first surface 4513 of the centrifuge member 4512. The centrifuge member 4512 further includes a second surface 4514 and defines a set of channels 4515 and a drain volume 4516. As shown in FIG. 35, the channels 4515 are curvilinear elongate openings that extend through the first surface 4513 and the second surface 4514. In this manner, the channels 4515 define a flow path that directs a flow of a mixture towards the drain volume 4516. More specifically, the curved shape of the channels 4515 produces a rotational velocity within in the flow as the flow exits the channels 4515. Furthermore, with the separator plate 4511 disposed adjacent to the first surface 4513 of the centrifuge member 4512, the separator plate 4511 substantially limits and/or prevents a flow from entering directly into the drain volume 4516. Similarly stated, the flow of the mixture enters the drain volume 4516 (substantially) only after flowing within the channels 4515.

Figure 36:
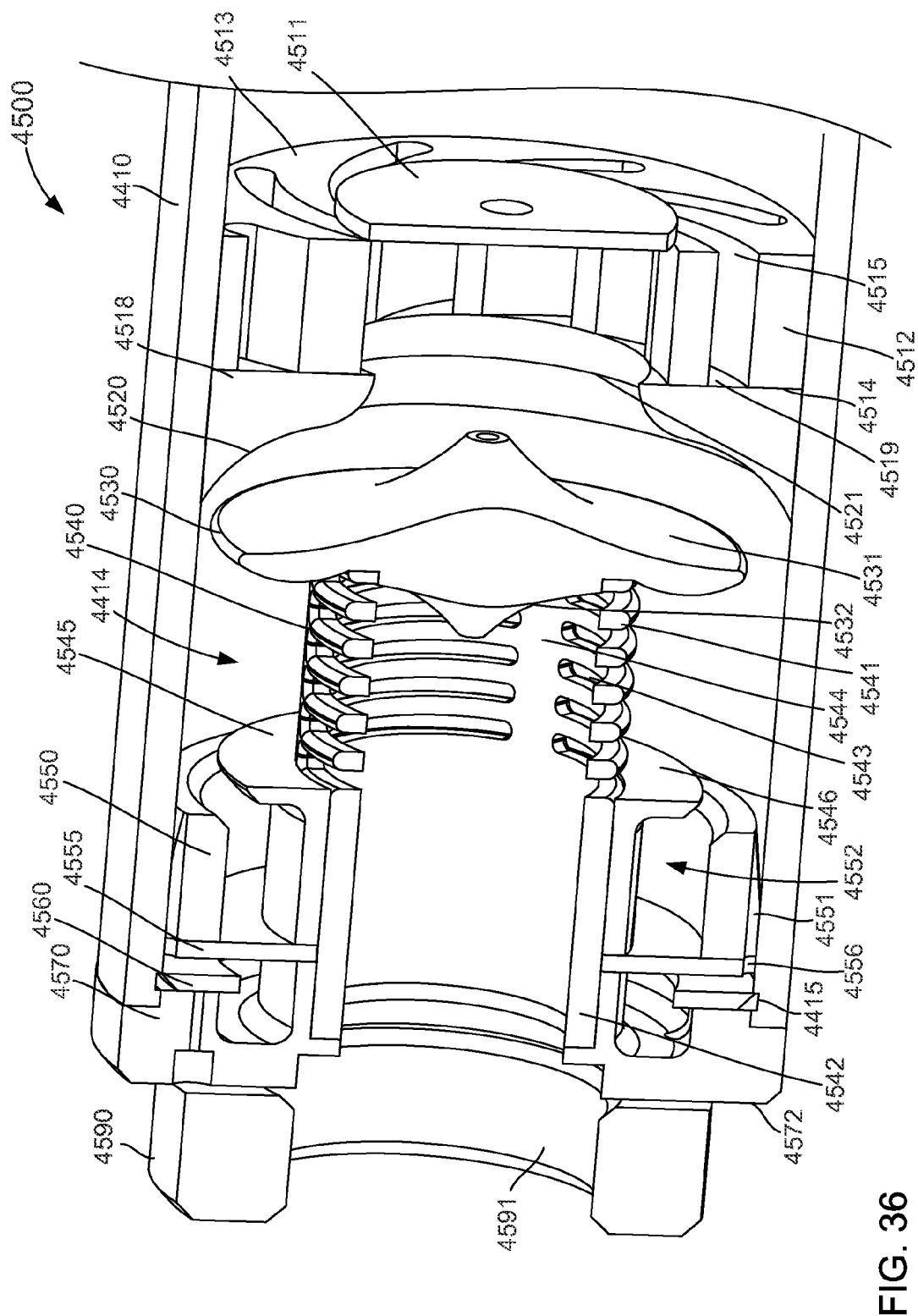
FIG. 36 is a cross-sectional view of a portion of the processor assembly taken along the line $X_1$-$X_1$ in FIG. 14, showing the separator assembly of FIG. 34 disposed within a processor housing.

The second surface of the centrifuge member 4512 is disposed adjacent to and in contact with a first surface 4519 of the drain member 4518. The drain member 4518 further includes a second surface 4520 and a drain opening 4521. The drain opening 4521 is in fluid communication with the drain volume 4516 of the centrifuge member 4512. As shown in FIG. 36, the second surface 4520 is tapered and/or diverges relative to the drain opening 4521 as the second surface 4520 extends in a downstream direction. More specifically, the second surface 4520 diverges in a curvilinear path from the drain opening 4521 towards the outlet flow member 4530. Thus, the rotational velocity of the flow (produced by the channels 4515) slings at least a portion of the mixture on the second surface 4520 as the mixture flows in a downstream direction. Moreover, as described above with reference to the diffusers 4450 and 4471, the divergence of the second surface 4520 increases the flow cross-sectional area defined by the second surface 4520 and therefore, produces a negative pressure downstream of the drain opening 4521 that draws the mixture through the drain opening 4521.

The outlet flow member 4530 includes a first surface 4531 and a second surface 4532 and is disposed about the tie rod 4401 (described above). The first surface 4531 has a substantially inverse horn-shape. Similarly stated, the first surface 4531 diverges in a curvilinear path from a first portion to a second portion downstream of the first portion. The second surface 4532 is in contact with the vapor separator 4540 and directs a flow of the mixture towards the vapor separator 4540, as described in further detail herein.

The vapor separator 4540 has a first end portion 4541 and a second end portion 4542 and defines an inner volume 4544 therebetween. The first end portion 4541 defines a set of transverse openings 4543. The transverse openings 4543 receive a gaseous portion of the mixture (e.g., air and/or the substantially saturated water vapor). In this manner, the gaseous vapor can flow downstream within the inner volume 4544 toward an opening 4591 defined by the coupler 4590. Similarly stated, the gaseous vapor can be separated from the liquid and/or solid portions of the mixture as the gaseous vapor enters the transverse openings 4543. Thus, the gaseous vapor exits the separator assembly 4500 via the opening 4591 defined by the coupler 4590 and enters the processor outlet tube 4050, as described in further detail herein.

The vapor barrier 4545 is disposed about the second end portion 4542 of the vapor separator 4540. More specifically, the vapor barrier 4545 includes a barrier surface 4546 that is disposed adjacent to the last set of transverse openings 4543 (e.g., the transverse openings that are the furthest downstream). In this manner, the barrier surface 4546 limits a portion of the flow of the mixture such that a portion of the mixture collects in front of the barrier surface 4545. The limiting of the flow of the mixture (e.g., a slowing or stopping of the flow) be the barrier surface 4546 can be such that the particles in the mixture having a greater density flow separate from the particles in the mixture that are less dense. Thus, the denser particles can collect at one portion of the barrier surface 4456 and the less dense particles can collect at a second portion of the barrier surface 4456 (e.g., bottom portion and a top portion, respectively).

The secondary drain member 4550 is a substantially annular and includes an outer surface that defines a set of grooves 4551. The secondary drain member 4550 is disposed about the vapor barrier 4545 such that a collection volume 4552 is defined between an inner surface of the secondary drain member 4550 and an outer surface of the vapor barrier 4545. Moreover, as shown in FIG. 36, the end plate 4555 is disposed about the vapor separator 4540 and downstream of the secondary drain member 4550 such that a surface of the end plate 4555 defines a portion of the collection volume 4552 (e.g., the surface forms a wall defining a portion of the collection volume 4552).

The barrier surface 4546 of the vapor barrier 4545 extends perpendicularly from the vapor separator 4540 to reduce an entrance path into the collection barrier 4545, as shown in FIG. 36. When the collection of the solid and/or liquid portion of the mixture reaches a given threshold amount (e.g., volume or quantity) a portion of the mixture can flow from the barrier surface 4546 and into the collection volume 4552. When the volume of the mixture within the collection volume 4552 reaches a given threshold a portion of the volume of the mixture flows out of the collection volume 4552 and through the grooves 4551 defined by the secondary drain member 4550. Expanding further, the arrangement of the vapor barrier 4545 and the secondary drain member 4550 increases the pressure within the flow of the mixture directly upstream of the secondary drain stream 4550. Similarly stated, the reduction of the entrance into the collection volume 4552 decreases a volume of the flow path of the mixture. Thus, the decrease in volume increases the pressure within the flow path directly upstream of the portion at which the volume is decreased. The increase in pressure within the flow path of the mixture is sufficiently large to "push" a portion of the solid and/or liquid portion of the mixture through the grooves 4551 defined by the secondary drain member 4550. In addition, the end plate 4555 defines a set of grooves 4556 that correspond to the grooves 4551 of the secondary drain member 4550. Therefore, the mixture flows through the grooves 4556 of the end plate 4555 to enter a receiving volume 4575 defined by the terminal member 4570.

The terminal member 4570 has a first surface 4571 and a second surface 4572. As shown in FIG. 36, a portion of the terminal member 4570 is disposed outside of the processor housing 4410 and the second surface 4572 is coupled to the coupler 4590. Moreover, the end flange 4560 is partially disposed within a flange groove 4415 defined by the processor housing 4410 and is coupled to the first surface 4571 of the terminal member 4570. In this manner, the terminal member 4570 and the coupler 4590 are coupled to the processor housing 4410.

Figure 37:
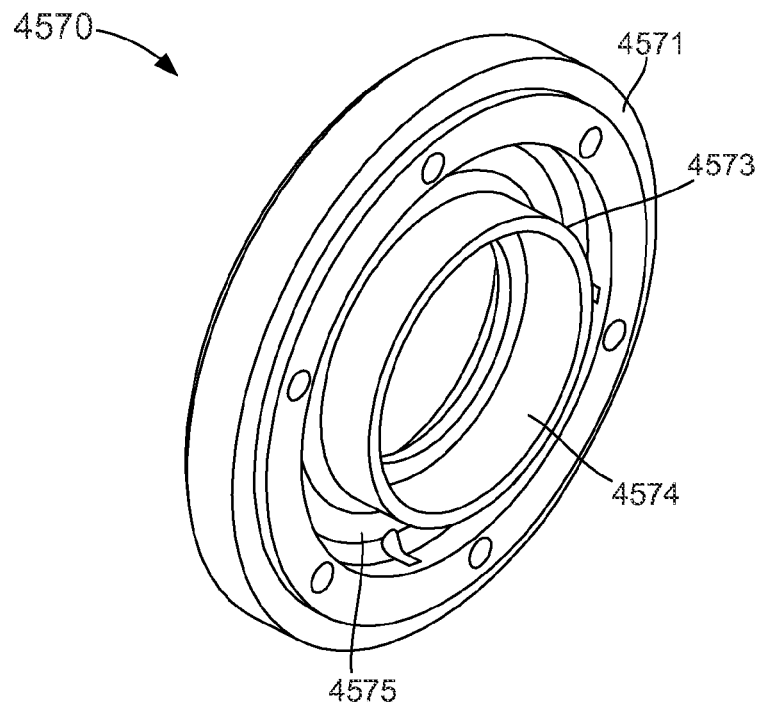
FIGS. 37 and 38 are a front perspective view and a rear perspective view of a terminal member included in the separator assembly of FIG. 34.
Figure 38:
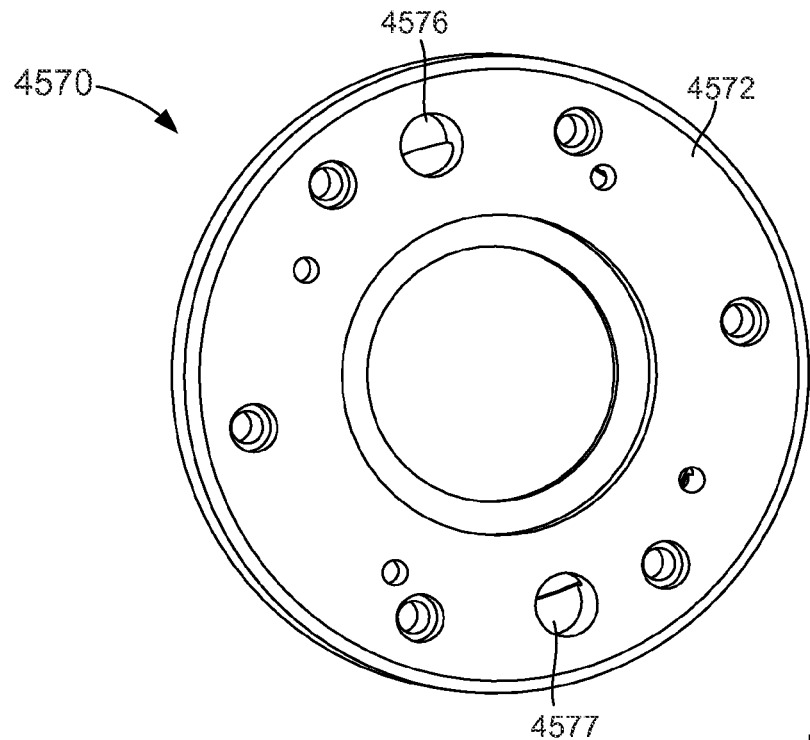

As shown in FIGS. 37 and 38, the first surface 4571 includes a receiving portion 4573 that extends from the first surface 4571 and defines an inner volume 4574. The inner volume 4574 receives the second end portion 4542 of the vapor separator 4540 such that the receiving portion 4573 is disposed adjacent to and in contact with the end plate 4555 (see e.g., FIG. 36). The terminal member 4570 defines a first outlet 4576 and a second outlet 4578 that are each in fluid communication with the receiving volume 4575. Therefore, with the solid and/or liquid portion of the mixture at least partially separated by the barrier surface 4546 (as described above), the first outlet 4576 and the second outlet 4578 can receive a flow waste products (e.g., the denser portion of the mixture). Moreover, the first outlet 4576 and the second outlet 4578 can each be fluidically coupled to collection reservoirs. Thus, the waste products (e.g., the solute of the solution, dissolved solids, and/or brine) can be collected and discarded.

As described above, the system 4000 receives a flow of a gas and an inlet solution which is separated to produces a gaseous flow of vapor (e.g., water vapor), a flow of purified liquid (e.g., purified water), and a flow of waste products (e.g., solutes or dissolve solids). The following discussion describes the function of the system 4000 relative to an inlet air flowing within a flow path through the system 4000. In use, the air pump 4210 receives a flow of air from the processor assembly 4400 that is compressed to produce a supply of inlet air (inlet to the condenser assembly 4100 via the heat exchanger assembly 4300). Thus, the airflow through the air pump 4210 is substantially saturated with the purified water vapor. Similarly stated, the processor assembly 4400 is considered as being on the "suction" side of the air pump 4210.

While described above as being a closed air circuit, in some instances, startup of the system 4000 can begin with a compression of ambient air having an initial humidity value to produce the flow of inlet air. The air pump 4210 delivers a flow of the substantially saturated air into the first heat exchanger 4310, as described above with reference to FIGS. 7-9. In this manner, the flow of inlet air flows within the heat exchanger element 4319. Once the system 4000 is operating at steady state (e.g., a predetermined time after startup), a cross flow of cooled substantially dry air (delivered from the condenser assembly 4100 via the condenser outlet pipe 4030) flows within the housing 4311 of the first heat exchanger 4310 (FIGS. 10 and 11). Thus, the substantially saturated air flowing within the heat exchanger element 4319 transfers a portion of heat to the cross flow of the substantially dry, air, as described below.

Upon exiting the first heat exchanger 4310 the air flows within the heat exchanger pipe 4010 to the second heat exchanger 4330. In this manner, the substantially saturated air flows through the heat exchanger element 4340 (as described above) and transfers a portion of heat to a cross flow of relatively cool gaseous vapor from the processor assembly 4400 (described below). With the substantially saturated air being cooled through the heat exchanger assembly 4300, the air then flows within the condenser inlet pipe 4020 into the condenser assembly 4100 (FIGS. 12 and 13). As described above, the inlet air is further cooled and condensed by the condenser assembly 4100 and separated by one of the separator assemblies 4500 to produce a flow of condensed substantially purified liquid and a flow of cooled, substantially dry air. The condensed substantially purified liquid is collected in a collection reservoir. The cooled, substantially dry air flows within the condenser outlet pipe 4030 to the "cold side" of the first heat exchanger 4310. In some instances, prior to achieving steady state, the condenser assembly 4100 cools the inlet air, as described above, but the inlet air is not sufficiently humid to be condensed. Thus, the condensed purified liquid is not collected until the system 4000 reaches steady state.

The cooled air (e.g., the substantially dry air) enters the housing 4311 of the first heat exchanger 4310 and flow across an outer surface of the heat exchanger element 4319 (FIGS. 10 and 11). In this manner, a portion of heat from substantially saturated air upstream (i.e., from the outlet of the air pump 4210) that is flowing within the heat exchanger element 4319 is transferred to the cooled air. The heating of the substantially dry air prior to flowing into the processor assembly 4400 enhances the absorption rate of the air. Upon exiting the second outlet 4317 of the first heat exchanger 4310, the heated air flows within the processor inlet tube 4040 and enters the processor assembly 4400 (FIGS. 14-38). As described above, the heated air enters the first flow path 4457 towards the mixing chamber 4455 (FIG. 22). Concurrently, inlet water (e.g., an inlet solution, which can be seawater, industrial wastewater or the like) flows within the flow path defined by the first injector member 4431 and the second injector member 4440 towards the mixing chamber 4455 (FIG. 21). Thus, the heated air and the inlet water are mixed within the mixing chamber 4455. More specifically, the vanes 4452 of the diffuser 4450 direct the flow of the heat air such that the heated air collides with the flow of inlet water exiting the elongated openings 4433 defined by the first injector member 4431 at a substantially perpendicular angle. This arrangement further reduces the particle size of the inlet water and enhances the mixing of the heated air and the inlet water. In addition, the vanes 4452 produce the rotational velocity of the heated air and produce a cyclonic rotation of the mixture within the mixing chamber 4455, throat opening 4456, and/or second flow path 4463, thereby further enhancing the mixing of the heated air and the inlet water.

Figure 24:
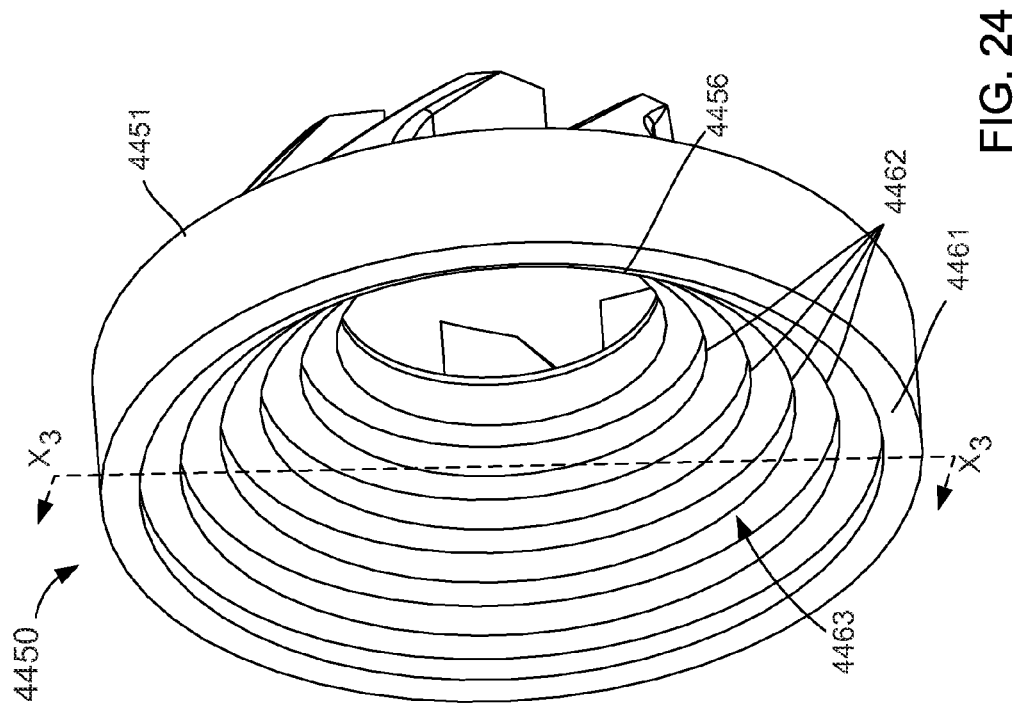
FIG. 24 is a rear perspective view of the diffuser of FIG. 22.
Figure 26:
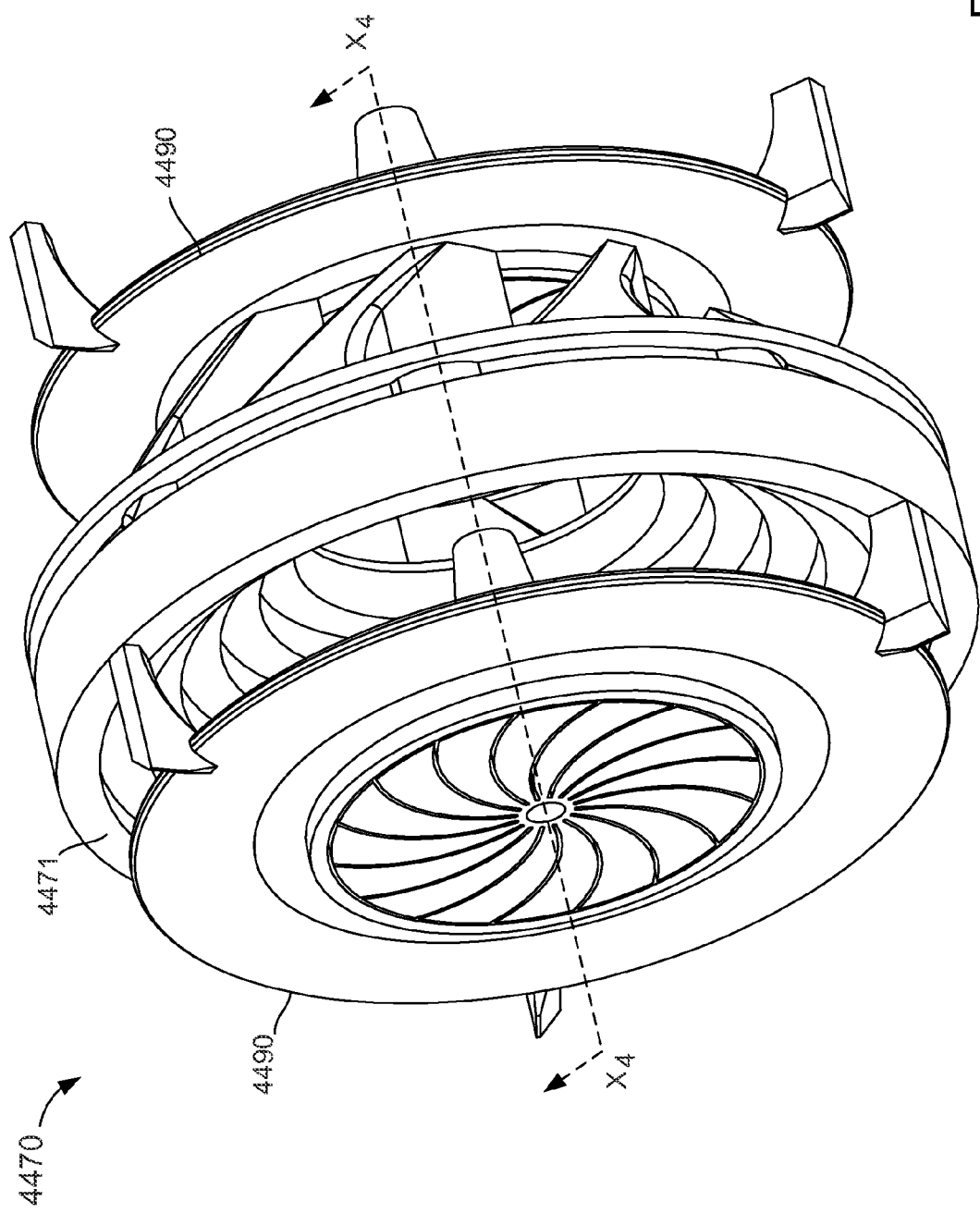
FIG. 26 is a perspective view of a portion of an evaporator assembly included in the processor assembly of FIG. 14.

Upon exiting the mixing chamber 4455, the mixture (e.g., the substantially mixed air and inlet water) flows through the throat opening 4456 defined by the diffuser 4450 and enters the second flow path 4463 (FIGS. 24 and 25). As described above, the arrangement of the second surface 4461 produces a negative pressure downstream of the throat opening 4456 that draws the mixture through the throat opening 4456 and into the second flow path 4463. Moreover, the rotation velocity of the mixture slings larger of denser particles on the second surface 4461 which collect of the shoulders 4462 of the second surface 4461. Thus, the back flow of particles is reduced. Furthermore, at least a portion of the larger or denser particles of the mixture are entrained in a flow of the mixture that is substantially upstream.

The flow of the mixture flows within the second flow path 4463 around the third surface 4495 of the inlet flow member 4490 (FIG. 16). In this manner, the mixture flows around the inlet flow member 4490 (e.g., between an inner surface of the processor housing 4410 and the inlet flow member 4490) and enters the first flow path 4477 defined by the first surface 4491 of the inlet flow member 4490 and the first surface 4472 of the diffuser 4471. Thus, the mixture flows within the first flow path 4477 toward the evaporation volume 4478 defined between the second surface 4492 of the inlet flow member 4490 and a portion of the first surface 4472 of the diffuser 4471. As described above, the vanes 4475 of the diffuser 4471 produce a rotational velocity of the mixture within the first flow path 4477. Furthermore, a portion of the mixture (e.g., a portion of the mixture with larger or more dense particles) flows within the elongate openings 4493 defined by the second surface 4492 of the inlet flow member 4490. In this manner, the portion of the mixture fills the elongate openings 4493 such that a volume of the portion of the mixture exits the elongate openings 4493. Thus, the mixture flowing within the first flow path 4477 collides with the volume exiting the elongate openings 4493 at a substantially perpendicular direction, thereby reducing the size of the particles within the volume and enhancing the evaporation of the inlet water into the air (e.g., increasing the humidity value by further saturating the air). Thus, the mixture enters the evaporation volume 4478 where a portion of the inlet water contained in the mixture is evaporated into the gaseous vapor portion of the mixture. Similarly stated, a portion of the mixture is evaporated, thereby increasing the humidity of the gaseous vapor portion of the mixture.

Upon exiting the evaporation volume 4478, the mixture flows through the throat opening 4479 defined by the diffuser 4471 and enters the second flow path 4477 (FIG. 27). As described above, the arrangement of the second surface 4480 of the diffuser 4471 produces a negative pressure downstream of the throat opening 4479 that draws the mixture through the throat opening 4479 and into the second flow path 4482. Moreover, the rotation velocity of the mixture slings larger or denser particles on the second surface 4480 which collect on the shoulders 4481 of the second surface 4480. Thus, the back flow of particles is reduced and/or controlled. Furthermore, at least a portion of the larger or denser particles of the mixture are entrained in a flow of the mixture that is substantially upstream. In this manner, the mixture serially flows through the processor assembly 4400. Similarly stated, the mixture serially flows from one evaporation assembly 4470 to an adjacent evaporation assembly 4470 that is downstream. Thus, the humidity ratio of the gaseous vapor portion is serially increased as the mixture flows through the evaporations assemblies 4470. Similarly stated, the inlet water is serially evaporated, thereby serially increasing the saturation of the air flow (which is referred to at this point as being substantially saturated, even though the relative humidity may be less than 100%).

Upon exiting the last evaporation assembly 4470 (e.g., the evaporation assembly 4470 that is disposed at a position downstream of all other evaporation assemblies 4470), the mixture enters the separator assembly 4500. More specifically, the mixture enters the channels 4515 defined by the centrifuge member 4512 and flows through the drain opening 4521 of the drain member 4520 (see e.g., FIG. 36). The mixture then flows around the outlet flow member 4530 and within the processing housing 4410. In this manner, at least a portion of the gaseous vapor (with the substantially pure solvent in the vapor phase) flows into the transverse openings 4543 defined by the vapor separator 4540 and enters the inner volume 4544. Thus, the gaseous vapor flows within the inner volume 4544 and through the opening 4591 defined by the coupler 4590.

With the substantially pure gaseous vapor separated from the solid and/or liquid portion of the mixture, the solutes of the solution (i.e., inlet water) collect at the barrier surface 4546 of the vapor barrier 4545. As the partially separated mixture collects along the barrier surface 4546, the mixture is further separated (as described above). Moreover, the pressure immediately upstream of the barrier surface 4546 is increased. Thus, the substantially separated mixture is "pushed" trough the grooves 4551 of the secondary drain member 4550 and the grooves 4556 of the end plate 4555 to enter the receiving volume 4575 defined by the terminal member 4570. In this manner, the waste products flow through the second outlet 4578 (see e.g., FIG. 38).

The gaseous vapor exits the processor assembly 4400 with a significantly larger humidity ratio than the initial humidity ratio of the inlet air (i.e., the air initially flowing into the processor assembly 4400). The gaseous vapor flows within the processor outlet pipe 4050 to the second inlet 4335 of the second heat exchanger 4310 (see e.g., FIG. 4). In this manner, the gaseous vapor enters the housing 4331 of the second heat exchanger 4330 and a portion of the heat from the inlet air flowing upstream of the gaseous vapor and within the heat exchanger element 4340 is transferred to the gaseous vapor. Thus, the airflow from the outlet of the air pump 4210 is cooled as described above. The gaseous vapor flows into the return portion 4339 of the inner volume 4338 defined by the housing 4331 and is drawn into the inlet portion 4211 of the air pump 4210. Therefore, the air pump 4210 compresses the gaseous vapor to again produce the compressed inlet air.

The flow of air through the system 4000 undergoes various temperature and pressure changes as the air flows through the system 4000. For example, the air pump 4210 compresses the air to a pressure that can be above atmospheric pressure at the outlet portion 4212 of the air pump 4210 yet produces a negative pressure at the inlet portion 4211. As the air flows through the heat exchanger assembly 4300 temperature of the air is reduced. Considering the air as an ideal gas, the reduction in temperature with a constant volume corresponds to a reduction in pressure of the air. Similarly, the reduction in volume and temperature of the air through the condenser assembly 4100 increases the relative pressure of the air and therefore, enhances the condensing of the air. The temperature of the air is again increased as the air flows in a cross stream through the first heat exchanger 4310. Thus, the pressure of the flow of air is again increased prior to the air entering the processor assembly 4400.

As described in detail above, the arrangement of the atomizer assembly 4420 and the evaporation assemblies 4470 are such that the pressure is serially reduced as the air (and now the mixture) flows through processor assembly 4400. In some instances, the pressure within the flow of the mixture through the processor assembly 4400 can drop from a positive pressure (e.g., above atmospheric pressure) to a negative pressure (e.g., below atmospheric pressure or substantially producing a vacuum). Thus, the mixture can be drawn through the processor assembly 4500. The gaseous portion of the mixture can exit the separator without experiencing a significant pressure drop as the gaseous portion flows through the vapor separator 4540. The pressure of the liquid portion and/or the waste portion of the mixture, however, is increased as the portion of the mixture is placed in contact with the vapor barrier 4545 and/or the secondary drain member 4550, as described above. Thus, the increase in pressure of the flow of the mixture is such that a portion of the mixture "pushes" a portion of the mixture through the grooves 4551 of the secondary drain member 4550 and through the outlet openings defined by the terminal member 4570.

As described above, the air pump 4210 produces a negative pressure directly upstream of the inlet portion 4211. Therefore, with the inlet portion 4211 in fluid communication with the inner volume 4338 defined by the housing 4331 of the second heat exchanger 4330, the negative pressure draws the gaseous vapor from the separator 4500 and through the processor outlet pipe 4050 and the second heat exchanger 4330. While described above as running through a range of pressures that includes both above atmospheric pressure and below atmospheric pressure, in other embodiments, the system 4000 can be run entirely above or entirely below atmospheric pressure.

Figure 39:
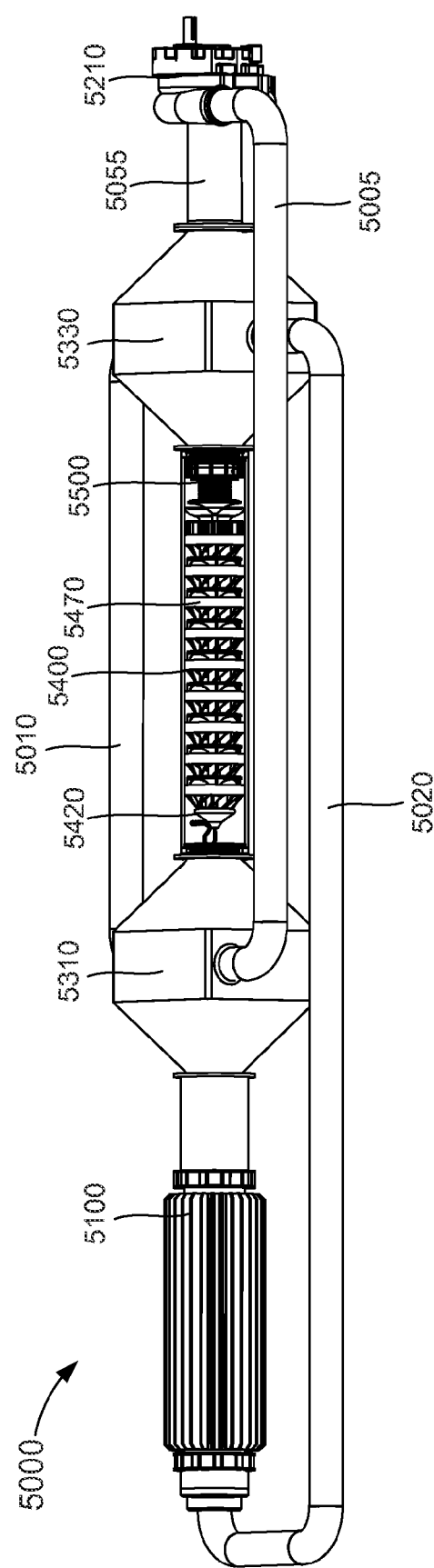
FIG. 39 is a side view of a water purification system according to an embodiment.

Although the system 4000 and the components included therein have been specifically shown and described, in some embodiments, a water purification system can be arranged in any suitable configuration and can receive a flow of a gas and a solution to produce a flow of a gaseous vapor, a substantially purified flow of the solvent, and a flow of waste products (e.g., solute of dissolved solids). For example, FIG. 39 illustrates a water purification system 5000 according to an embodiment. The water purification system 5000 (also referred to herein as "system") includes an air pump 5210, a first heat exchanger 5310, a second heat exchanger 5330, a condenser assembly 5100, a processor assembly 5400 and one or more separator assemblies 5500. As described in detail above with reference to the system 4000, the air pump 5210 can receive a flow of air and compress the air to produce a flow of inlet air. The inlet air flows within a heat exchanger inlet pipe 5005 to the first heat exchanger 5310. The first heat exchanger 5310 can function similarly as the first heat exchanger 4310 described above. Thus, a portion of heat is transferred from the inlet air to a cross flow of cooled yet uncondensed vapor (described below). The cooled inlet air flows within a heat exchanger outlet pipe 5010 to the second heat exchanger 5330. As described above, a portion of heat is again transferred to a cross flow of gaseous vapor (described below). Upon exiting the second heat exchanger 5330 the cooled inlet air flows within a condenser inlet pipe 5020 and enters the condenser assembly 5100. As described above in detail with reference to the condenser assembly 4100, the inlet air is condensed and separated (e.g., by a separator assembly 5500 not shown in FIG. 39) to produce a flow of condensed substantially purified water and a cooled, substantially dry flow of air. While not shown in FIG. 39, the purified water can be collected for use. The flow of the cooled, substantially dry air exits the condenser assembly 5100 and directly enters the first heat exchanger 5310. As described above, a portion of heat from the inlet air is transferred to the flow of cooled air, thereby increasing the temperature of the flow. In this manner, the flow of the warmed water vapor flows directly to the processor assembly 5400. As described above with reference to the processor assembly 4400, the processor assembly 5400 includes an atomizer assembly 5420 and a set of evaporation assemblies 5470. Thus, the inlet solution is delivered to the atomizer 5420 and mixed with the warmed water vapor. More specifically, the particle size of the inlet solution is reduced to very small particles to enhance the mixing of the inlet solution with the water vapor. The mixture then flows serially through the evaporator assemblies 5470 where the inlet solution evaporates to further saturate the vapor portion of the mixture. Upon exiting the last evaporation assembly 5470, the mixture enters the separator assembly 5500 and is separated into a flow of gaseous vapor (including the substantially purified water) and flow of waste products. The flow of the waste products is collected and discarded. The gaseous vapor exits the separator assembly 5500 and flows through the second heat exchanger 5330 where a portion of heat is transferred from the inlet air to the gaseous vapor. The gaseous vapor is then drawn into the air pump 5210 and again compressed to produce the inlet air. Thus, the system 5000 can be configured to circulate the flow of air to enhance the efficiency of the system 5000.

Figure 40:
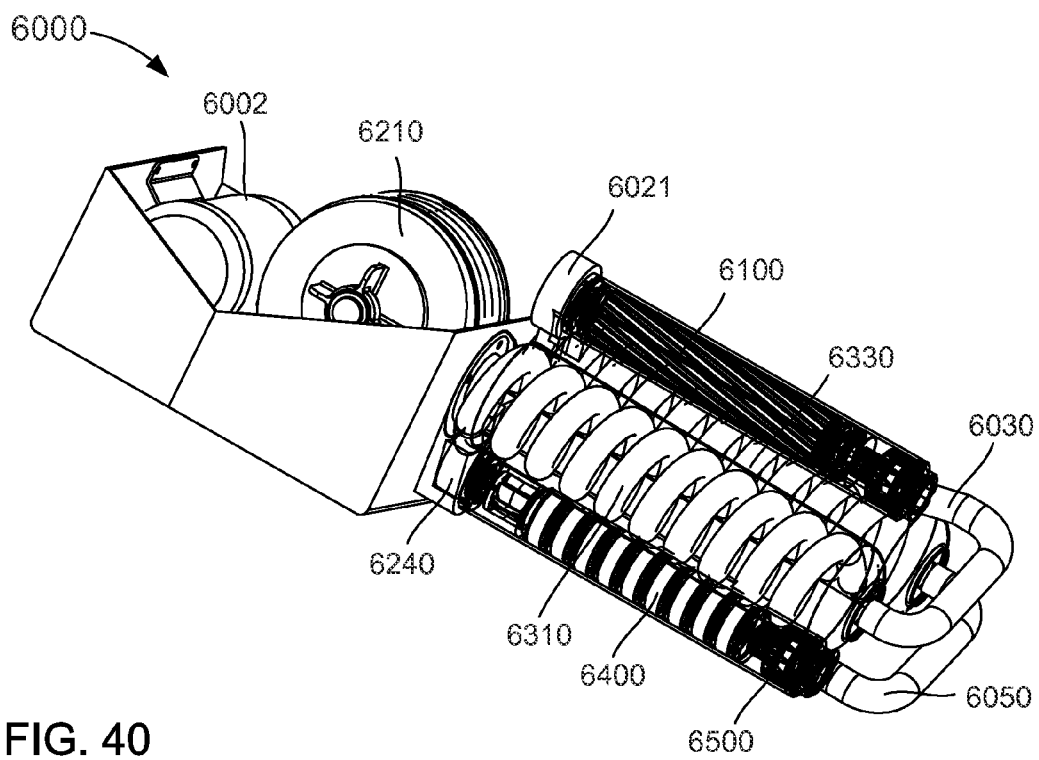
FIG. 40 is a perspective view of a water purification system according to an embodiment.

FIG. 40 illustrates a system 6000 according to an embodiment. The system 6000 receives a flow of a gas and a solution to produce a flow of a gaseous vapor, a substantially purified flow of the solvent, and a flow of waste products (e.g., solute of dissolved solids). The system 6000 includes a motor 6002, an air pump 6210, a condenser assembly 6100, a first heat exchanger 6310, a second heat exchanger 6330, a processor 6400 and at least one separator assembly 6500. The motor 6002 (e.g., an electric motor) drives the air pump 6210. The air pump 6210 receives and compresses a flow of air to produce a flow of inlet air. The inlet air flows into an adapter 6240 configured to split the flow on inlet air. For example, the adapter 6240 can divide the flow of inlet air into a first flow that is delivered to the processor assembly 6400 and a second flow that is delivered to the first heat exchanger 6310. As described in detail with reference to the processor assembly 4400, the processor assembly 6400 receives a flow of an inlet solution which is atomized and/or evaporated such that at least a portion of the inlet air becomes substantially saturated with the solvent of the liquid (e.g., the purified water). The mixture of the solution and the inlet air then enters the separator assembly 6500 which is separated to produce a flow of gaseous vapor, substantially purified water, and/or a flow of waste products. The flow of the substantially purified water is collected for use and the flow of waste products is collected and discarded. The gaseous vapor exits the separator assembly 6500 and flows within a processor outlet pipe 6050 to the second heat exchanger 6330 where a portion of heat is transferred from the gaseous vapor to a cross flow of inlet air. The cooled water vapor flows through a condenser plenum 6021 and enters the condenser assembly 6100. As described above in detail with reference to the condenser assembly 4100, the water vapor is at least partially condensed and separated (e.g., by a separator assembly 6500 not shown in FIG. 40) to produce a flow of condensed substantially purified water and a cooled, substantially dry air. While not shown in FIG. 40, the purified water can be collected for use. The flow of the cooled, substantially dry air exits the condenser assembly 6100 flows within a condenser outlet pipe 6030 into the first heat exchanger 6310. Although not shown in FIG. 40, a first flow path of the first heat exchanger 6310 and a first flow path of the second heat 6330 are in fluid communication (e.g., via a pipe, manifold, plenum, etc.). Thus, the air can be returned to the air pump 6210, thereby allowing the system to circulate system air to enhance the efficiency of the system 6000.

Figure 41:
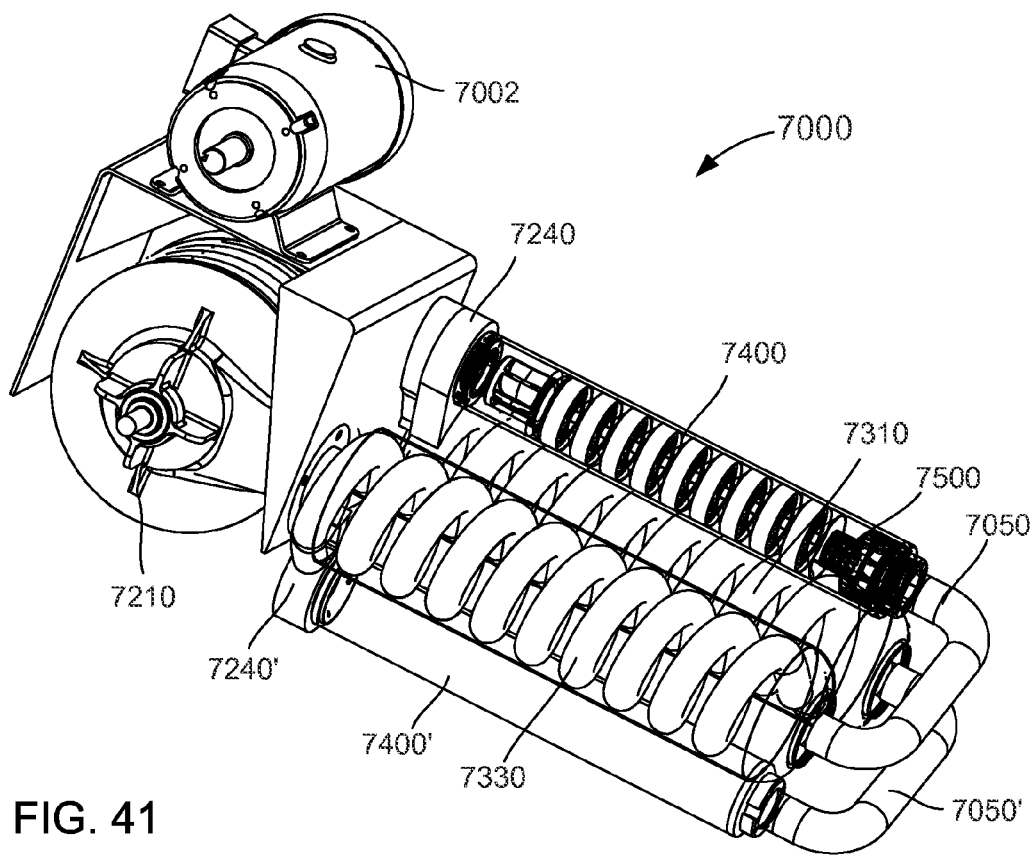
FIG. 41 is a perspective view of a water purification system according to an embodiment.

Although the systems 4000, 5000, and 6000 are shown and described as including a condenser assembly, in other embodiments, a water purification system need not include a condenser assembly and can rather include a second processor assembly. For example, FIG. 41 illustrates a system 7000 according to an embodiment. The system 7000 includes a motor 7002, an air pump 7210, a first heat exchanger 7310, a second heat exchanger 7330, a first processor assembly 7400, a second processor assembly 7400', a set of separator assemblies 7500 (only one separator assembly 7500 is shown in FIG. 41, however, as described, the second processor assembly 7400' includes or is coupled to a separator assembly). The motor 7002 (e.g., an electric motor) drives the air pump 7210. The air pump 7210 receives and compresses a flow of air to produce a flow of inlet air. The inlet air flows into an adapter 7240 configured to split the flow on inlet air. For example, the adapter 7240 can divide the flow of inlet air into a first flow that is delivered to the first heat exchanger 7310 and a second flow that is delivered to the processor assembly 7400. The first flow of inlet air flows through the first heat exchanger 7310 and heats a cross flow of gaseous vapor delivered from the second processor assembly 7400'. The flow is then transferred to the second heat exchanger 7330 (e.g., via an interconnect, not shown in FIG. 41) where a portion of heat is transferred from the first flow to a cross flow of gaseous vapor delivered from the first processor 7400 (described below). The first flow of air is then delivered to the second processor assembly 7400'. The second flow of the air enters the first processor 7400 at a substantially similar time as the first flow of air flows through its flow path. Thus, the first processor assembly 7400 and the second processor assembly 7400' receive the flow and the first flow, respectively, of the air and a first flow and a second flow, respectively, of and inlet solution. The inlet solution is atomized and/or evaporated within the first processor assembly 7400 and the second processor assembly 7400' (described in detail above) such that at least a portion of the air becomes substantially saturated. The mixture of the solution and the inlet air then enters the separator assemblies 7500 included in or coupled to each processor assembly 7400 and 7400'. The separator assemblies 7500 separate the mixture to produce a flow of gaseous vapor, substantially purified water, and/or a flow of waste products. The flow of the substantially purified water is collected for use and the flow of waste products is collected and discarded. The gaseous vapor exits the separator assembly 7500 of the first processor assembly 7400 and flows within a first processor outlet pipe 7050 to the second heat exchanger 7330 the air is drawn into the air pump 7210. The gaseous vapor exits the separator assembly (not shown) of the second processor assembly 7400' and flows within a second processor outlet pipe 7050' to the first heat exchanger 7310. In this manner, a portion of heat from the first flow of inlet air is transferred to the flow of gaseous vapor and is circulated into the first processor assembly 7400. Thus, the system 7000 can be configured to circulate the flow of air to enhance the efficiency of the system 7000.

Figure 42:
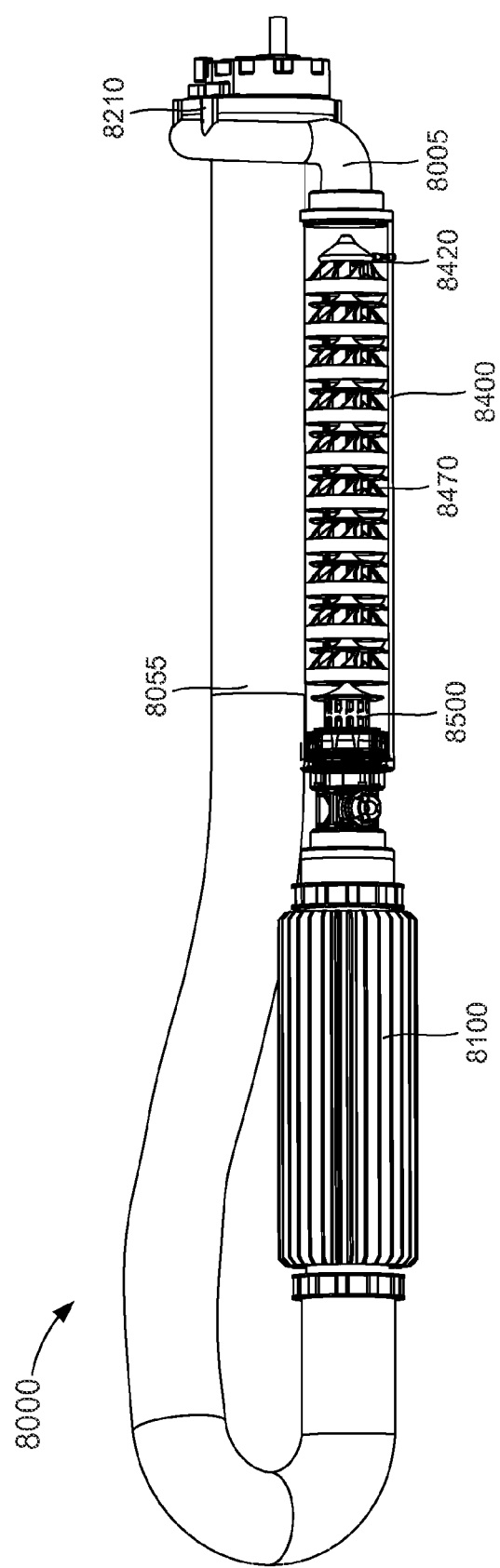
FIG. 42 is a side view of a water purification system according to an embodiment.

Although the systems 4000, 5000, 6000, and 7000 are shown and described as including a pair of heat exchangers, in some embodiments, a system can include a single heat exchanger that can define four or more closed flow paths. In other embodiments, a system need not include a heat exchanger. For example, FIG. 42 illustrates a water purification system 8000. The system 8000 includes an air pump 8210, a processor assembly 8400, a condenser assembly 8100, and one or more separator assemblies 8500. As described in detail above with reference to the system 4000, the air pump 8210 can receive a flow of air and compress the air to produce a flow of inlet air. The inlet air flows directly into the processor assembly 8400. As described above with reference to the processor assembly 4400, the processor assembly 8400 includes an atomizer assembly 8420 and a set of evaporation assemblies 8470. Thus, the inlet solution is delivered to the atomizer 8420 and mixed with the inlet air. More specifically, the particle size of the inlet solution is reduced to very small particles to enhance the mixing of the inlet solution with the inlet air. Moreover, by delivering the inlet air directly to the processor assembly 8400, the heat of the inlet air enhances absorption of the inlet solution. The mixture then flows serially through the evaporator assemblies 8470 where the inlet solution evaporates to further saturate the vapor portion (e.g., inlet air) of the mixture. Upon exiting the last evaporation assembly 8470, the mixture enters the separator assembly 8500 and is separated into a flow of gaseous vapor, substantially purified water, and flow of waste products. The flow of the substantially purified water is collected for use and the flow of waste products is collected and discarded. The gaseous vapor exits the separator assembly 8500 and flows directly into the condenser assembly 8100. As described above in detail with reference to the condenser assembly 4100, the gaseous vapor is condensed and separated (e.g., by a separator assembly 8500 not shown in FIG. 40) to produce a flow of condensed substantially purified water and a cooled yet uncondensed flow of a water vapor. While not shown in FIG. 42, the purified water is collected for use. The gaseous vapor is then drawn into the air pump 8210 and again compressed to produce the inlet air. Thus, the system 8000 can be configured to circulate the flow of air to enhance the efficiency of the system 8000.

Figure 43:
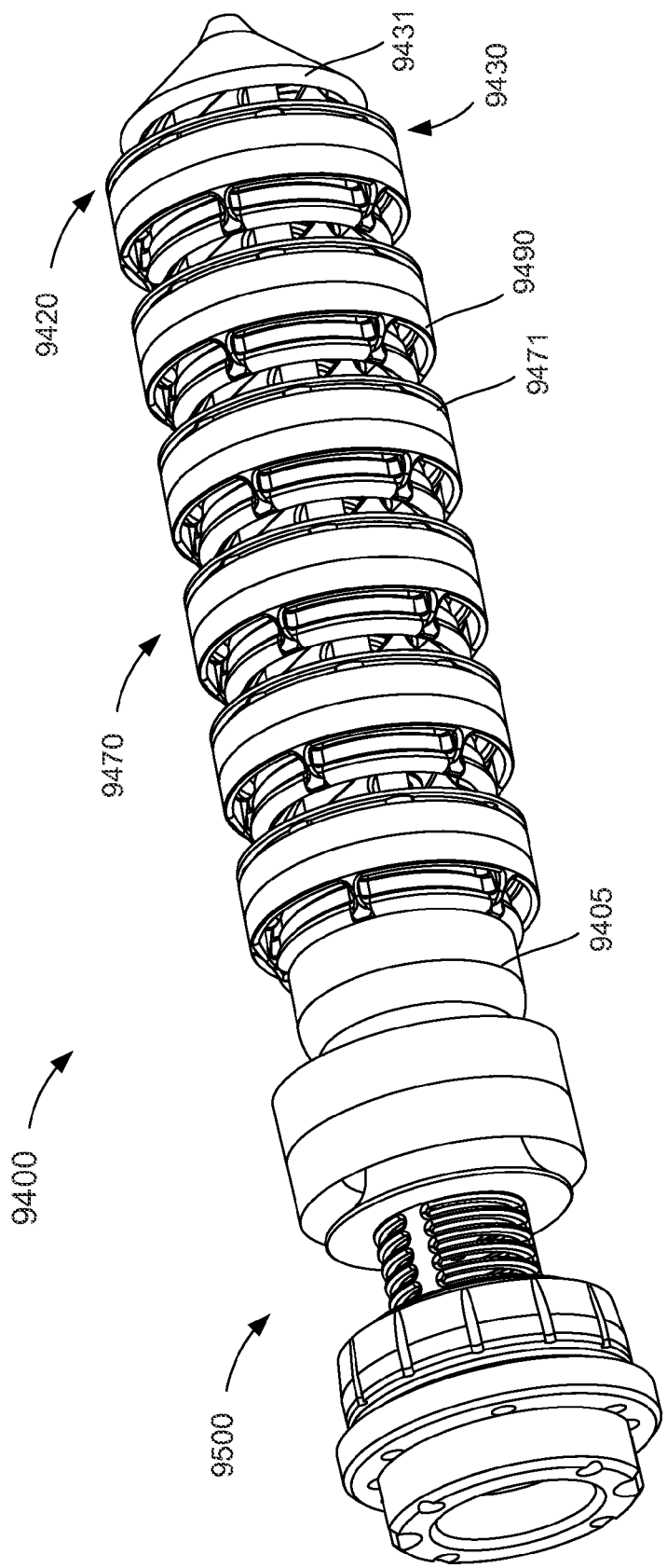
FIG. 43 is a perspective view of a processor assembly according to an embodiment.

Although the processor 4400 of the system 4000 is particularly shown and described above with reference to FIGS. 14-38, in other embodiments, the processor assembly can be any suitable configuration. For example, FIGS. 43-49 illustrate a processor assembly 9400 according to an embodiment. The processor assembly 9400 can be included in any of the systems 4000, 5000, 6000, 7000, and/or 8000 described herein. As shown in FIG. 43, the processor assembly 9400 includes at least an atomizer assembly 9420 and a set of evaporation assemblies 9470. Moreover, the processor assembly 9400 includes a spacer 9405 (e.g., formed from, for example, rubber, nylon, or other suitable elastomeric material) and is coupled to or includes a separator assembly 9500. The separator assembly 9500 can be substantially similar to or the same as the separator assembly 4500 described in detail above with reference to FIGS. 34-42. Thus, the separator assembly 9500 is not described in further detail herein. While not shown in FIG. 43, the processor assembly 9400 includes a housing (e.g., similar to or the same as the housing 4400 described above) that encloses the atomizer assembly 9420, the evaporation assemblies 9470, and at least a portion of the separator assembly 9500.

Figure 44:
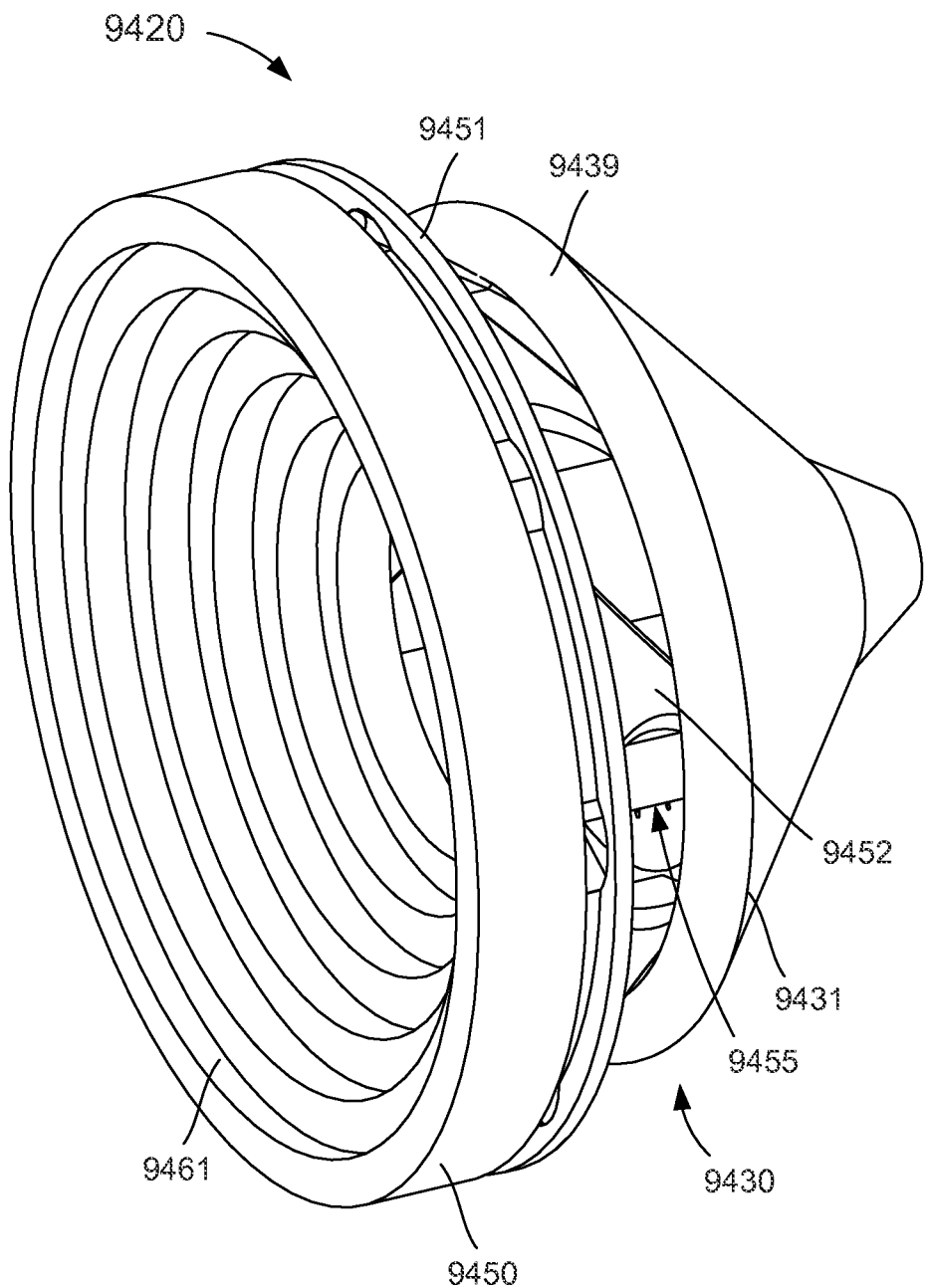
FIG. 44 is a perspective view of an atomizer assembly included in the processor assembly of FIG. 43.
Figure 45:
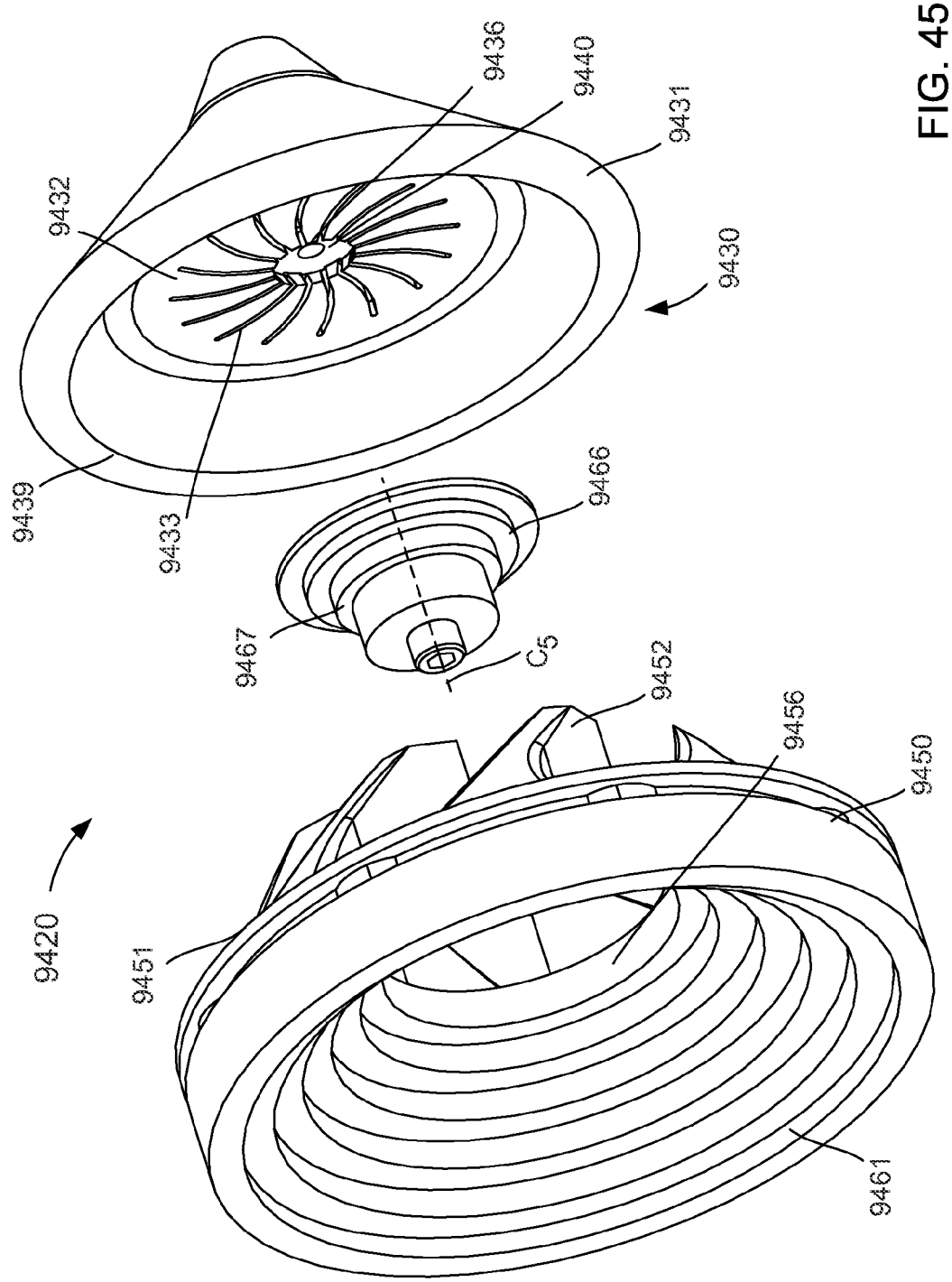
FIG. 45 is an exploded view of the atomizer assembly of FIG. 44.

As shown in FIGS. 44 and 45, the atomizer assembly 9420 includes an injector nozzle 9430 and a diffuser 9450 that collectively define a mixing volume 9455. The diffuser 9450 includes a first surface 9451 and a second surface 9461 and defines a throat opening 9456 therebetween. The diffuser 9450 is substantially similar to or the same as the diffuser 4450 included in the atomizer 4420. Therefore, the diffuser 9450 is not described in detail herein.

While not shown in FIGS. 43-45, the injector nozzle 9430 is fluidically coupled to a supply line such that a flow of a solution (e.g., feedwater, which can be seawater, industrial wastewater, water produced by hydraulic fracturing or the like) is delivered to the of the injector nozzle 9430. As shown in FIG. 45, the injector nozzle 9430 includes a first injection member 9431, a second injection member 9440, and a third injection member 9466. The first injection member 9431 is substantially similar to the first injection member 4431 included in the atomizer assembly 4420. For example, the first injection member 9431 includes an engagement surface 9432 that defines a set of elongate openings 9433. As described above, the engagement surface 9432 and a portion of the diffuser 9450 define the mixing chamber 9455 (FIG. 44). The first injection member 9431 also defines an opening 9436 (e.g., similar to the opening 4436 defined by the first injection member 4431 of the atomizer assembly 4420) that receives the second injection member 9440, as described above. Similar features and/or functions are not described in further detail herein.

The first injection member 9431 can differ from the first injection nozzle 4431, however, with the inclusion of an outer surface 9439. As shown in FIG. 44, the outer surface 9439 surrounds at least a portion of the vanes 9452 of the diffuser 9450. In this manner, the outer surface 9439 of the first injection member 9431 and the vanes 9452 of the diffuser 9450 define a flow path configured to receive a flow of a gas, as described in detail above. Moreover, with the outer surface 9439 disposed about at least a portion of the vanes 9452, the gas enters the flow path and/or the mixing chamber 9455 at a desired angle, as described in further detail herein.

The second injection member 9440 is substantially similar to the second injection member 4440 included in the atomizer assembly 9420. The second injection member 9440 differs, however, with the exclusion of the recess 4448. As shown in FIG. 45, the second injection member 9440 is disposed within the opening 9436 defined by the first injection member 9431. More specifically, the second injection member 9440 is disposed within the opening 9436 such that an end surface is disposed at a distance from the engagement surface 9432 (FIG. 45). In this manner, a solution can flow within and through a set of flow channels (not shown in FIGS. 43-45 but similar to or the same as the flow channels 4447 defined by the second injection member 4440) and subsequently flow into the elongate openings 9433 of the engagement surface 9432. Thus, the arrangement of the first injection member 9431 and the second injection member 9440 places the elongate openings 9433 defined by the engagement surface 9432 in fluid communication with the supply line.

The third injection member 9466 is coupled the second injection member 9440 and disposed adjacent to the engagement surface 9432 of the first injection member 9432. In some embodiments, the third injection member 9466 is contact with the engagement surface 9432 (e.g., adjacent). In other embodiments, the third injection member 9466 can be coupled to the second injection member 9440 and disposed at a distance from the engagement surface 9432 (e.g., 0.5 inches, 0.1 inches, 0.05 inches, 0.01 inches, 0.005 inches, or any fraction therebetween).

At least a portion of the third injection member 9466 is disposed within the mixing chamber 9455. The third injection member 9466 includes a set of shoulders 9467. As shown in FIG. 45, the shoulders 9467 can be any suitable shape, size, or configuration. For example, while shown in FIG. 45 as being annular rings with a substantially square cross-section, the shoulders 9467 can be rounded, asymmetrical, non-uniform, and/or any other suitable configuration. Moreover, the cross-sectional areas of the shoulders 9467 vary such that the shoulders 9467 increase in cross-sectional area along a longitudinal centerline $C_5$ and away from the throat of the first injection member 9431.

The arrangement of the shoulders 9467 imparts the desired characteristics to the flow of gas and/or liquid entering and/or within the mixing chamber 9455. In some embodiments, the shoulders 9467 reduce the amount and/or control the characteristics of back flow (or reverse flow) of the gas and/or the solution. Expanding further, the shoulders 9467 included in or defined by the third injection member 9466 limit or breakup the backflow and produce a build-up of the particles disposed on each shoulder 9467. Therefore, with the third injection member 9466 disposed, at least partially, within the mixing chamber 9455, the build-up of the particles can reach a given threshold such that at least a portion of the particles flow and/or separate from the given shoulder 9467. Thus, the particles can be entrained in the flow of the gas entering the mixing chamber 9455 (the process of the particles becoming entrained is described above with reference to the diffuser 4450).

The arrangement of the atomizer assembly 9420 is such that a gas and a solution flow towards and/or into the mixing chamber 9455, and are mixed (and/or atomized) therein. More specifically, the solution flows (e.g., from a supply line) within the elongate openings 9433 while the gas flow within the flow path defined by the vanes 9452 of the diffuser 9450 and the outer surface 9439 of the first injection member 9431. Expanding further, the arrangement of the outer surface 9439 directs the flow of the gas into the flow path at an angle other than 90° with respect to the centerline of the atomizer assembly 9420. In particular, this arrangement results in a "negative rake" angle of the structure defining the gas flow path, thereby allowing the gas to flow into the mixing chamber at a velocity having at least one direction component opposite of (e.g., reversed from) a velocity component of the incoming solution. In this manner, the flow direction of the gas is at least partially opposite of the flow direction of the solution when the flow of the gas and the flow of the solution enter the mixing chamber 9455, thereby enhancing the atomization of the solution. As described above, the vanes 9452 produce a rotational velocity component within the flow of the gas that also enhances atomization. Moreover, the rotational velocity produced by the vanes 9452 produces a cyclonic flow of a mixture of the gas and the solution that flows downstream of the mixing chamber 9455 and through the throat opening 9456 defined by the diffuser 9450. In this manner, the mixture can flow within a second flow path defined at least in part by the second surface of the diffuser 9450 to enter the adjacent evaporation assembly 9470 (FIG. 43).

FIGS. 46-49 illustrate the evaporation assembly 9470 included in the processor assembly 9400. The evaporation assembly 9470 receives a mixture (e.g., produced by the atomizer assembly 9420) of the gas and the inlet solution to produce a vaporized portion of a solvent (e.g., water) from the solution. Referring back to FIG. 43, the processor assembly 9400 includes a set of evaporation assemblies 9470 that are arranged serially within the housing (not shown) of the processor assembly 9400. Thus, a discussion of one evaporation assembly 9470 is meant to apply to all the evaporation assemblies 9470 included in the processor assembly 9400. Although shown as being arranged serially, in other embodiments, the processor assembly 9400 can include a set of evaporation assemblies 9470 in parallel.

The evaporation assembly 9470 includes a diffuser 9471 having a first surface 9472, a second surface 9480, and defining a throat opening 9479, and an inlet flow member 9490 having a first surface 9491, a second surface 9492, and a third surface 9495. A first portion of the first surface 9472 of the diffuser 9471 and the first surface 9491 of the inlet flow member 9490 collectively define a first flow path 9477 within which the mixture can flow, as shown by the arrow DD in FIG. 49. A second portion of the first surface 9472 of the diffuser 9471 and the second surface 9492 of the inlet flow member 9490 collectively define an evaporation volume 9478 (see e.g., FIG. 49) that is upstream of the throat opening 9479. The second surface 9480 of the diffuser 9471 defines a second flow path 9482 (as indicated by the arrow EE in FIG. 49) within which at least a portion of the mixture and the vaporized portion of a solvent can flow, as described in further detail herein.

Figure 46:
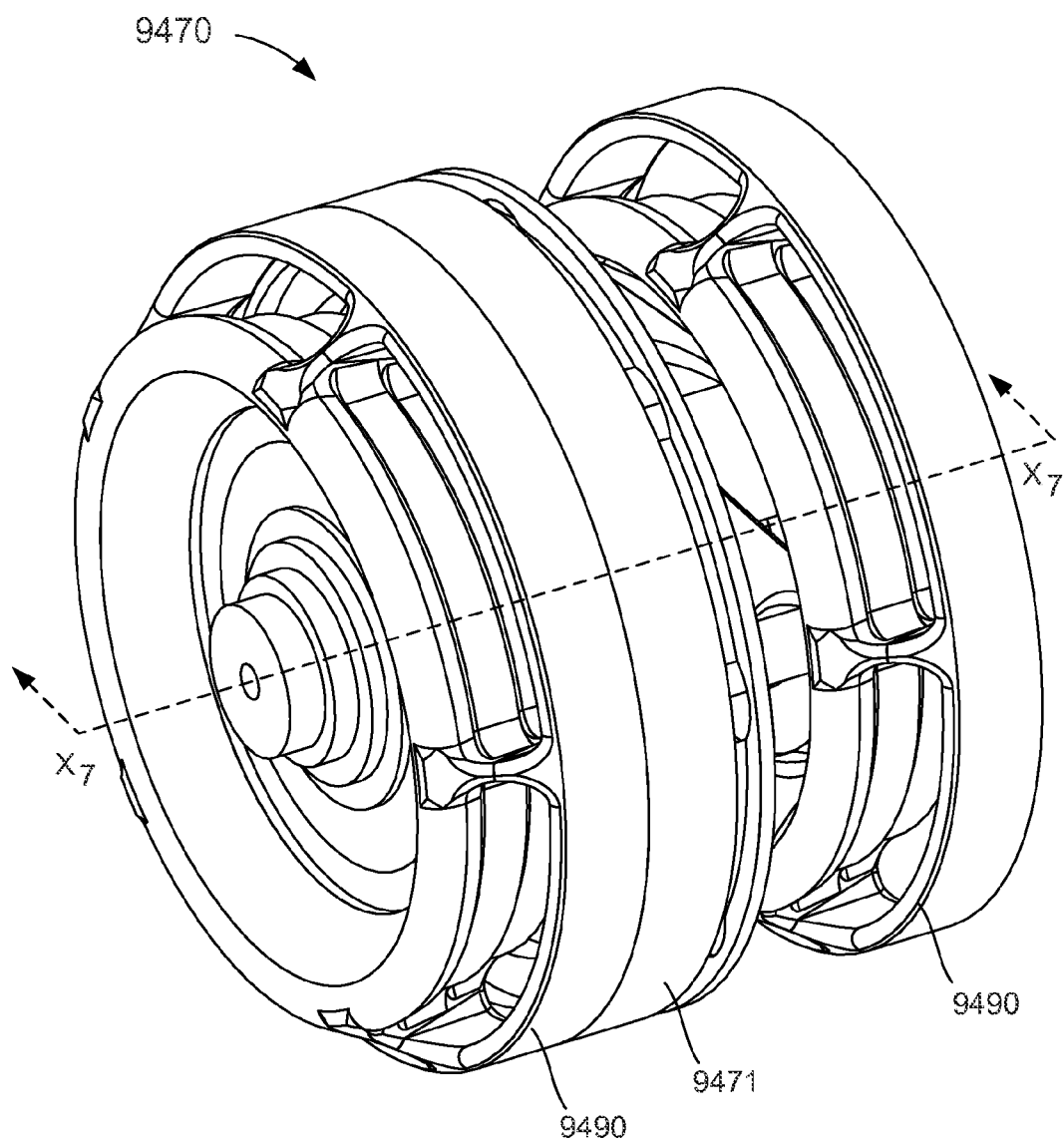
FIG. 46 is a rear perspective view of an evaporation assembly included in the processor assembly of FIG. 43.

As shown in FIG. 46, the inlet flow member 9490 is disposed within the processor assembly 9400 adjacent the diffuser 9471. More specifically, a portion of the first surface 9472 of the diffuser 9471 is in contact with a portion of the second surface 9492 of the inlet flow member 9490 such that a portion of the first surface 9491 of the inlet flow member 9490 is disposed about a portion of the first surface 9472 of the diffuser 9471 (see e.g., FIGS. 46 and 49). Similarly, the third surface 9495 of the inlet flow member 9490 is in contact with and/or adjacent a portion of the second surface 9480 of the diffuser 9471 such that a portion of the third surface 9495 is disposed within the second surface 9480 of the diffuser 9471 (see e.g., FIG. 49).

Figure 47:
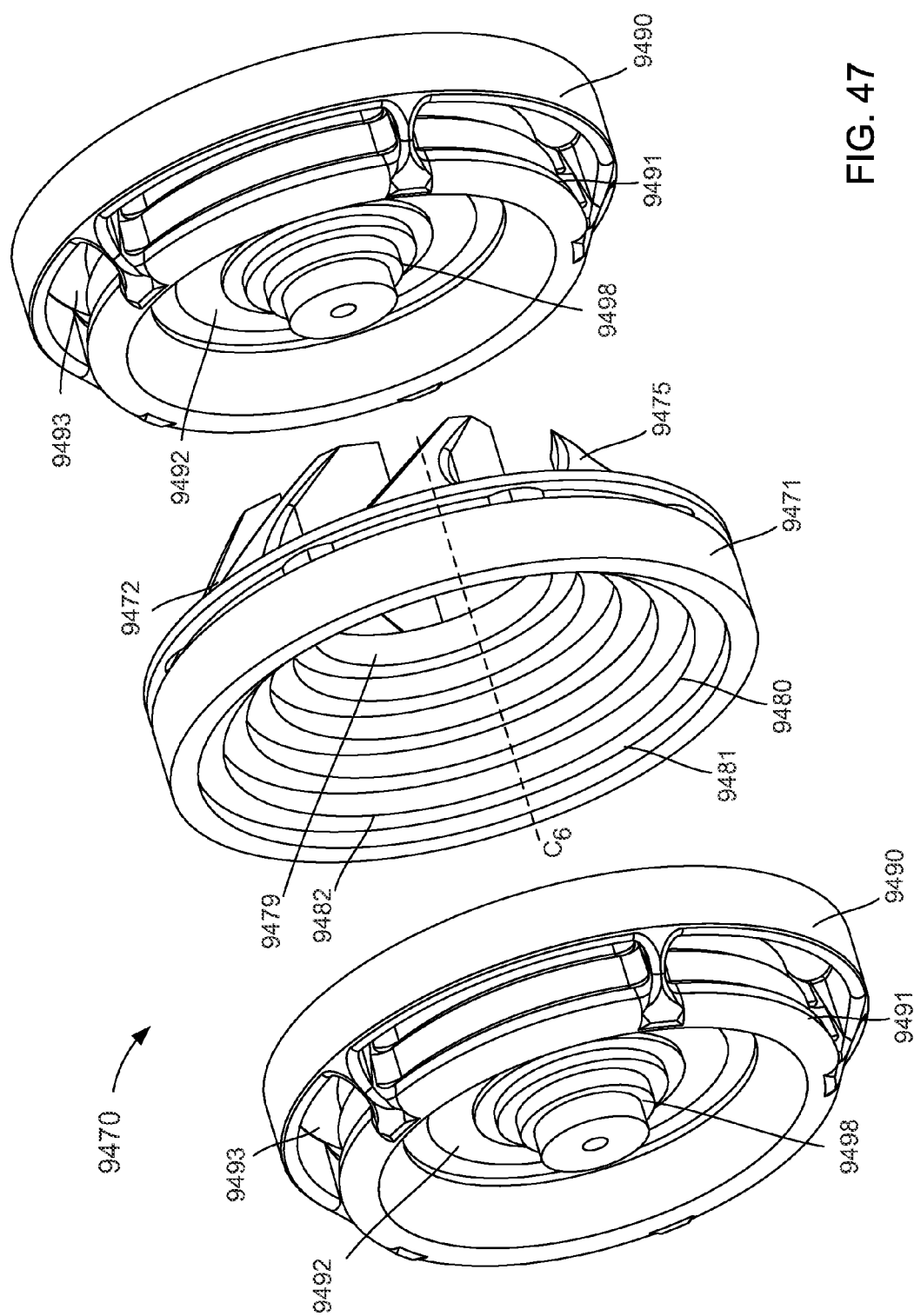
FIG. 47 is a rear exploded view of the evaporation assembly of FIG. 46.
Figure 48:
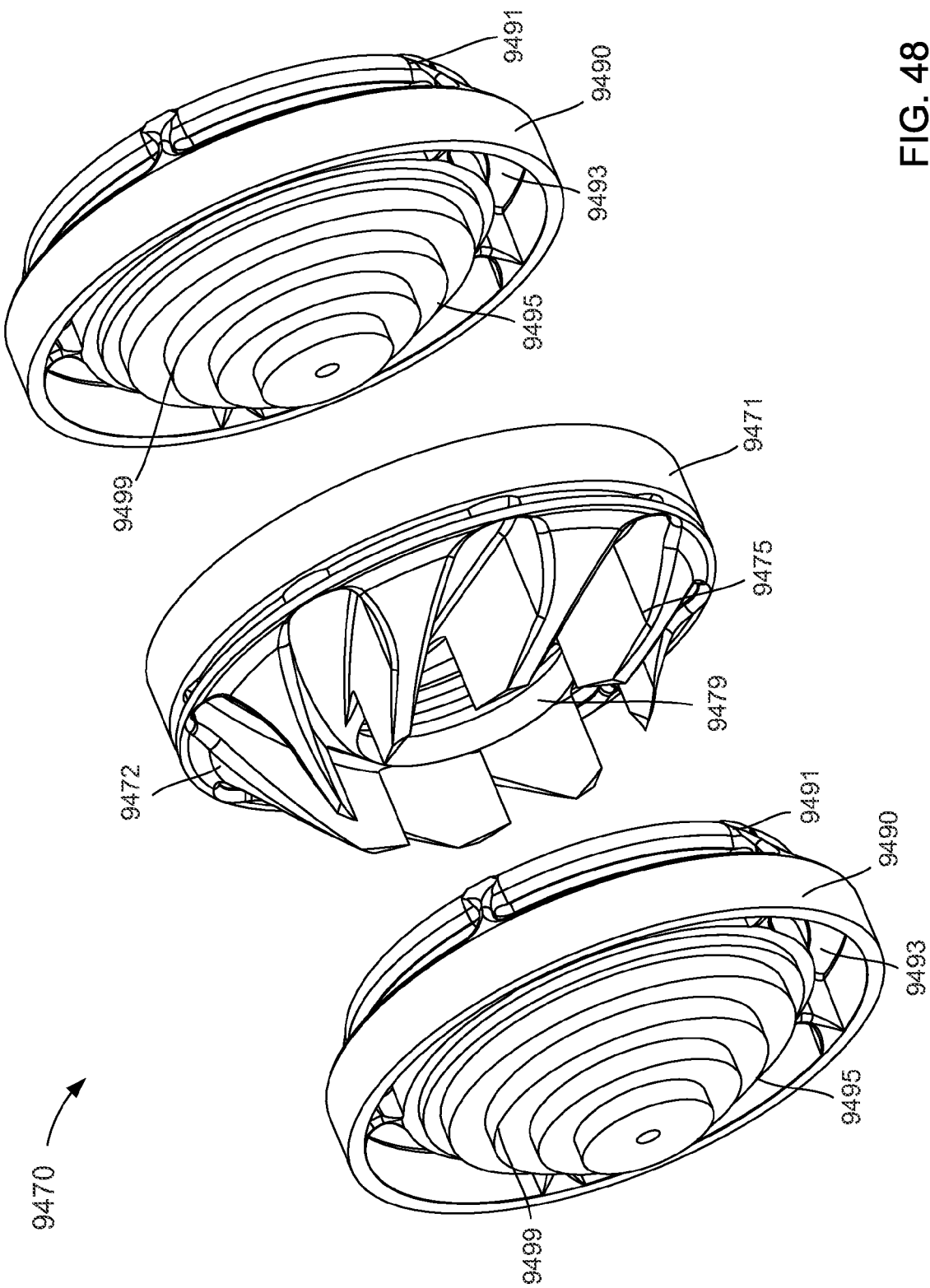
FIG. 48 is a front exploded view of the evaporation assembly of FIG. 46.
Figure 49:
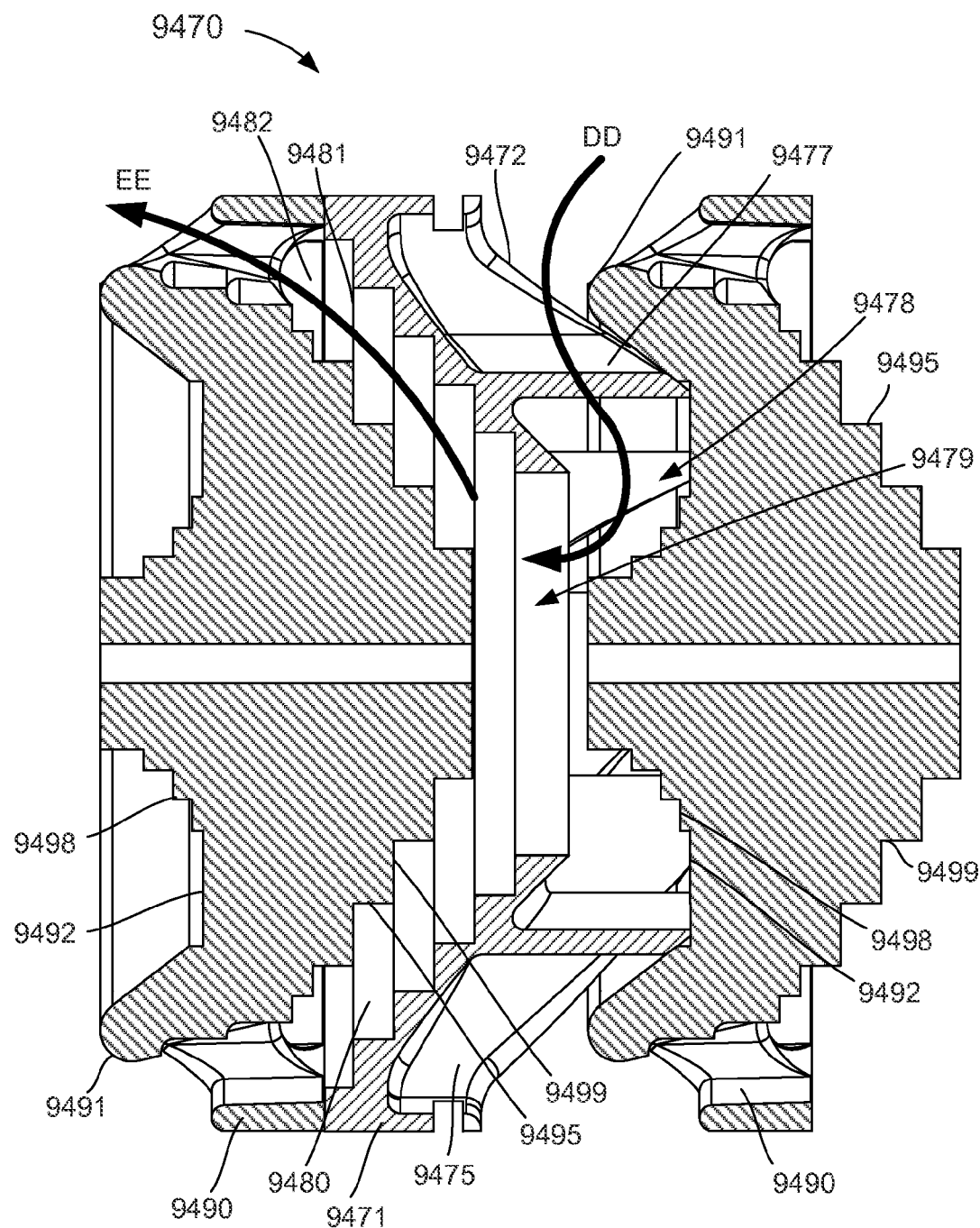
FIG. 49 is a cross-sectional view of the evaporation assembly taken along the line $X_7$-$X_7$ in FIG. 46.

As shown in FIG. 47 and further described herein, the first surface 9491 of the inlet flow member 9490 is a curved surface configured to direct at least a portion of a flow of the mixture into the first flow path 9477. Moreover, the first surface 9491 defines a set of openings 9493 that receive a flow of the mixture as the mixture flows between evaporation assemblies 9470. Similarly stated, the flow of the mixture flows within the second flow path 9482 to enter the openings 9493 of the adjacent inlet flow member 9490. The second surface 9492 is spaced a distance from the first surface 9491 to define a recess that receives the portion of the first surface 9492 of the diffuser 9471 (as described above). At least a portion of the second surface 9492 is disposed within the evaporation volume 9478. More specifically, the second surface 9492 includes a set of terraced shoulders 9498. As shown in FIG. 47, the shoulders 9498 can be any suitable shape, size, or configuration. For example, while shown in FIG. 47 as being annular rings with a substantially square cross-section, the shoulders 9498 can be rounded, asymmetrical, non-uniform, and/or any other suitable configuration. Moreover, the cross-sectional areas of the shoulders 9498 vary such that the shoulders 9498 increase in cross-sectional area as the shoulders 9498 extend from the second surface 9492 (as described above with reference to the third injection member 9466 included in the atomizer assembly 9420). Similarly, the third surface 9495 of the inlet flow member 9490 includes a set of terraced shoulders 9499. With the third surface 4995 of the inlet flow member 9490 disposed within the second surface 9480 of the diffuser 9471, the mixture and/or the vapor portion of the solution flows in the second flow path 9482 and diverges from (e.g., spreads out from) the throat opening 9479, as described in further detail herein.

The diffuser 9471 can be any suitable device, mechanism, or component that is configured to define or direct at least a portion of a flow of the mixture and/or a flow of the vaporized portion of the solvent. The diffuser 9471 can be substantially similar in form and function as the diffuser 9450 included in the atomizer assembly 9200. Moreover, the diffuser 9471 is substantially similar to or the same as the diffuser 4471 included in the evaporation assembly 4470 described above. Thus, portions of the diffuser 9471 are not described in further detail herein and should be considered to be similar or the same in form and function.

The first surface 9472 of the diffuser 9471 includes a set of vanes 9475. The vanes 9475 can be arranged to define at least a portion of the flow characteristic of the inlet mixture. For example, as described above, the vanes 9475 produce a rotational velocity within the flow of the mixture flowing within the first flow path 9477, as well as produce a cyclonic flow of the mixture and/or the vaporized portion of the solution that flows downstream of the evaporation volume 9478 and through the throat opening 9479 of the diffuser 9471.

The second surface 9480 of the diffuser 9471 includes a set of shoulders 9481 (as described above) and is configured diverge along a longitudinal centerline $C_6$ of the diffuser 9471. The divergence of the second surface 9480 is such that the area between the evaporation volume 9478 within a plane substantially normal to the longitudinal centerline $C_6$ of the diffuser 9471 increases as the plane is moved downstream relative to the evaporation volume 9478. The increase in the flow area defined by the second surface 9480 decreases the pressure at or within the evaporation volume 9478. Thus, the pressure drop draws the mixture into the second flow path 9482 and further reduces the particle size of the mixture, thereby increasing the evaporation of the solvent.

In user, the flow of the mixture exits the atomizer assembly 9420 and flows though the opening 9493 defined by the first surface 9491 of the inlet flow member 9490. In this manner, the mixture flows around the first surface 9491 of the inlet flow member 9490 (e.g., between an inner surface of the processor housing and the inlet flow member 9490) and enters the first flow path 9477 defined by the first surface 9491 of the inlet flow member 9490 and the first surface 9472 of the diffuser 9471. Thus, the mixture flows within the first flow path 9477 toward the evaporation volume 9478 defined between the second surface 9492 of the inlet flow member 9490 and a portion of the first surface 9472 of the diffuser 9471. As described above, the vanes 9475 of the diffuser 9471 produce a rotational velocity of the mixture within the first flow path 9477. Furthermore, a portion of the mixture is conveyed to or on the shoulders 9498. Therefore, as described above, the particles of the mixture can build-up on the shoulders 9498 and can reach a given threshold such that at least a portion of the particles flow and/or separate from the given shoulder 9498. Thus, the particles can be entrained in the flow of the mixture entering the evaporation volume 9478 (the process of the particles becoming entrained is described above with reference to the second surface 9480 of the diffuser 4471). Thus, the mixture enters the evaporation volume 9478 where a portion of the inlet water contained in the mixture is evaporated into the gaseous vapor portion of the mixture. Similarly stated, a portion of the mixture is evaporated, thereby increasing the humidity of the gaseous vapor portion of the mixture.

Upon exiting the evaporation volume 9478, the mixture flows through the throat opening 9479 defined by the diffuser 9471 and enters the second flow path 9477 (FIG. 49). As described above, the arrangement of the second surface 9480 of the diffuser 9471 produces a negative pressure downstream of the throat opening 9479 that draws the mixture through the throat opening 9479 and into the second flow path 9482. Moreover, the rotation velocity of the mixture slings larger or denser particles on the second surface 9480, which collect on the shoulders 9481 of the second surface 9480. Thus, the back flow of particles is reduced and/or controlled. Similarly, a portion of larger or denser particles can collect on the shoulders 9499 of the third surface 9495 of the inlet flow member 9490. Therefore, as described above, at least a portion of the larger or denser particles of the mixture are entrained in a flow of the mixture that is substantially upstream. In this manner, the mixture serially flows through the processor assembly 9400. Similarly stated, the mixture serially flows from one evaporation assembly 9470 to an adjacent evaporation assembly 9470 that is downstream. Thus, the humidity ratio of the gaseous vapor portion is serially increased as the mixture flows through the evaporations assemblies 9470. Similarly stated, the inlet water is serially evaporated, thereby serially increasing the saturation of the air flow (which is referred to at this point as being substantially saturated, even though the relative humidity may be less than 100%). Upon exiting the last evaporation assembly 9470 (e.g., the evaporation assembly 9470 that is disposed at a position downstream of all other evaporation assemblies 9470), the mixture enters the separator assembly 9500, as described above in detail with reference to the processor assembly 4400.

Figure 50:
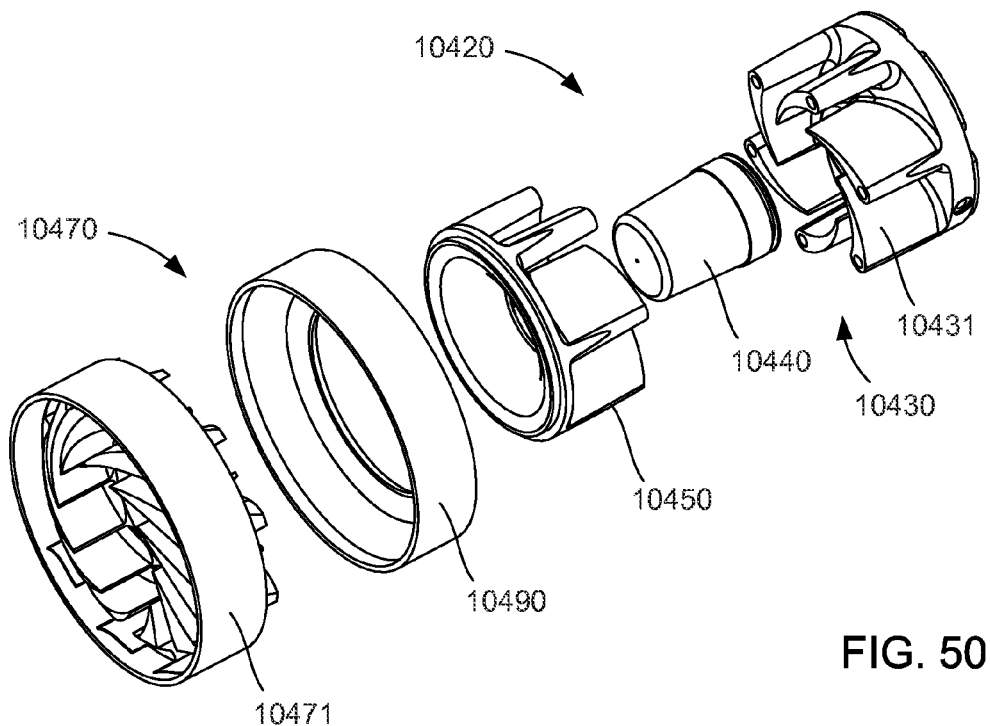
FIG. 50 is an exploded view of an atomizer assembly and an evaporation assembly according to an embodiment.
Figure 51:
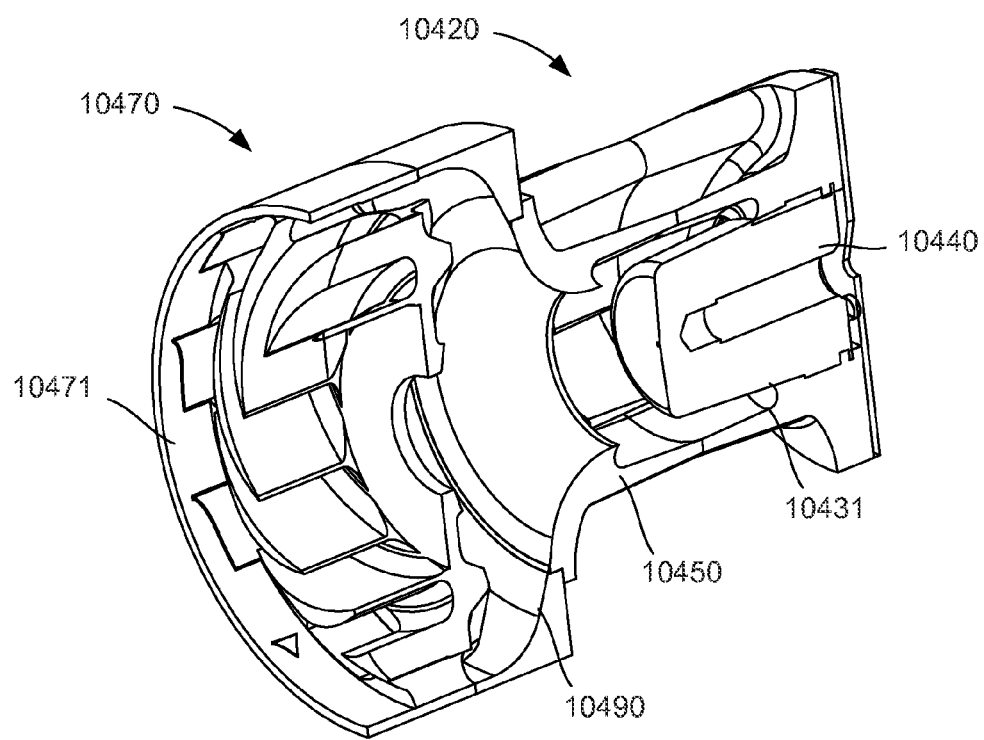
FIG. 51 is a cross-sectional view of the atomizer assembly and the evaporation assembly of FIG. 50.

Although the atomizer assembly 4420 and the evaporation assembly 4470 is particularly shown and described above, in other embodiments, a processor assembly can include an atomizer assembly and/or an evaporation assembly in any suitable configuration. For example, FIGS. 50 and 51 illustrate an atomizer assembly 10420 and an evaporation assembly 10470 according to an embodiment. As shown, the atomizer assembly 10420 includes an injection nozzle 10430 and a diffuser 10450. The injection nozzle 10430 includes a first injection member 10431 and a second injection member 10440. The second injection member 10440 can receive a flow of an inlet solution which can flow along an outer surface of the second injection member 10440. As shown, both the diffuser 10450 and the first injection member 10431 include a set of vanes and collectively enclose the second injection nozzle 10440. Thus, the atomizer assembly 10420 receives a flow of inlet air which enters a flow path defined by the vanes of the diffuser 10450 and the vanes of the first injection member 10431. The vanes produce a rotational velocity within the flow of inlet air which enhances the mixing and/or atomization of the inlet solution (as described above with reference to the atomizer assembly 4420).

The evaporation assembly 10470 includes an inlet flow member 10490 and a diffuser 10471. Unlike the evaporation assembly 4470 described above, the mixture flow through an opening defined by the inlet flow member 10490. More specifically, the rotational velocity of the flow (produced by the vanes of the atomizer assembly 10420) slings the mixture on a surface of the inlet flow member 10490. The surface of the inlet flow member 10490 diverges away from the opening. In this manner, the flow of the mixture can enter a set of openings defined along an outer portion of the diffuser 10471 which then flow within a flow path defined by a set of vanes included in the diffuser 10471 towards an evaporation volume. In this manner, the flow of inlet solution can be atomized and at least partially evaporated such that the saturation of the gaseous portion of the mixture is increased. Moreover, as described above with reference to the processor assembly 4400, any number of evaporation assemblies 10470 can be disposed adjacent to one another. Thus, the mixture serially flows through the evaporation assemblies 10470, which further increases the saturation of the gaseous portion of the mixture. While not shown in FIGS. 50 and 51, a separator assembly can be in fluid communication with the evaporation assembly 10470 and can receive and separate the mixture to produce a flow of gaseous vapor, a flow of substantially purified solvent, and a flow of waste products. Thus, the purified solvent can be collected for use and the waste products can be discarded.

Figure 52:
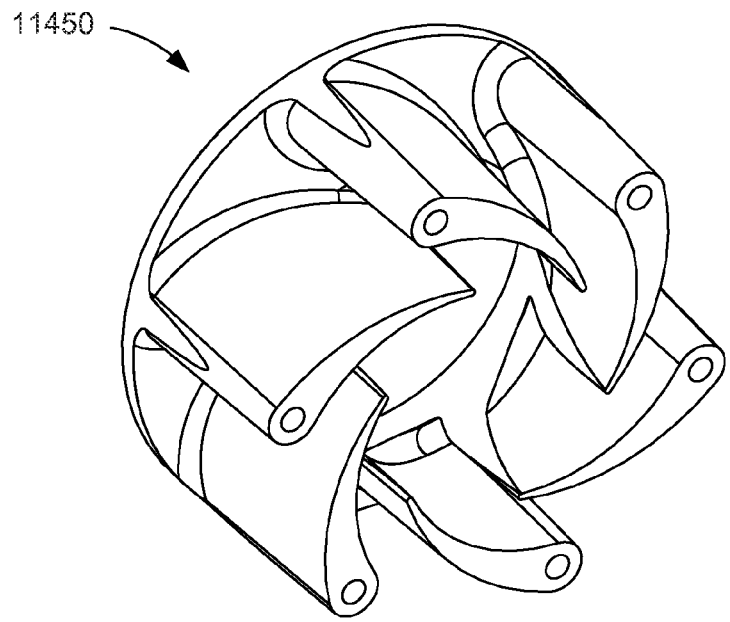
FIG. 52 is a perspective view of a diffuser included in an atomizer assembly according to an embodiment.

While the vanes of the diffuser 10450 of the atomizer assembly 10420 are shown as being spaced from a throat opening, in some embodiments, a surface of a set of vanes of a diffuser can define at least a portion of a throat opening. For example, FIG. 52 illustrates a diffuser 11450 according to an embodiment. As shown, the diffuser 11450 includes a set of vanes with a surface that defines at least a portion of a throat opening. In some embodiments, this arrangement can produce a at least a portion of a set of flow characteristics that can enhance the atomization and/or mixture of an inlet solution with a flow of a gas (as described in detail above).

Figure 53:
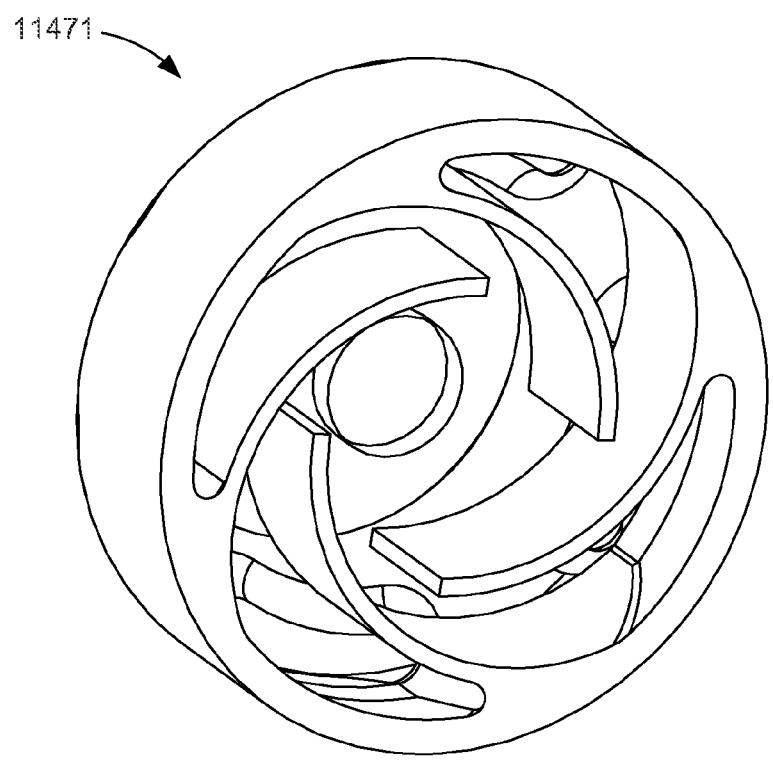
FIG. 53 is a perspective view of a diffuser included in an evaporation assembly according to an embodiment.

While the evaporation assembly 4470 is shown and described as including the diffuser 4471 with a set of vanes 4475 extending from an outer surface, in some embodiments, a diffuser can include a set of vanes that extend from an inner surface. For example, FIG. 53 illustrates a diffuser 11471 according to an embodiment. As shown, the diffuser includes a set of vanes that extend from an inner surface of the diffuser. In some instances, the arrangement of the vanes can enhance the evaporation of an inlet solution, as described in detail above. Although described as being a diffuser 11471 included in an evaporation assembly, in some embodiments, a diffuser included in an atomizer assembly can include a set of vanes that extend from an inner surface.

Figure 54:
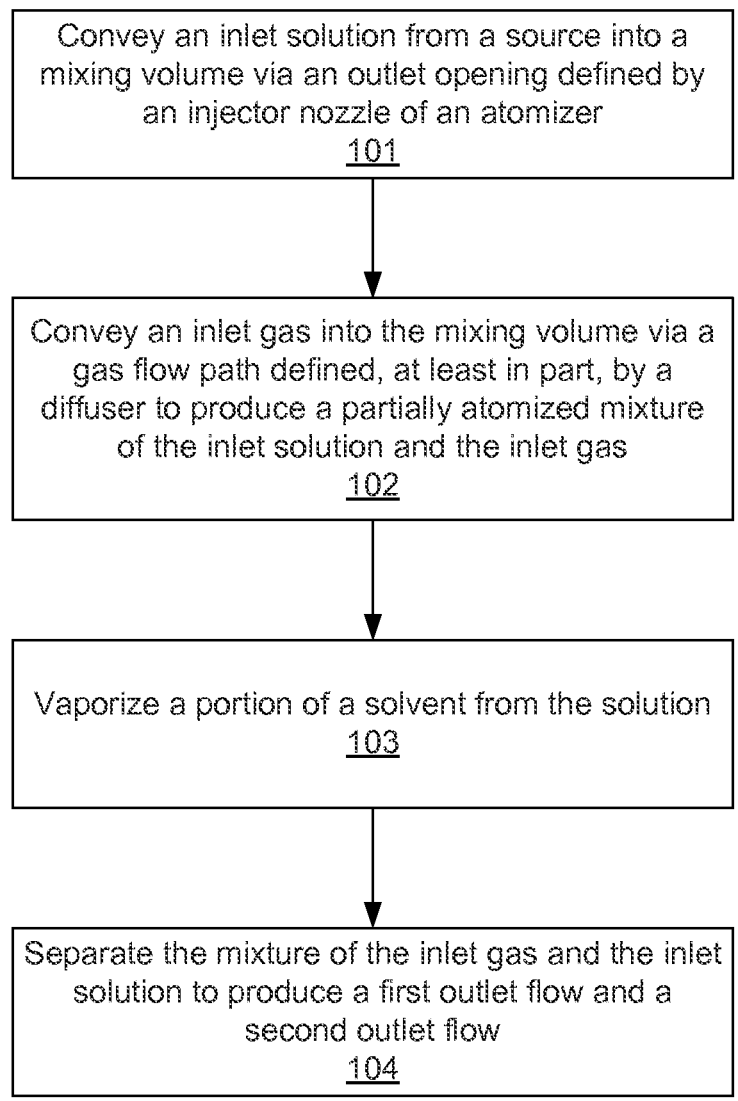
FIG. 54 is a flowchart illustrating a method of purifying a fluid.

FIG. 54 is a flowchart illustrating a method 100 of purifying an inlet solution to produce a flow of substantially purified solvent. For example, in some instances, the method 100 can be used to desalinize an inlet flow of salt water (e.g., sea water, brackish water, etc.). In other instances, the method 100 can be used to remove any suitable dissolved solid, fungi, bacteria, or the like. The method 100 includes conveying an inlet solution from a source into a mixing volume via an outlet opening defined by an injector nozzle of an atomizer, at 102. For example, in some instances, a source of feed water can be conveyed to the mixing volume from a fluid source or reservoir such as, for example, a sea, ocean, lake, municipal water supply, industrial wastewater, water produced by a hydraulic fracturing operation, reclaimed water supply, or any other suitable fluid source. In some instances, the inlet solution can include a total dissolved solids (TDS) concentration of greater than 30,000 parts per million (PPM). In some instances, the inlet solution can include a fungal concentration of greater than 100 colony forming units (CFU) per milliliter. In other instances, the inlet solution can include a bacterial concentration of greater than 900 CFU per milliliter. In some instances, an inlet solution can include any or all of the above solids, fungi, and/or bacteria at any combination of concentrations.

As described in above with reference to FIGS. 14-38, the atomizer assembly can be included in a processor assembly of a water purification system (e.g., the processor assembly 4400 of the system 4000). The inlet solution can be conveyed to the injector nozzle at any suitable pressure. For example, in some instances, the inlet solution can be conveyed to the injector nozzle at about 10 pounds per square inch gauge (psig), relative to ambient pressure. In other instances, the inlet solution can be conveyed at a pressure greater than 10 psig. In still other instances, the inlet solution can be conveyed at a pressure between 0 psig and 10 psig. In yet other embodiments, the inlet solution can be conveyed at a negative pressure (e.g., a vacuum downstream of the injector nozzle draws the inlet solution to the injector nozzle. In some embodiments, the injector nozzle of the atomizer can reduce the particle size of the inlet solution prior to entering the mixing volume (e.g., via a small outlet opening or the like). In some embodiments, the injector nozzle can produce a rotational velocity component within the flow of the inlet solution.

An inlet gas is conveyed into the mixing volume via a gas flow path defined, at least in part, by a diffuser to produce a partially atomized mixture of the inlet solution and the inlet gas, at 102. In some embodiments, the diffuser can include or define a surface configured to produce a desired flow characteristic of the inlet gas. For example, the diffuser can include a set of vanes that produce a rotational velocity component within the flow of the inlet gas. In such embodiments, the rotational velocity of the inlet gas can enhance the atomization of the inlet solution and/or enhance the mixing of the inlet solution and the inlet gas. As described above with reference to the diffuser 4450 of the atomizer assembly 4420, in some embodiments, the diffuser can define a throat opening between the mixing volume and a second flow path.

In such embodiments, the size of the throat opening can substantially correspond with the size of the mixing volume such that a choke point within the flow path is minimized. In some embodiments, the diffuser can include a surface downstream of the throat opening that diverges along a longitudinal centerline of the diffuser. In such embodiments, the divergence of the surface of the diffuser can produce a relative negative pressure. Thus, the mixture can be drawn from the mixing volume through the throat opening and into the second flow path.

With the mixture substantially atomized, a portion of the solvent is vaporized from the solution, at 103. For example, the flow of the mixture including the solvent can enter an evaporation assembly. The evaporation assembly can be included in, for example, the processor assembly 4400 described above with reference to FIGS. 14-38. The evaporation assembly can include an inlet flow member and a diffuser. The inlet flow member and the diffuser collectively can define an evaporation volume. Moreover, a surface of the inlet flow member and a surface of the diffuser define a first flow path within which the mixture can flow from the second flow path of the diffuser of the atomizer assembly toward the evaporation volume. As described above, the diffuser and/or the inlet flow member can include and suitable surface and/or surface feature configured to direct at least a portion of the flow of the mixture prior to the mixture entering the evaporation volume. For example, a surface of the diffuser and/or a surface of the inlet flow member can produce a rotational velocity within the flow of the mixture. As described above with reference to the diffuser of the atomizer assembly, the diffuser can define an opening downstream of the evaporation volume. The arrangement of the evaporation volume and the opening is such that the particle size of the mixture is further reduced as the mixture flows from the evaporation volume to the opening. For example, in some embodiments, the arrangement of the diffuser can be such that a pressure downstream of the evaporation volume is less than a pressure upstream of the evaporation volume. In such embodiments, the pressure drop can further reduce the particle size of the mixture and can enhance evaporation and/or vaporization of the solvent from the solution. In some embodiments, the vaporization of the solvent is performed in serial process. For example, in some embodiments, the vaporization of the solvent from the solution can be performed in a processor assembly including multiple evaporation assemblies. Thus, the particle size of the solvent of the solution is reduced as the mixture (e.g., the mixture of the solution and the gas) flows through the processor assembly.

With the solvent sufficiently vaporized, the mixture of the inlet gas and the inlet solution is separated to produce a first outlet flow and a second outlet flow, at 104. As described above with reference to FIGS. 14-38, the mixture can flow into a separator assembly (e.g., the separator assembly 4500). The separator can produce a flow of the vaporized portion of the solvent from the solution and a flow including a liquid portion of the solvent from the solution and a solute from the solution. A separator can include any structure and/or mechanism to separate the vaporized portion of the solvent from the solution. For example, in some embodiments, a separator can include a series of structures and/or define a tortuous path to separate the heavier solute from the vapor and/or the purified solution. In other embodiments, the separator can include a centrifugal separation mechanism to separate the heavier solute from the vapor.

As described above, the vaporized portion of the solution is separated from the liquid portion of the solvent and the solute of the solution. In some embodiments, the vaporized portion of the solution can flow within a portion of a water purification system to a condenser assembly. In such embodiments, the condenser assembly can condense at least a portion of the vaporized portion of the solution to produce a flow of substantially purified liquid (e.g., water). The substantially purified liquid can then be collected for later use. As described above, in some instances, an inlet solution can be conveyed with a TDS concentration of greater than 30,000 PPM. In such instances, the substantially purified outflow can have a TDS concentration of less than 500 PPM. In some instances, an inlet solution can be conveyed with a fungal concentration of greater than 100 CFUs per milliliter. In such instances, the substantially purified outflow can have a substantially no fungal growth. In some instances, an inlet solution can be conveyed with a bacterial concentration of greater than 900 CFUs per milliliter. In such instances, the substantially purified outflow can have a bacterial concentration of less than 50 CFUs per milliliter.

As described above, the systems and methods for water purification described herein can include the removal of organisms. The methods described below can be used in conjunction with any suitable system that mixes a solution with a gas to form an atomized mixture, and then separates the vaporized portion of the mixture, including the systems 1000, 2000, 3000, 4000, 5000, 6000, 7000, and 8000 described herein as well as the systems shown in U.S. Patent Publication No. 2011/0309162, entitled, "Systems and Methods for Water Desalinization," filed Aug. 25, 2011, now U.S. Pat. No. 9,044,692, which is incorporated herein by reference in its entirety. Similarly stated, in some embodiments, a water-treatment technology includes one or more blowers, uniquely designed processors and separators to produce an enclosed tornado effect in a compartmented cylindrical pathway that creates micro-droplets of water for rapid evaporation and reliquification.

Methods according to an embodiment can employ any portion or mechanism of such a system to remove contaminants. In some embodiments, a method includes conveying an inlet solution from a source to an outlet opening of an atomizer via a first flow path, the first flow path defined by a flow member of the atomizer. An inlet gas is conveyed into the first flow path to produce an atomized mixture of the solution and the inlet gas. The inlet gas is conveyed into the first flow path via a second flow path defined by an outer surface of the flow member such that the inlet gas has a rotational velocity component when the inlet gas exits the second flow path. The method further includes separating the mixture of the inlet gas and the solution to produce a first outlet flow and a second outlet flow. The first outlet flow includes a portion of the gas and a vaporized portion of the water from the solution. The second outlet flow includes a portion of the water from the solution and a solute (i.e., the contaminants, organisms, minerals or the like) from the solution.

In some embodiments, for example, the method includes conveying the inlet solution having a total dissolved solids (TDS) concentration of greater than 30,000 parts per million (PPM) and producing, via the first outlet flow, water having a TDS concentration of less than 500 PPM. In other embodiments, for example, the method includes conveying the inlet solution having a total dissolved solids (TDS) concentration of greater than 20,000 parts per million (PPM) and producing, via the first outlet flow, water having a TDS concentration of less than 500 PPM; 200 PPM; 100 PPM or 50 PPM. In other embodiments, for example, the method includes conveying the inlet solution having a total dissolved solids (TDS) concentration of greater than 10,000 parts per million (PPM) and producing, via the first outlet flow, water having a TDS concentration of less than 500 PPM; 200 PPM; 100 PPM or 50 PPM. Similarly stated, in some embodiments, an apparatus includes a system that has a "turndown ratio" (i.e., the ratio between the TDS concentration of an inlet solution and the TDS concentration of an outlet flow) of at least 20, at least 40, at least 60, at least 100 or at least 300.

For example, a system according to an embodiment was tested using an inlet solution having a TDS concentration of approximately 37,700 parts per million and produced an outlet flow of water having a TDS concentration of approximately 185 PPM. In another test, the systems and methods described herein were tested using an inlet solution of seawater having a TDS concentration of approximately 27,600 parts per million and produced an outlet flow of water having a TDS concentration of approximately 58 PPM. In yet another test, the systems and methods described herein were tested using an inlet solution taken from the Great Salt Lake having a TDS concentration of approximately 65,200 parts per million and produced an outlet flow of water having a TDS concentration of approximately 67 PPM.

Table 1 below presents the results from various tests, which were conducted on systems of the types shown and described above (e.g., the system 4000) and/or in U.S. Patent Publication No. 2011/0309162, entitled, "Systems and Methods for Water Desalinization," filed Aug. 25, 2011, and according to the methods described herein. The pressure listed in Table 1 is the pressure of the inlet solution supplied to the atomizer (in units of psig).

TABLE 1

| DATE | SOURCE | PRESSURE | INPUT TDS | OUTPUT TDS |
|---|---|---|---|---|
| Jul. 21, 2011 | Salt + Water | 6.5 | 37.7k ppm | 185 ppm |
| Aug. 24, 2011 | Salt + Water | 6.15 | 33.3k ppm | 282 ppm |
| Aug. 24, 2011 | Salt + Water | No Data | 33.6k ppm | 141 ppm |
| Aug. 24, 2011 | Salt + Water | 6.04 | 33.5k ppm | 206 ppm |
| Aug. 24, 2011 | Salt + Water | 6.03 | 33.7k ppm | 155 ppm |
| Aug. 24, 2011 | Salt + Water | No Data | 33.6k ppm | 153 ppm |
| Aug. 24, 2011 | Salt + Water | 5.95 | 33.6k ppm | 166 ppm |
| Aug. 24, 2011 | Salt + Water | 5.97 | 33.6k ppm | 154 ppm |
| Sep. 22, 2011 | Seawater SE coast of US | 6.28 | 27.6k ppm | 58 ppm |
| Sep. 28, 2011 | Salt + Water | 6.52 | 36.5k ppm | 407 ppm |
| Sep. 28, 2011 | Salt + Water | 6.55 | 36.5k ppm | 105 ppm |
| Oct. 19, 2011 | CITY WATER | 6.65 | 190 ppm | 65.9 ppm |
| Oct. 19, 2011 | Seawater SE coast of US | 6.03 | 27.9k ppm | 409 ppm |
| Oct. 19, 2011 | Seawater SE coast of US | 6.13 | 27.9k ppm | 192 ppm |
| Oct. 20, 2011 | Seawater SE coast of US | 6.5 | 27.9k ppm | 109 ppm |
| Nov. 21, 2011 | Great Salt Lake | No Data | 65.2k ppm | 67 ppm |
| Nov. 22, 2011 | industrial water | No Data | 475 ppm | 50.8 ppm |

In addition to desalinization, as evidenced by the above test results, the systems and methods described herein include removal of industrial wastewater chemicals, bacteria, and fungi. For example, in some embodiments, a method includes conveying inlet water from a source to an outlet opening of an atomizer via a first flow path. The inlet water can include a first concentration of organisms such that the inlet water is unsuitable for consumption. An inlet gas is conveyed into the first flow path to produce an atomized mixture of the inlet water and the inlet gas. The inlet gas is conveyed into the first flow path via a second flow path defined by an outer surface of the flow member such that the inlet gas has a rotational velocity component when the inlet gas exits the second flow path. The method further includes separating the mixture of the inlet gas and the water to produce a first outlet flow and a second outlet flow. The first outlet flow includes a portion of the gas and a vaporized portion of the water from the solution. The first outlet flow can include a second concentration of organisms that is lower than the first concentration of organisms. The second outlet flow includes a portion of the water from the solution and a solute (i.e., the contaminants, organisms, minerals or the like) from the solution.

In some embodiments, for example, the method includes conveying the inlet water having a bacterial concentration of greater than approximately 900 colony forming units per milliliter (cfu/ml) and producing, via the first outlet flow, water having a bacterial concentration of approximately 50 cfu/ml or less. In some embodiments, the method includes conveying the inlet water having a bacterial concentration of greater than approximately 400 colony forming units per milliliter (cfu/ml) and producing, via the first outlet flow, water having a bacterial concentration of approximately 50 cfu/ml or less. In some embodiments, the method includes conveying the inlet water having a bacterial concentration of greater than approximately 100 colony forming units per milliliter (cfu/ml) and producing, via the first outlet flow, water having a bacterial concentration of approximately 50 cfu/ml or less. For example, the systems and methods described herein were tested using an inlet solution of water taken from the Potomac River having a bacterial concentration of 910 cfu/ml and produced an outlet flow of water having a bacterial concentration of approximately 50 cfu/ml.

Results from this test are provided below in Table 2A and 2B. As shown in Tables 2A and 2B, the inlet water was contaminated with coliform bacteria *E. Coli*, fungal spores, and yeasts. After being processed according to the methods described herein, the outlet water had reduced levels of such contaminants to well below maximum acceptable levels, i.e., such that the water was considered "suitable for human consumption."

TABLE 2A

Pre-processed Potomac River Water
Sample No.: #1, #3, #5
Test: 1007 Water, Total Bacterial Count
w/ Identification (1 mL volume)

| Organism isolated | Raw Count | cfu/ml | % total | MRL |
|---|---|---|---|---|
| Bacillus species | 4 | 400 | 44 | 100 |
| Coag-negative Staphylococcus species | 1 | 100 | 11 | 100 |
| Fermentative gram-negative rod | 3 | 30 | 3 | 10 |
| Micrococcus species | 2 | 200 | 22 | 100 |
| Multiple non-fermentative gram-negative rods | 18 | 180 | 20 | 10 |
| Total | 28 | 910 | ~100% | |

TABLE 2B

Post-processed Potomac River Water
Sample No.: #2, #4, #6
Test: Total Bacterial Count w/ Identification (1 mL volume)

| Organism isolated | Raw Count | cfu/ml | % total | MRL |
|---|---|---|---|---|
| Bacillus species | 4 | 40 | 80 | 10 |
| Non-fermentative gram-negative rod | 1 | 10 | 20 | 10 |
| Total | 5 | 50 | ~100% | |

In some embodiments, for example, the method includes conveying the inlet water having a fungal concentration of greater than approximately 100 colony forming units per milliliter (cfu/ml) and producing, via the first outlet flow, water having substantially no fungal growth. Results from this test are included in Table 3.

TABLE 3

Potomac River Water Fungal Counts
Sample No.: #1, #3, #5 (Pre-processed Potomac River Water)
Test: 1032 Water, Total Fungal Count w/ Identification (1 mL volume)

| Organism isolated | Raw Count | cfu/ml | % total | MRL |
|---|---|---|---|---|
| Non-sporulating colonies | 4 | 40 | 29 | 10 |
| Yeast | 1 | 100 | 71 | 100 |
| Total | 28 | 910 | ~100% | |

Sample No.: #2, #4, #6 (Post-processed Potomac River Water)
Test: 1032 Water, Total Fungal Count w/ Identification (1 mL volume)
Results: NO GROWTH In some embodiments, the method includes removing wastewater chemicals from industrial water. For example, a system (of the type described herein) was tested using an inlet solution of water taken from industrial cooling tower water and processed according to the methods described herein. Table 4 below presents the results from this test, which was conducted according to Certificate No. 88758-2010-AQ-USA-ANA via an ISO 9001:2008 Certified Laboratory.

TABLE 4

| Water Composition - Cooling tower blow down | Pre Process Test Results - Oct. 21, 2011 | Post Process Re-Test Results - Dec. 30, 2011 |
|---|---|---|
| Aluminum (Al) | 0.03 mg/L | 0.08 mg/L |
| Barium (Ba) | 0.08 mg/L | <0.01 mg/L |
| Boron (B) | 0.08 mg/L | 0.09 mg/L |
| Cadmium (Cd) | <0.01 mg/L | <0.01 mg/L |
| Calcium (Ca) | 82 mg/L | 1.9 mg/L |
| Calcium (CaCO3) | 210 mg/L | 4.7 mg/L |
| Chromium (Cr) | <0.02 mg/L | <0.02 mg/L |
| Copper (Cu) | <0.03 mg/L | <0.03 mg/L |
| Iron (Fe) | <0.02 mg/L | <0.02 mg/L |
| Lead (Pb) | <0.10 mg/L | <0.11 mg/L |
| Lithium (Li) | <0.01 mg/L | <0.01 mg/L |
| Magnesium (Mg) | 11 mg/L | 0.96 mg/L |
| Magnesium (CaCO3) | 46 mg/L | 3.9 mg/L |
| Manganese (Mn) | <0.01 mg/L | 0.08 mg/L |
| Molybdenum (Mo) | <0.04 mg/L | <0.04 mg/L |
| Nickel (Ni) | <0.01 mg/L | <0.01 mg/L |
| Phosphorus (P) | 2.0 mg/L | <0.03 mg/L |
| Potassium (K) | 11 mg/L | 4.1 mg/L |
| Silicon (Si) | 28 mg/L | 0.37 mg/L |
| Silica (SiO2) | 59 mg/L | 0.79 mg/L |
| Sodium (Na) | 390 mg/L | 11 mg/L |
| Sodium (CaCO3) | 25 mg/L | 25 mg/L |
| Strontium (Sr) | 0.75 mg/L | 0.03 mg/L |
| Vanadium (V) | 0.07 mg/L | <0.01 mg/L |
| Zinc (Zn) | 0.03 mg/L | 1.0 mg/L |
| Total Hardness (CaCO3) | 260 mg/L | 8.6 mg/L |
| Chloride (Cl) | 120 mg/L | 18 mg/L |
| Nitrite (NO2) | <2.0 mg/L | 0.36 mg/L |
| Bromide (Br) | <2.0 mg/L | <0.20 mg/L |
| Nitrate (NO3) | 42 mg/L | 0.34 mg/L |
| Sulfate (SO4) | 110 mg/L | 2.3 mg/L |
| Chloride (CaCO3) | 170 mg/L | 25 mg/L |
| Nitrate (CaCO3) | 34 mg/L | <0.28 mg/L |
| Sulfate (CaCO3) | 110 mg/L | 2.4 mg/L |
| Conductivity at 25° C. | 1300 uS/cm | 100 uS/cm |

In some embodiments, portions of the system, such as the blower, the nozzle and/or the separator of the types shown and described herein (e.g., the system 4000) and/or in U.S. Patent Publication No. 2011/0309162, entitled, "Systems and Methods for Water Desalinization," filed Aug. 25, 2011, now U.S. Pat. No. 9,044,692, which is incorporated herein by reference in its entirety, can be constructed from any suitable material. For example, in some embodiments, portions and/or components of the system (such as the atomization nozzle) can be constructed from ceramic and/or inert materials to further reduce the mineral content (e.g., aluminum, zinc and/or iron) of the solution during processing. In other embodiments, portions and/or components of the system can be constructed from alloys that are coated with an inert coating, such as for example, anodization, a silicon-based coating, an epoxy resin-based coating (e.g., Bisphenol A or BPA) or the like. In yet other embodiments, portions and/or components of the system can be coated with a material that is noncompatible with certain organisms and/or pathogens (i.e., that kills and/or limits the growth of certain organisms and/or pathogens). Such materials for coating can include, for example, silver.

The inlet gas can be any suitable gas. For example, in some embodiments, the inlet gas can be air (i.e., a standard atmospheric composition). In other embodiments, the inlet gas can include any suitable constituent formulated to improve the performance of the systems and methods disclosed herein. For example, in some embodiments, the inlet gas can include a reactive component formulated to react with one or more contaminants within the inlet solution to improve the performance of the systems and methods described herein. For example, in some embodiments, the inlet gas can include ozone.

While various embodiments have been described above, it should be understood that they have been presented by way of example only, and not limitation, and as such, various changes in form and/or detail may be made. Any portion of the apparatus and/or methods described herein may be combined in any suitable combination, unless explicitly expressed otherwise. Where methods and/or schematics described above indicate certain events and/or flow patterns occurring in certain order, the ordering of certain events and/or flow patterns may be modified. Additionally, certain events may be performed concurrently in parallel processes when possible, as well as performed sequentially.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. Additionally certain events may be performed concurrently in parallel processes when possible, as well as performed sequentially. While the embodiments have been particularly shown and described, it will be understood that various changes in form and details may be made.

Although the systems have been described primarily for use as water desalinization, the systems and elements thereof are not limited thereto. In some embodiments, any of the devices and/or components described herein can be used to separate a solute from any solution.

Although various embodiments have been described as having particular features and/or combinations of components, other embodiments are possible having a combination of any features and/or components from any of embodiments as discussed above.

What is claimed:

1. An apparatus, comprising:
an evaporator assembly configured to receive a mixture of a gas and a solution and vaporize a portion of a solvent from the solution, the evaporator assembly including:
an inlet flow member having a first surface and a second surface; and
a diffuser having a first surface and a second surface, a first portion of the first surface of the diffuser and the first surface of the inlet flow member collectively defining a first flow path, the first flow path converging along a longitudinal axis of the evaporator assembly, the second surface of the diffuser defining a second flow path that diverges along a longitudinal axis of the evaporator assembly, the second surface of the inlet flow member and a second portion of the first surface of the diffuser defining an evaporation volume between the first flow path and the second flow path, at least one of the first portion of the first surface of the diffuser or the first surface of the inlet flow member including a plurality of vanes configured to produce a rotational velocity component about the longitudinal axis within a flow of the mixture of the solution and the gas when the flow exits the first flow path into the evaporation volume, such that, in use, the converging first flow path and the rotational velocity component causes at least partial atomization of the solution; and
a separator fluidically coupled to the second flow path, the separator configured to receive the mixture of the gas and the solution, the separator configured to produce a first outlet flow and a second outlet flow, the first outlet flow including a portion of the gas and a vaporized portion of the solvent, the second outlet flow including a liquid portion of the solvent from the solution and a solute from the solution.

2. The apparatus of claim 1, wherein the second surface of the diffuser defines a total diffusion angle of greater than approximately forty degrees.

3. The apparatus of claim 1, wherein the second surface of the diffuser defines a total diffusion angle of between 95 degrees and 105 degrees.

4. The apparatus of claim 1, wherein the second surface of the diffuser includes a discontinuous portion.

5. The apparatus of claim 1, wherein the diffuser defines a throat opening between the evaporation volume and the second flow path.

6. The apparatus of claim 1, wherein the diffuser defines a throat opening between the evaporation volume and the second flow path, a ratio of a flow area at the throat opening and a flow area at an exit of the first flow path being between 0.5 and 1.

7. The apparatus of claim 1, wherein the second surface of the inlet flow member includes a discontinuous portion.

8. The apparatus of claim 1, wherein the second surface of the inlet flow member includes a plurality of curved flow structures, a direction of curvature of the plurality of curved flow structures being the same as a direction of curvature of the plurality of vanes.

9. The apparatus as in claim 1, wherein the evaporator assembly is adapted to receive the solution at ambient temperature.

10. An apparatus, comprising:
an evaporator assembly configured to receive a mixture of a gas and a solution and vaporize a portion of a solvent from the solution, the evaporator assembly including:
an inlet flow member having a first surface and a second surface; and
a diffuser having a first surface and a second surface, a first portion of the first surface of the diffuser and the first surface of the inlet flow member collectively defining a first flow path, the second surface of the diffuser defining a second flow path that diverges along a longitudinal axis of the evaporator assembly, the second surface of the inlet flow member and a second portion of the first surface of the diffuser defining an evaporation volume between the first flow path and the second flow path, at least one of the first portion of the first surface of the diffuser or the first surface of the inlet flow member including a plurality of vanes configured to produce a rotational velocity component about the longitudinal axis within a flow of the mixture of the solution and the gas when the flow exits the first flow path into the evaporation volume; and
a separator fluidically coupled to the second flow path, the separator configured to receive the mixture of the gas and the solution, the separator configured to produce a first outlet flow and a second outlet flow, the first outlet flow including a portion of the gas and a vaporized portion of the solvent, the second outlet flow including a liquid portion of the solvent from the solution and a solute from the solution, wherein the second surface of the diffuser includes a plurality of shoulders.

11. An apparatus, comprising:
an evaporator assembly configured to receive a mixture of a gas and a solution and vaporize a portion of a solvent from the solution, the evaporator assembly including:
an inlet flow member having a first surface and a second surface; and
a diffuser having a first surface and a second surface, a first portion of the first surface of the diffuser and the first surface of the inlet flow member collectively defining a first flow path, the first flow path converging along a longitudinal axis of the evaporator assembly, the second surface of the diffuser defining a second flow path that diverges along a longitudinal axis of the evaporator assembly, the second surface of the diffuser including at least one discontinuity within the second flow path, the second surface of the inlet flow member and a second portion of the first surface of the diffuser defining an evaporation volume between the first flow path and the second flow path, such that, in use, the converging first flow path and the rotational velocity component causes at least partial atomization of the solution; and
a separator fluidically coupled to the second flow path and aligned along the longitudinal axis of the evaporator assembly, the separator configured to receive the mixture of the gas and the solution, the separator configured to produce a first outlet flow and a second outlet flow, the first outlet flow including a portion of the gas and the vaporized portion of the solvent, the second outlet flow including a liquid portion of the solvent from the solution and a solute from the solution.

12. The apparatus of claim 11, wherein the at least one discontinuity of the second surface of the diffuser includes a shoulder.

13. The apparatus of claim 11, wherein the at least one discontinuity of the second surface of the diffuser includes a groove defined by the second surface.

14. The apparatus of claim 11, wherein the second surface of the diffuser defines a total diffusion angle of between approximately 95 degrees and 105 degrees.

15. The apparatus of claim 11, wherein the first surface of the diffuser defines a circumferential opening between the first flow path and the evaporation volume, the diffuser defining a throat opening between the evaporation volume and the second flow path, ratio of a diameter of the throat to a diameter of the circumferential opening being between 0.7 and 0.9.

16. The apparatus of claim 11, wherein at least one of the first portion of the first surface of the diffuser or the first surface of the inlet flow member includes a plurality of vanes configured to produce the rotational velocity component within a flow of the mixture of the solution and the gas when the flow exits the first flow path into the evaporation volume.

17. The apparatus as in claim 11, wherein the evaporator assembly is adapted to receive the solution at ambient temperature.

\* \* \* \* \*